United States Patent
Johnson et al.

(10) Patent No.: US 10,387,720 B2
(45) Date of Patent: Aug. 20, 2019

(54) SYSTEM AND METHOD FOR USING A VIDEO MONITORING SYSTEM TO PREVENT AND MANAGE DECUBITUS ULCERS IN PATIENTS

(71) Applicant: CareView Communications, Inc., Lewisville, TX (US)

(72) Inventors: Steven Gail Johnson, Highland Village, TX (US); Matthew Cameron Clark, Frisco, TX (US); Stephen Ecker, The Colony, TX (US); Kyle Brook Johnson, Plano, TX (US); Richard Craig Kuether, The Colony, TX (US)

(73) Assignee: CareView Communications, Inc., Lewisville, TX (US)

( * ) Notice: Subject to any disclaimer, the term of this patent is extended or adjusted under 35 U.S.C. 154(b) by 0 days.

(21) Appl. No.: 14/188,396

(22) Filed: Feb. 24, 2014

(65) Prior Publication Data

US 2014/0247334 A1    Sep. 4, 2014

Related U.S. Application Data

(63) Continuation of application No. 12/804,774, filed on Jul. 29, 2010, now Pat. No. 8,675,059.

(51) Int. Cl.
| | | |
|---|---|---|
| *G06K 9/00* | (2006.01) | |
| *H04N 7/18* | (2006.01) | |
| *G06T 7/73* | (2017.01) | |

(52) U.S. Cl.
CPC ...... *G06K 9/00369* (2013.01); *G06K 9/00711* (2013.01); *G06K 9/00771* (2013.01);
(Continued)

(58) Field of Classification Search
USPC ........................ 348/77; 340/573.01; 705/2, 4
See application file for complete search history.

(56) References Cited

U.S. PATENT DOCUMENTS

| | | |
|---|---|---|
| 4,608,559 A | 8/1986 | Friedman et al. |
| RE32,327 E | 1/1987 | Biba et al. |
| | (Continued) | |

FOREIGN PATENT DOCUMENTS

| | | |
|---|---|---|
| WO | WO200018054 A2 | 3/2000 |
| WO | WO2002063880 A1 | 8/2002 |

OTHER PUBLICATIONS

AHCPR. (May 1992). Panel for the Prediction and Prevention of Pressure Ulcers in Adults. Pressure Ulcers in Adults: Prediction and Prevention. Clinical Practice Guideline, No. 3. AHCPR Publication No. 92-0047. Rockville, MD: Agency for Health Care Policy and Research, Public Health Service, U.S. Department of Health and Human Services (http://www.ncbi.nlm.nih.gov/bookshelf/br.fcgi?book=hsahcpr&part=A4409).

(Continued)

*Primary Examiner* — Dave Czekaj
*Assistant Examiner* — Shanika M Brumfield
(74) *Attorney, Agent, or Firm* — Seth H. Ostrow; Meister Seelig & Fein LLP

(57) ABSTRACT

A video monitoring system captures image frames of a patient in various positions. The captured image frames are analyzed by the system for changes in a patient's position or movement, frames in which the system detects one or both of patient movement and repositioning are retained. The system analyzes an area of interest within each image frame that corresponds to an area in the camera's view field with the patient. Sequential image frames are compared for motion, only frames without motion, where the patient is still, are analyzed.

20 Claims, 27 Drawing Sheets

(52) U.S. Cl.
CPC ............... *G06T 7/73* (2017.01); *H04N 7/18* (2013.01); *G06K 2009/00738* (2013.01); *G06T 2207/10016* (2013.01); *G06T 2207/10024* (2013.01); *G06T 2207/30196* (2013.01); *G06T 2207/30201* (2013.01); *G06T 2207/30232* (2013.01)

(56) References Cited

U.S. PATENT DOCUMENTS

| | | | |
|---|---|---|---|
| 4,885,795 A | 12/1989 | Bunting et al. | |
| 5,343,240 A | 8/1994 | Yu | |
| 5,574,964 A | 11/1996 | Hamlin | |
| 5,798,798 A | 8/1998 | Rector et al. | |
| 5,995,146 A | 11/1999 | Rasmussen | |
| 6,049,281 A | 4/2000 | Osterweil | |
| 6,195,797 B1 | 2/2001 | Williams, Jr. | |
| 6,259,443 B1 | 7/2001 | Williams, Jr. | |
| 6,311,268 B1 | 10/2001 | Chu | |
| 6,317,885 B1 | 11/2001 | Fries | |
| 6,319,201 B1 | 11/2001 | Wilk | |
| 6,323,896 B1 | 11/2001 | Dahmani et al. | |
| 6,323,897 B1 | 11/2001 | Kogane et al. | |
| 6,429,233 B1 | 8/2002 | Oguri et al. | |
| 6,456,320 B2 | 9/2002 | Kuwano et al. | |
| 6,457,057 B1 | 9/2002 | Kageyu et al. | |
| 6,460,018 B1* | 10/2002 | Kasai | G06Q 10/06314 348/155 |
| 6,529,233 B1 | 3/2003 | Allen | |
| 6,567,682 B1 | 5/2003 | Osterweil et al. | |
| 6,594,837 B2 | 7/2003 | Khait | |
| 6,646,556 B1* | 11/2003 | Smith | A61B 5/1115 340/573.1 |
| 6,678,413 B1 | 1/2004 | Liang et al. | |
| 6,757,909 B1 | 6/2004 | Maruo et al. | |
| 6,803,945 B1 | 10/2004 | Needham | |
| 6,856,249 B2* | 2/2005 | Strubbe | G08B 21/0476 340/540 |
| 6,897,781 B2* | 5/2005 | Cooper | A61B 5/1118 340/517 |
| 7,030,764 B2* | 4/2006 | Smith | A61B 5/1115 340/573.1 |
| 7,078,676 B2 | 7/2006 | Smith et al. | |
| 7,110,569 B2 | 9/2006 | Brodsky et al. | |
| 7,378,975 B1* | 5/2008 | Smith | A61B 5/1126 340/573.1 |
| 7,396,331 B2 | 7/2008 | Mack et al. | |
| 7,477,285 B1 | 1/2009 | Johnson | |
| 7,761,310 B2* | 7/2010 | Rodgers | A61B 5/1113 600/300 |
| 7,801,328 B2 | 9/2010 | Au et al. | |
| 7,830,962 B1* | 11/2010 | Fernandez | G08B 13/19608 375/240.16 |
| 7,859,564 B2 | 12/2010 | Kelly, III et al. | |
| 8,172,777 B2* | 5/2012 | Goto | A61B 5/1118 340/573.1 |
| 8,294,712 B2* | 10/2012 | Nelson | G06K 9/3241 345/419 |
| 8,471,899 B2* | 6/2013 | Johnson | G06F 19/3418 348/143 |
| 8,675,059 B2* | 3/2014 | Johnson | G06K 9/00369 340/541 |
| 8,676,603 B2 | 3/2014 | Johnson | |
| 2002/0019984 A1 | 2/2002 | Rakib | |
| 2002/0023297 A1 | 2/2002 | Khait | |
| 2002/0044059 A1 | 4/2002 | Reeder et al. | |
| 2002/0069417 A1 | 6/2002 | Kliger et al. | |
| 2002/0104098 A1 | 8/2002 | Zustak et al. | |
| 2002/0147982 A1 | 10/2002 | Naidoo et al. | |
| 2002/0163577 A1 | 11/2002 | Myers | |
| 2003/0010345 A1 | 1/2003 | Koblasz et al. | |
| 2003/0025599 A1 | 2/2003 | Monroe | |
| 2003/0181830 A1 | 9/2003 | Guimond et al. | |
| 2004/0075738 A1 | 4/2004 | Burke et al. | |
| 2004/0077975 A1 | 4/2004 | Zimmerman | |
| 2004/0105006 A1 | 6/2004 | Lazo et al. | |
| 2004/0189475 A1 | 9/2004 | Cooper et al. | |
| 2005/0223606 A1* | 10/2005 | Paradee | G09F 1/00 40/124.01 |
| 2006/0024020 A1 | 2/2006 | Badawy | |
| 2006/0098865 A1 | 5/2006 | Yang et al. | |
| 2006/0239645 A1 | 10/2006 | Curtner et al. | |
| 2006/0243798 A1 | 11/2006 | Kundu et al. | |
| 2007/0132597 A1 | 6/2007 | Rodgers | |
| 2007/0136102 A1 | 6/2007 | Rodgers | |
| 2007/0160293 A1 | 7/2007 | Ishikawa et al. | |
| 2008/0021731 A1 | 1/2008 | Rodgers | |
| 2008/0130961 A1 | 6/2008 | Kinoshita | |
| 2008/0193020 A1 | 8/2008 | Sibiryakov et al. | |
| 2009/0022398 A1 | 1/2009 | Ishikawa et al. | |
| 2009/0070939 A1 | 3/2009 | Hann | |
| 2009/0072142 A1 | 3/2009 | Blitzer | |
| 2009/0119843 A1 | 5/2009 | Rodgers et al. | |
| 2009/0278934 A1 | 11/2009 | Ecker et al. | |
| 2009/0324023 A1 | 12/2009 | Tian et al. | |
| 2010/0052904 A1* | 3/2010 | Noguchi | G08B 13/196 340/541 |
| 2010/0134609 A1* | 6/2010 | Johnson | G06F 19/3418 348/77 |
| 2010/0166324 A1 | 7/2010 | Kundu et al. | |
| 2010/0241464 A1* | 9/2010 | Amigo | G06Q 40/08 705/4 |
| 2010/0290698 A1 | 11/2010 | Freedman et al. | |
| 2011/0181716 A1* | 7/2011 | McLeod | H04N 7/181 348/143 |
| 2012/0026308 A1 | 2/2012 | ohnson et al. | |
| 2013/0290015 A1 | 10/2013 | Johnson | |
| 2014/0092247 A1 | 4/2014 | Clark et al. | |
| 2014/0168397 A1 | 6/2014 | Greco et al. | |
| 2014/0204207 A1 | 7/2014 | Clark et al. | |
| 2014/0267625 A1 | 9/2014 | Clark et al. | |
| 2014/0288968 A1 | 9/2014 | Johnson | |
| 2014/0313340 A1 | 10/2014 | Ecker et al. | |

OTHER PUBLICATIONS

Chia-Feng Juang, Chia-Ming Chang, Jiuh-Rou Wu, and Demei Lee, Computer Vision-Based Human Body Segmentation and Posture Estimation, Jan. 2009, IEEE Transactions on Systems, Man and Cybernetics—Part A: Systems and Humans, vol. 39, pp. 119-133.

* cited by examiner

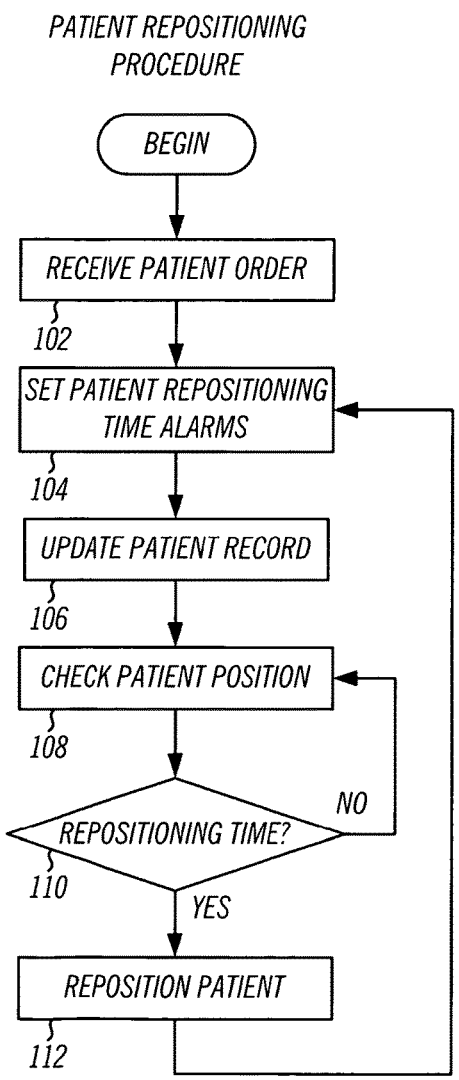
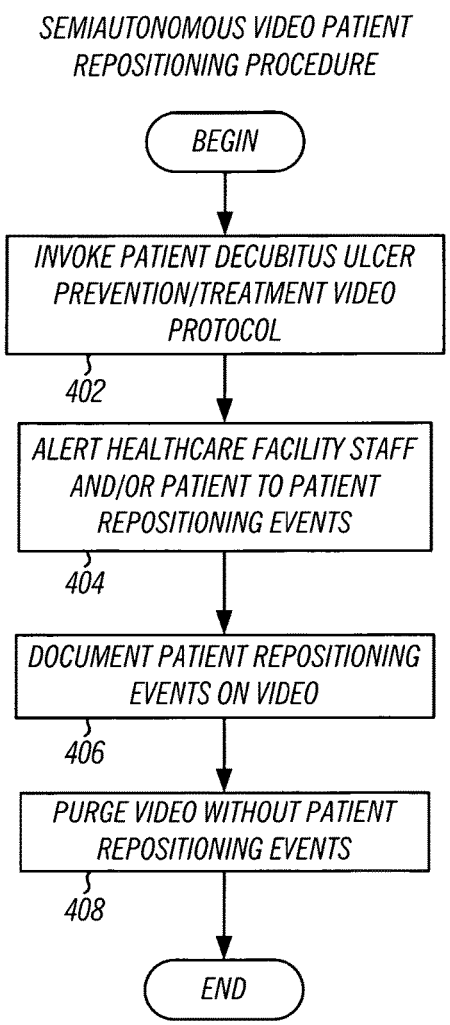
FIG. 1
PATIENT REPOSITIONING PROCEDURE
PRIOR ART
FIG. 4
SEMIAUTONOMOUS VIDEO PATIENT REPOSITIONING PROCEDURE

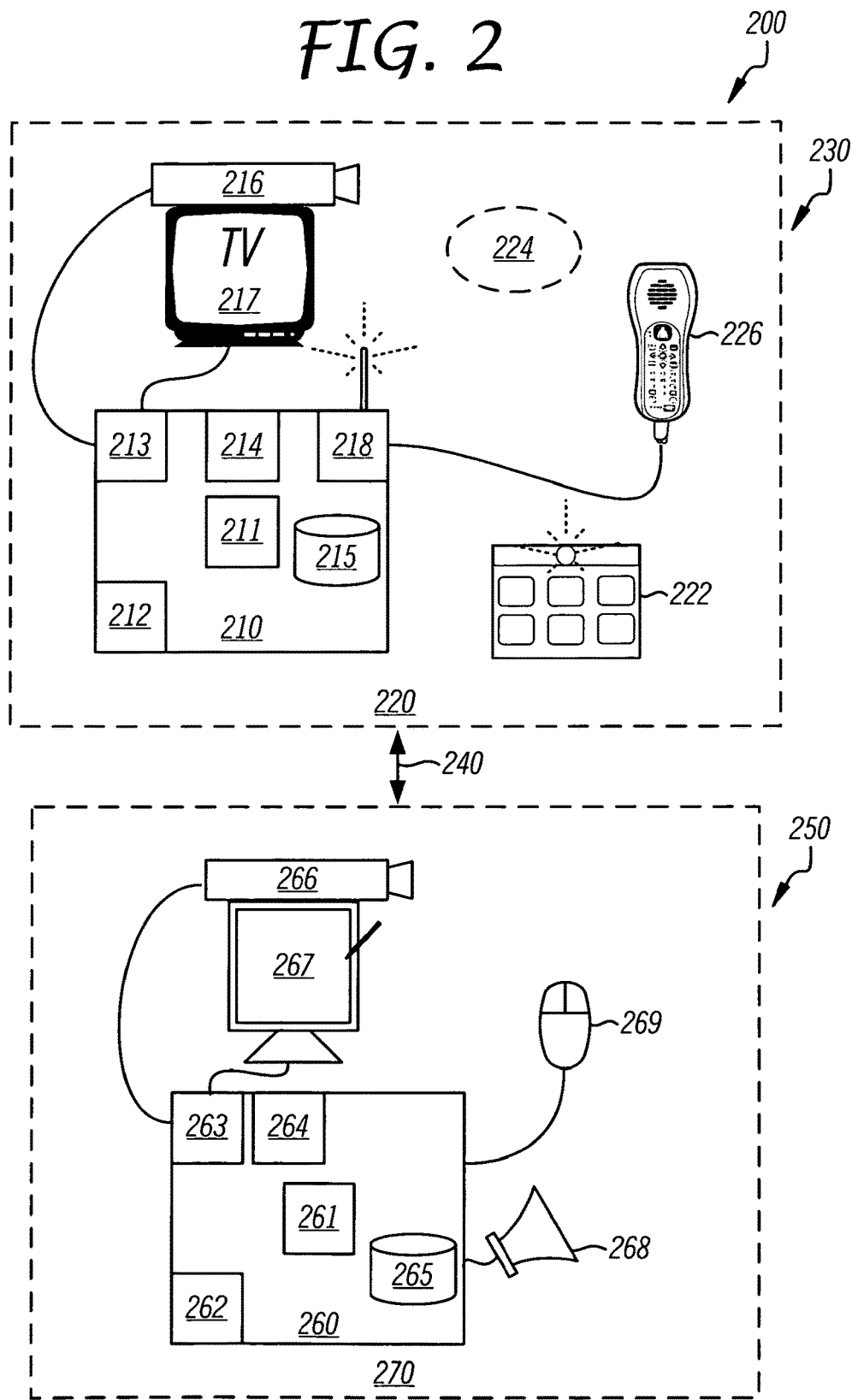

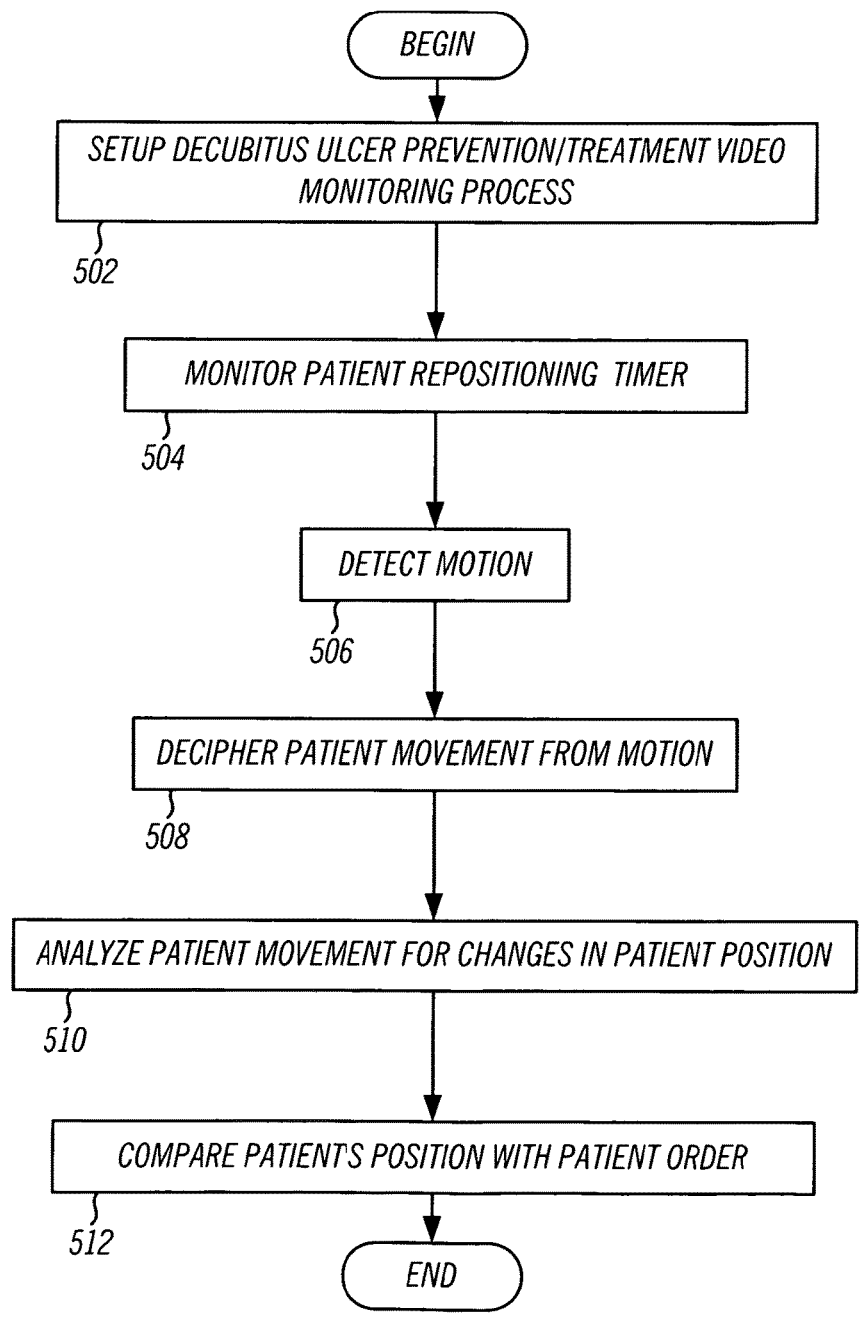

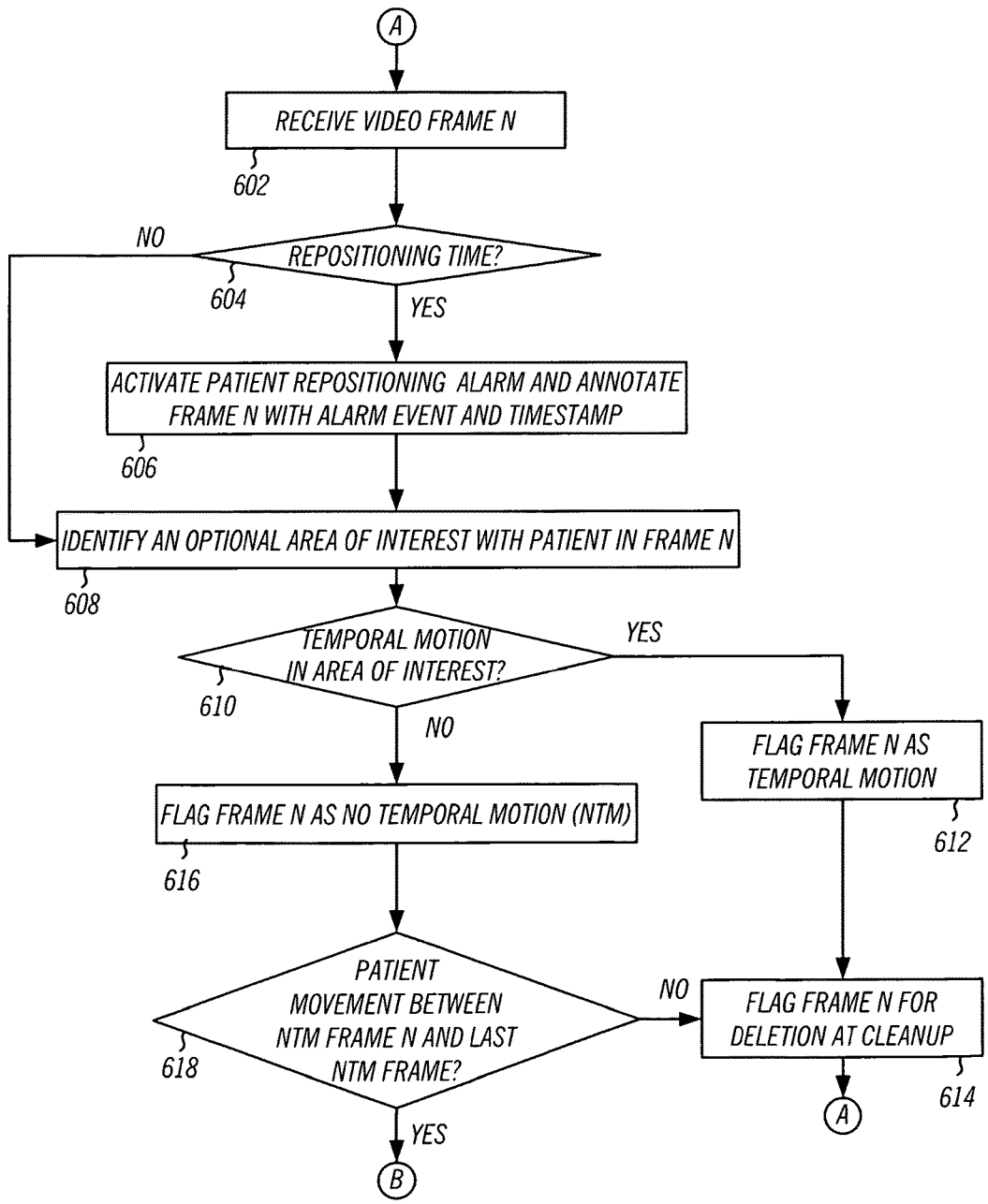

AUTOMATED PROCESS FOR PREVENTING
DECUBITUS ULCERS USING VIDEO MONITORING

SCREENSHOT OF DECUBITUS ULCER
TREATMENT/PREVENTION SETUP

SETUP FOR DECUBITUS ULCER TREATMENT/PREVENTION
(SETTING VIRTUAL BEDRAILS)

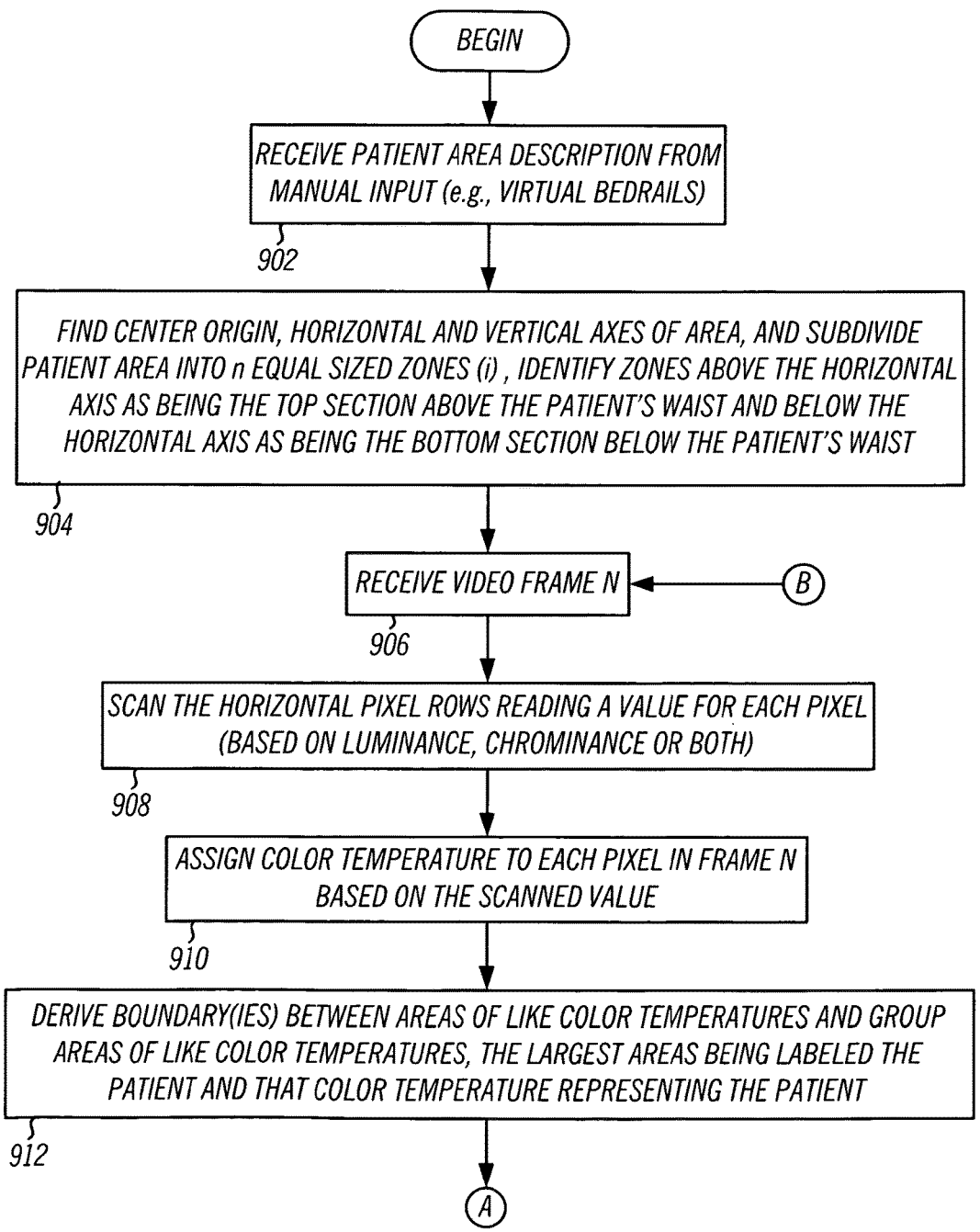

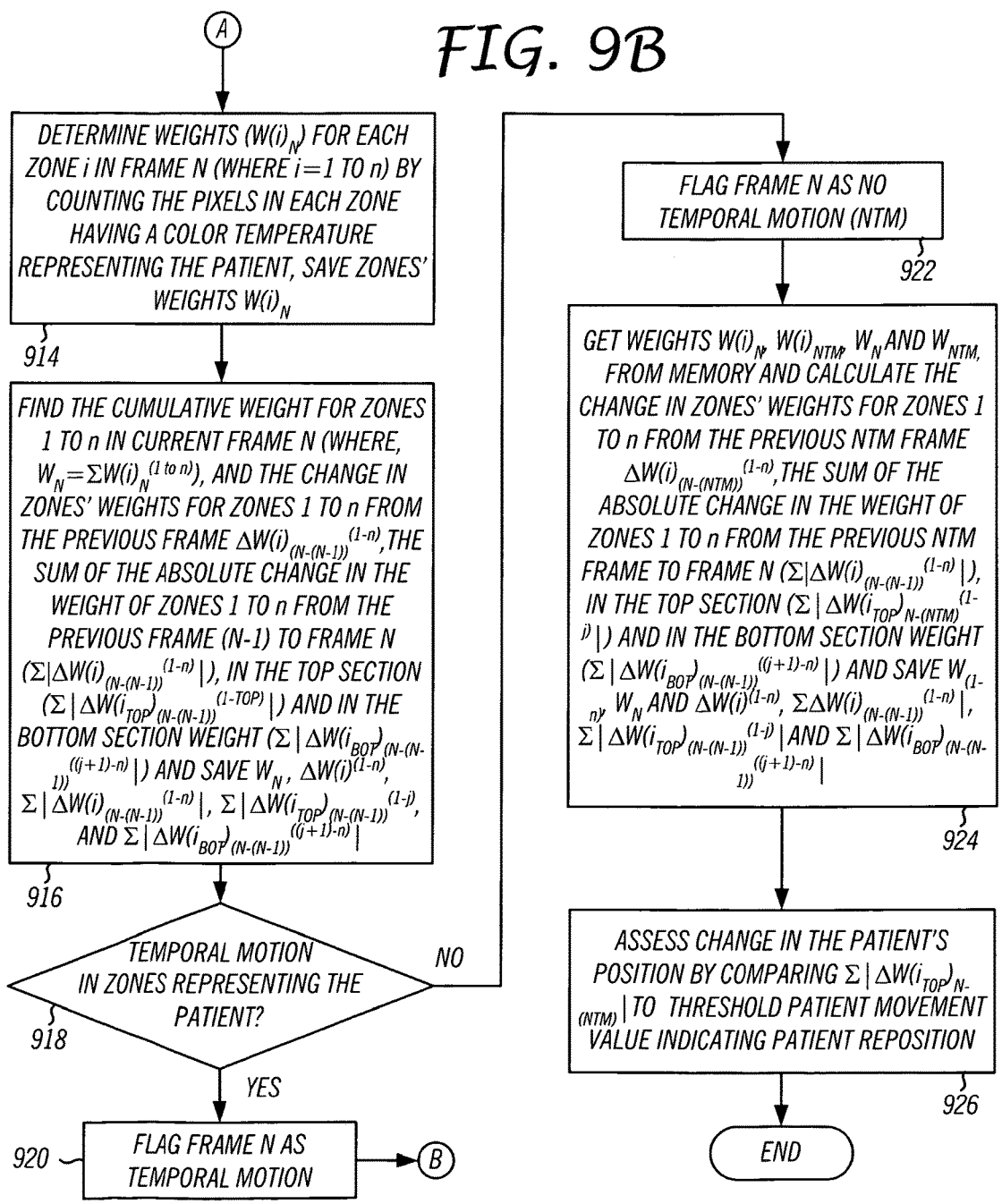

| CCD: 640x512 n=64x80 (5120) | | ZONE: 4x4 W= 0 to 32 | |
|---|---|---|---|
| ZONE(i) | $W(i)_{(NTM)}$ | $W(i)_N$ | $|\Delta W(i)_{N-(NTM)}|$ |
| 0000 | 00 | 00 | 00 |
| 0001 | 00 | 00 | 00 |
| 0002 | 00 | 00 | 00 |
| 0003 | 02 | 02 | 00 |
| 0004 | 00 | 00 | 00 |
| 0005 | 00 | 00 | 00 |
| ⋮ | ⋮ | ⋮ | ⋮ |
| 1244 | 15 | 16 | 01 |
| 1243 | 12 | 14 | 02 |
| 1242 | 15 | 16 | 01 |
| 1242 | 15 | 15 | 00 |
| ⋮ | ⋮ | ⋮ | ⋮ |
| 5116 | 02 | 04 | 02 |
| 5117 | 01 | 00 | 01 |
| 5118 | 00 | 01 | 01 |
| 5119 | 00 | 00 | 00 |
| $\Sigma W(i)_N$ | | 21480 | |
| $\Sigma W(i)_{(NTM)}$ | 21628 | | |
| $\Sigma |\Delta W(i_{TOP})_{N-(NTM)}|$ | | | 100 |
| $\Sigma |\Delta W(i_{BOT})_{N-(NTM)}|$ | | | 48 |

| CCD: 640x512 n=64x80 (5120) | | ZONE: 4x4 W= 0 to 32 | |
|---|---|---|---|
| ZONE(i) | $W(i)_{(NTM)}$ | $W(i)_N$ | $|\Delta W(i)_{N-(NTM)}|$ |
| 0000 | 00 | 00 | 00 |
| 0001 | 00 | 01 | 01 |
| 0002 | 00 | 00 | 00 |
| 0003 | 02 | 00 | 02 |
| 0004 | 00 | 00 | 00 |
| 0005 | 00 | 00 | 00 |
| ⋮ | ⋮ | ⋮ | ⋮ |
| 1244 | 16 | 02 | 26 |
| 1243 | 14 | 08 | 12 |
| 1242 | 16 | 15 | 01 |
| 1242 | 15 | 15 | 00 |
| ⋮ | ⋮ | ⋮ | ⋮ |
| 5116 | 02 | 00 | 02 |
| 5117 | 00 | 01 | 01 |
| 5118 | 01 | 00 | 01 |
| 5119 | 00 | 00 | 00 |
| $\Sigma W(i)_N$ | | 14676 | |
| $\Sigma W(i)_{(NTM)}$ | 21480 | | |
| $\Sigma |\Delta W(i_{TOP})_{N-(NTM)}|$ | | | 4020 |
| $\Sigma |\Delta W(i_{BOT})_{N-(NTM)}|$ | | | 2784 |

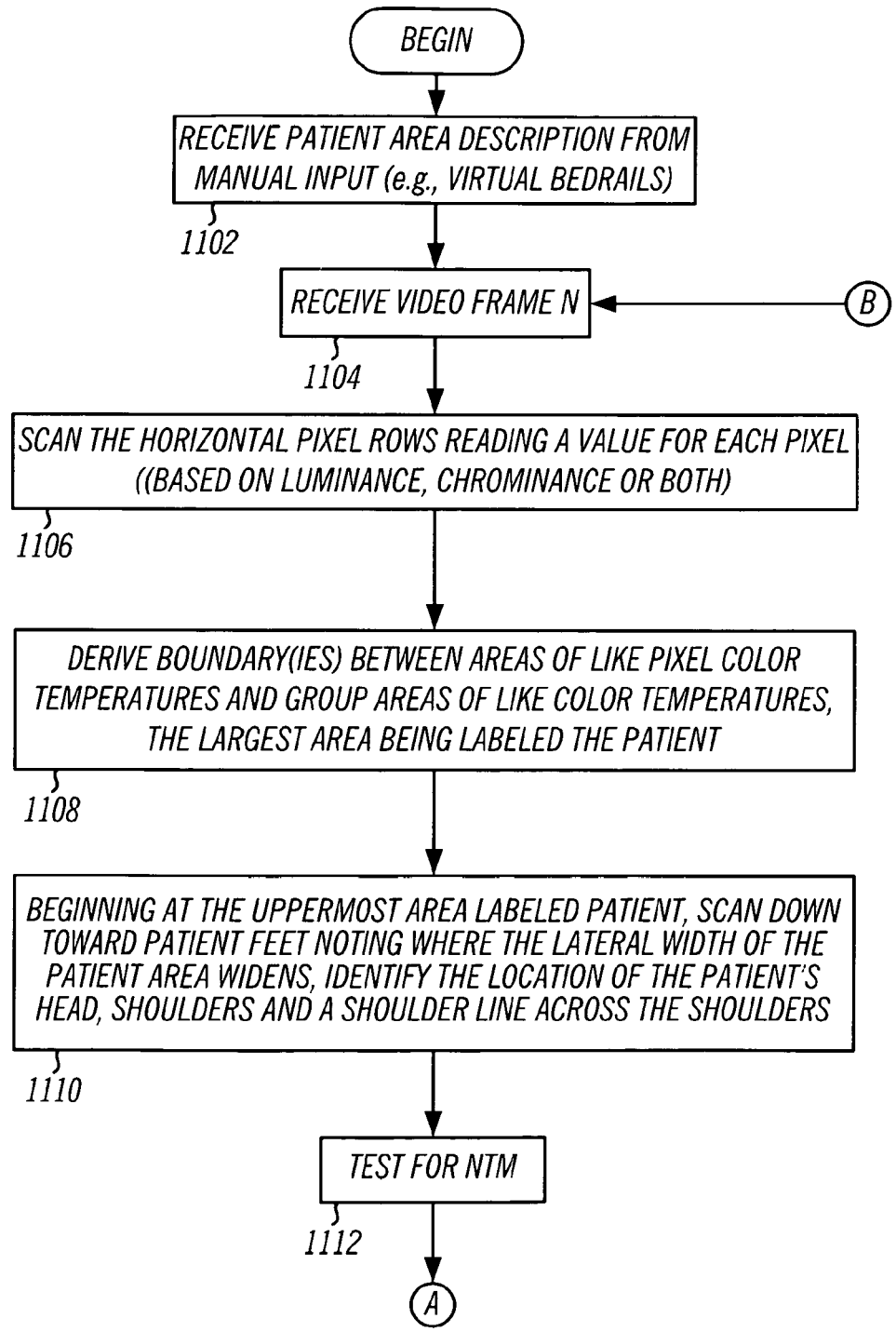

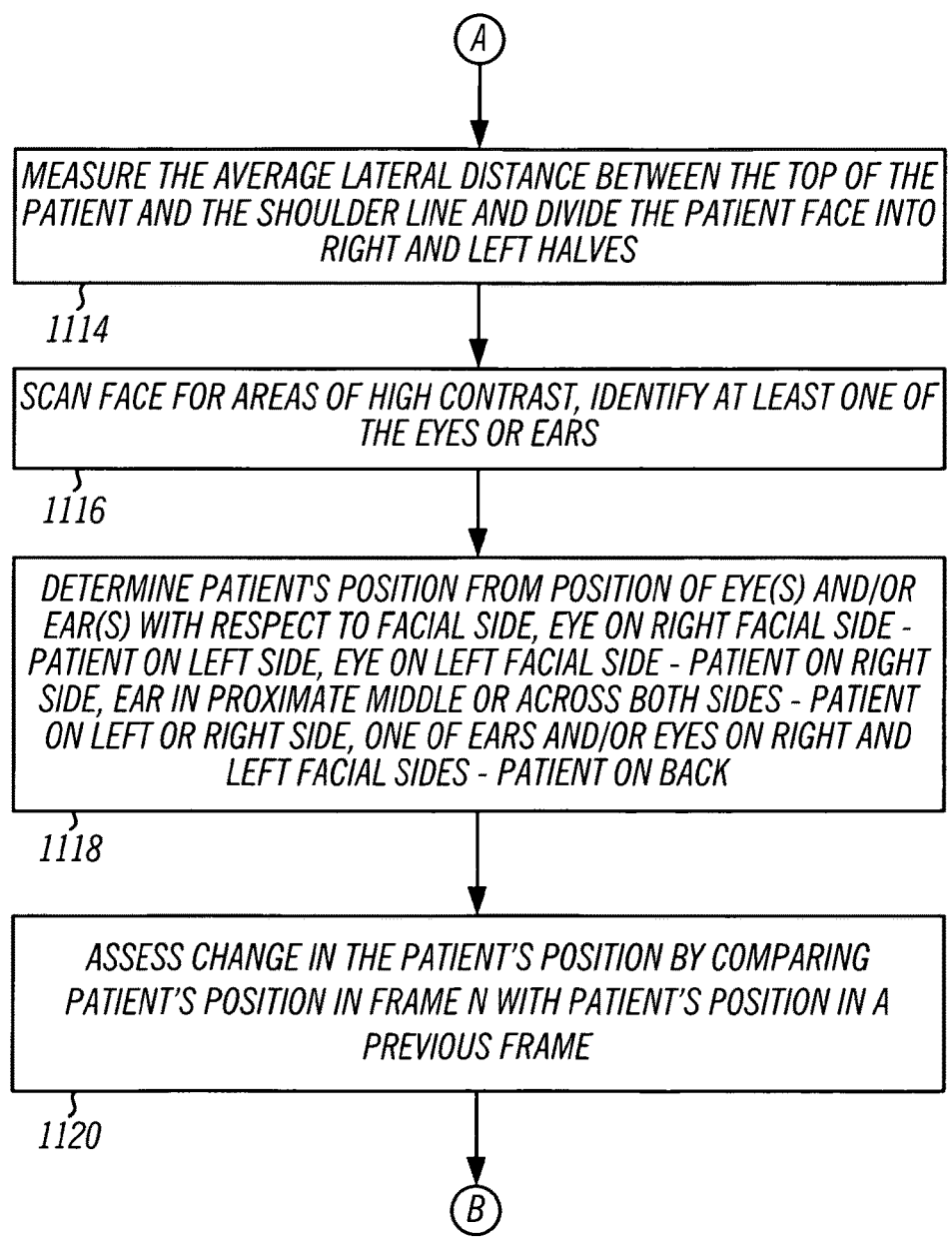

FIG. 14
AUTOMATED PROCEDURE FOR ACCESSING CHANGES IN PATIENT'S POSITION FROM ORIENTATION OF PATIENT SHOULDERS (11A)

OBSERVE THE SHOULDER LEFT AND RIGHT PATTERNS, THE VERTICAL POSITION OF THE SHOULDER LINE CREATED THERE FROM AND MEASURE ORIENTATION OF THE SHOULDER LINE

1412

DETERMINE PATIENT'S POSITION BY DISTINGUISHING THE SHOULDER PATTERN AND POSITION AND/OR VERTICAL POSITION AND ORIENTATION OF A SHOULDER LINE:

- POSITIONED WELL BELOW FACE, LINE VERTICAL AND/OR THE LEFT SHOULDER PATTERN VISIBLE ON THE PATIENT'S LEFT AND THE RIGHT SHOULDER PATTERN VISIBLE ON THE PATIENT'S RIGHT- PATIENT ON BACK

- LINE POSITIONED BELOW FACE AND LOWER ON RIGHT - PATIENT QUARTER TURNED TO RIGHT     +-45DEGS.

- LINE POSITIONED BELOW FACE, LINE LOWER ON LEFT - PATIENT QUARTER TURNED TO LEFT     +-45DEGS

- LINE POSITIONED ABOVE OR NEAR FACE AND LOWER ON PATIENT'S RIGHT OR ONLY THE LEFT SHOULDER PATTERN VISIBLE- PATIENT ON LEFT SIDE

- LINE POSITIONED ABOVE OR NEAR FACE AND LOWER ON PATIENT'S LEFT OR ONLY THE RIGHT SHOULDER PATTERN IS VISIBLE- PATIENT ON RIGHT SIDE

- LINE OR ONE PATTERN IS POSITIONED ABOVE OR NEAR FACE AND THE PATTERN IS NOT DISTINGUISHABLE AS LEFT OR RIGHT SHOULDER- PATIENT ON EITHER LEFT OR RIGHT SIDE

1414

ASSESS CHANGE IN THE PATIENT'S POSITION BY COMPARING PATIENT'S POSITION IN FRAME N WITH A PATIENT'S POSITION IN A PREVIOUS FRAME

1416

(B)

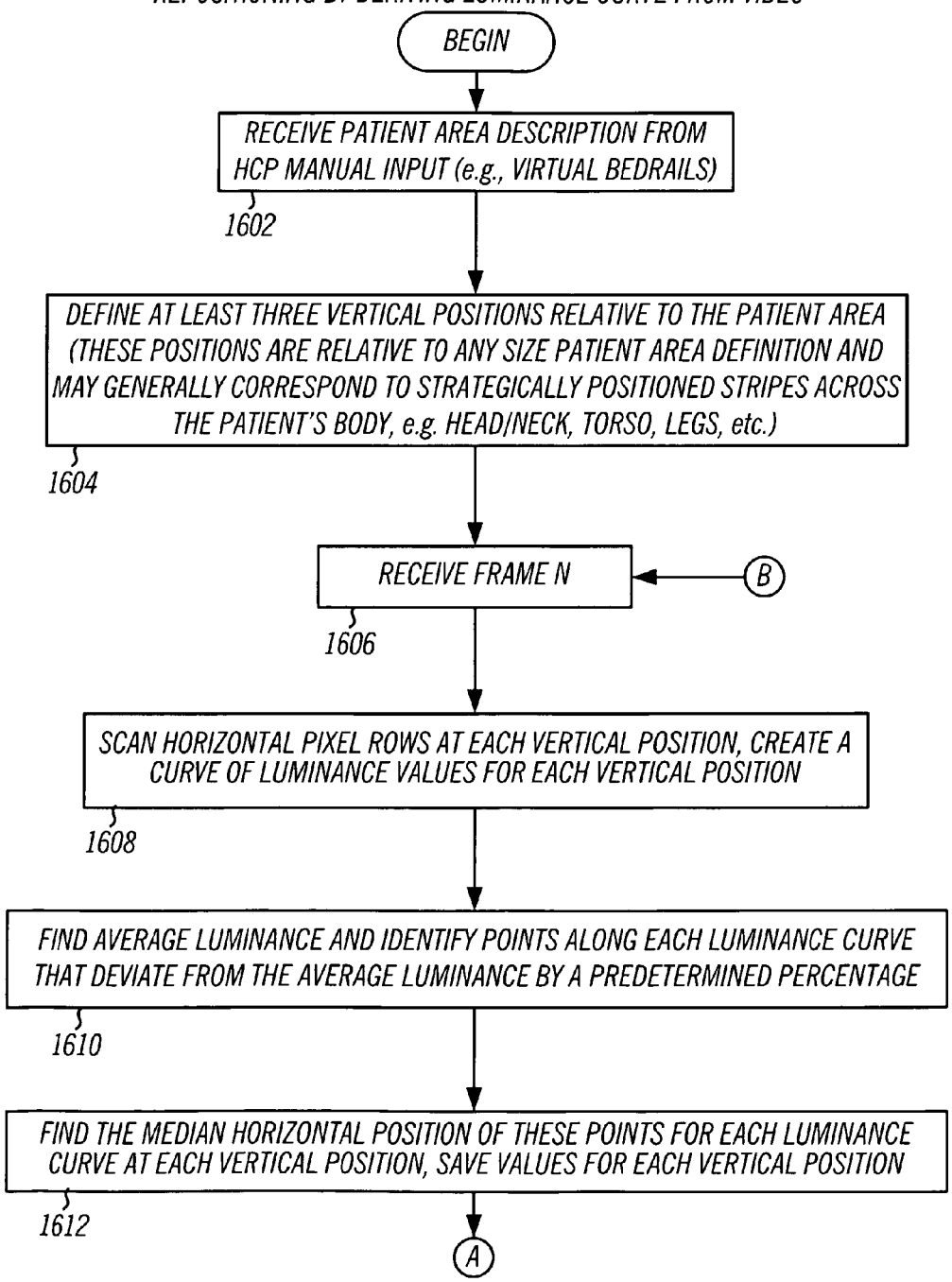

AUTOMATED PROCEDURE FOR DETECTING PATIENT
REPOSITIONING BY DERIVING LUMINANCE CURVE FROM VIDEO

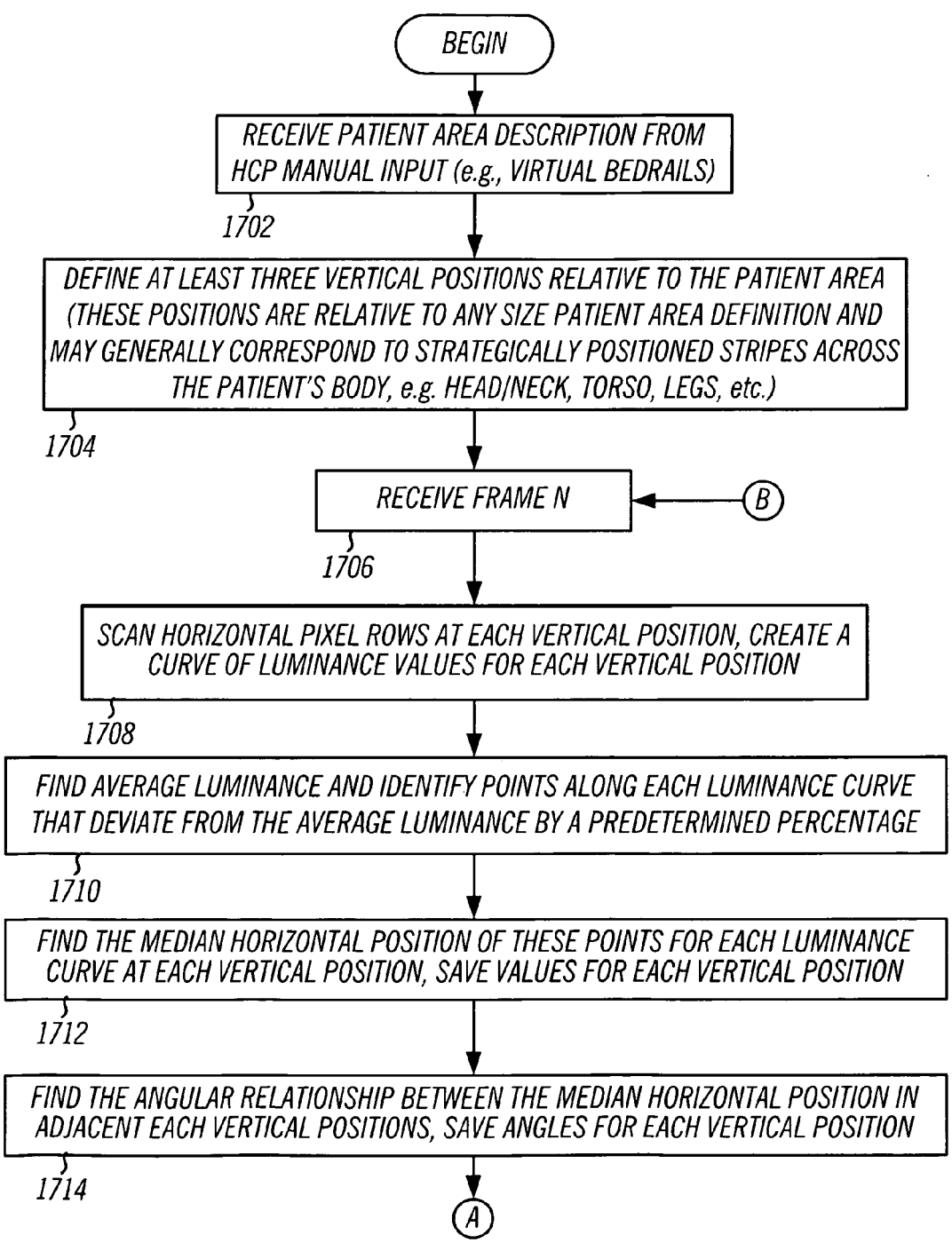

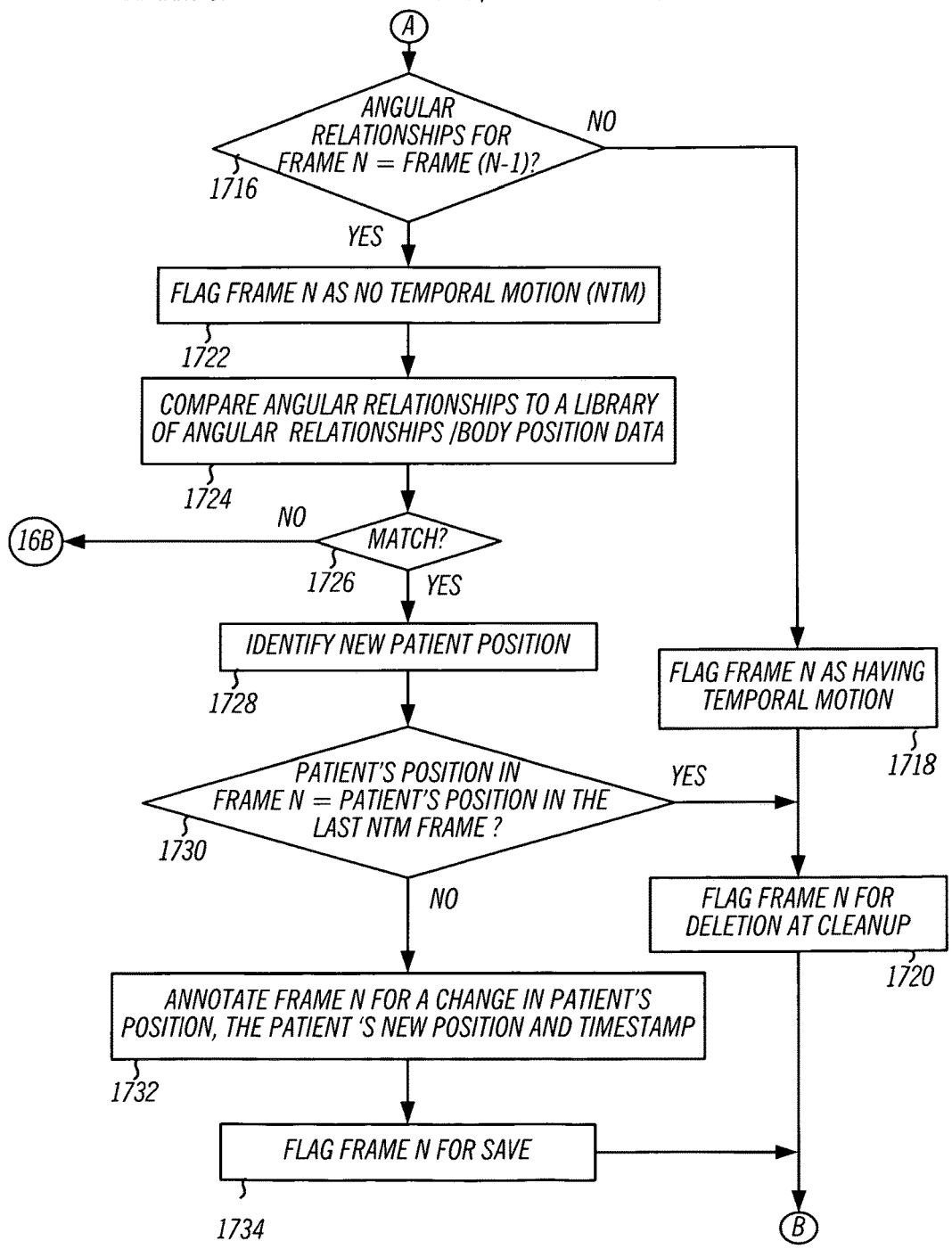

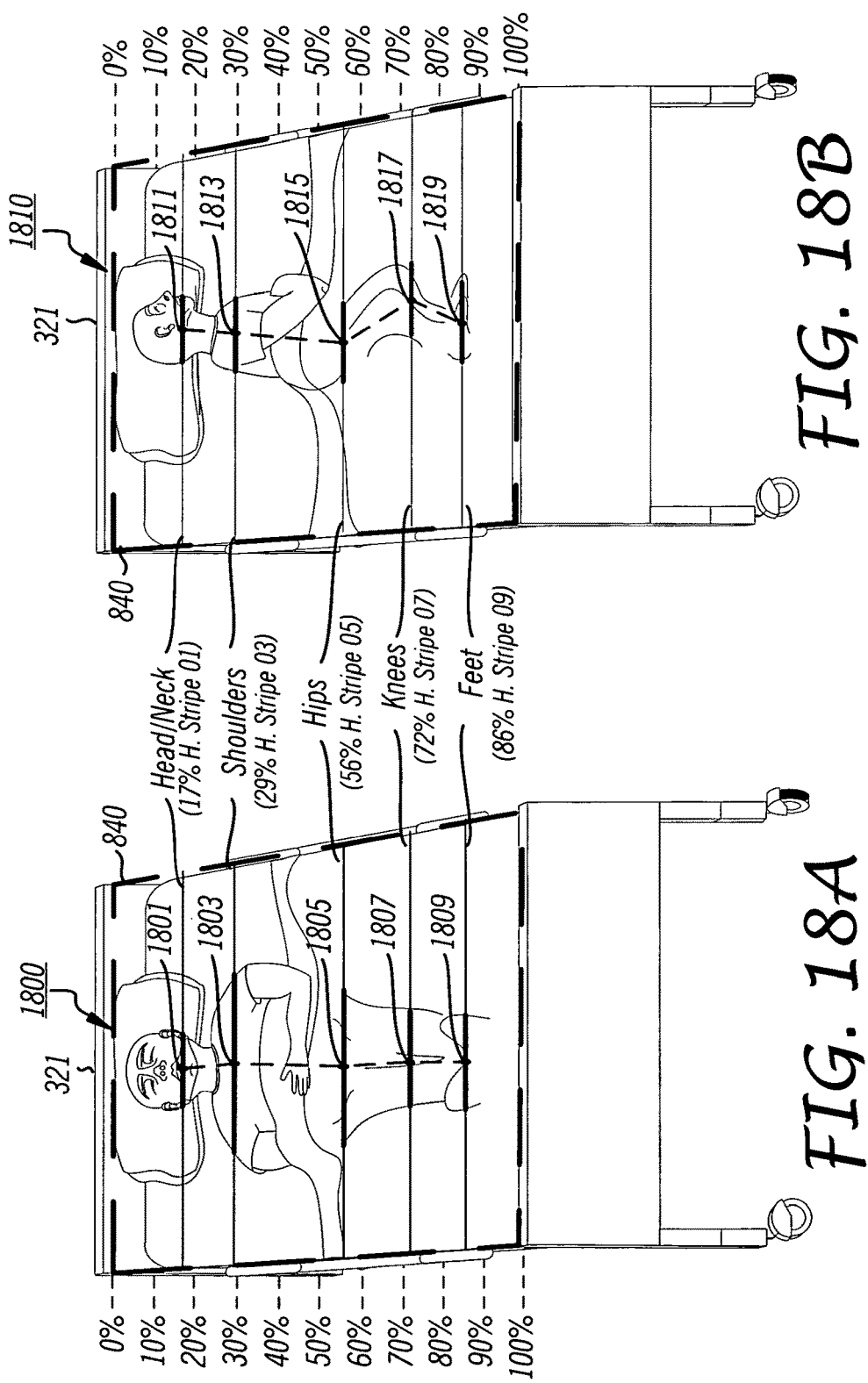

| LINE | 1800 | 1810 | 1820 | |
|---|---|---|---|---|
| 17 | 31 | 36 | 30 | ~01 |
| 29 | 31 | 36 | 30 | ~03 |
| 56 | 29 | 31 | 29 | ~05 |
| 72 | 28 | 36 | 19 | ~07 |
| 86 | 27 | 30 | 22 | ~09 |

| LINE | BACK | LEFT QUAR | LEFT SIDE | RIGHT QUAR | RIGHT SIDE | |
|---|---|---|---|---|---|---|
| $V_{1-2}$ | 178 | 186 | 186 | 174 | 174 | ~2102 |
| $V_{2-3}$ | 181 | 185 | 184 | 175 | 176 | ~2104 |
| $V_{3-4}$ | 179 | 167 | 154 | 193 | 206 | ~2106 |
| $V_{4-5}$ | 118 | 193 | 198 | 167 | 172 | ~2108 |

2012  2014  2016  2018  2020

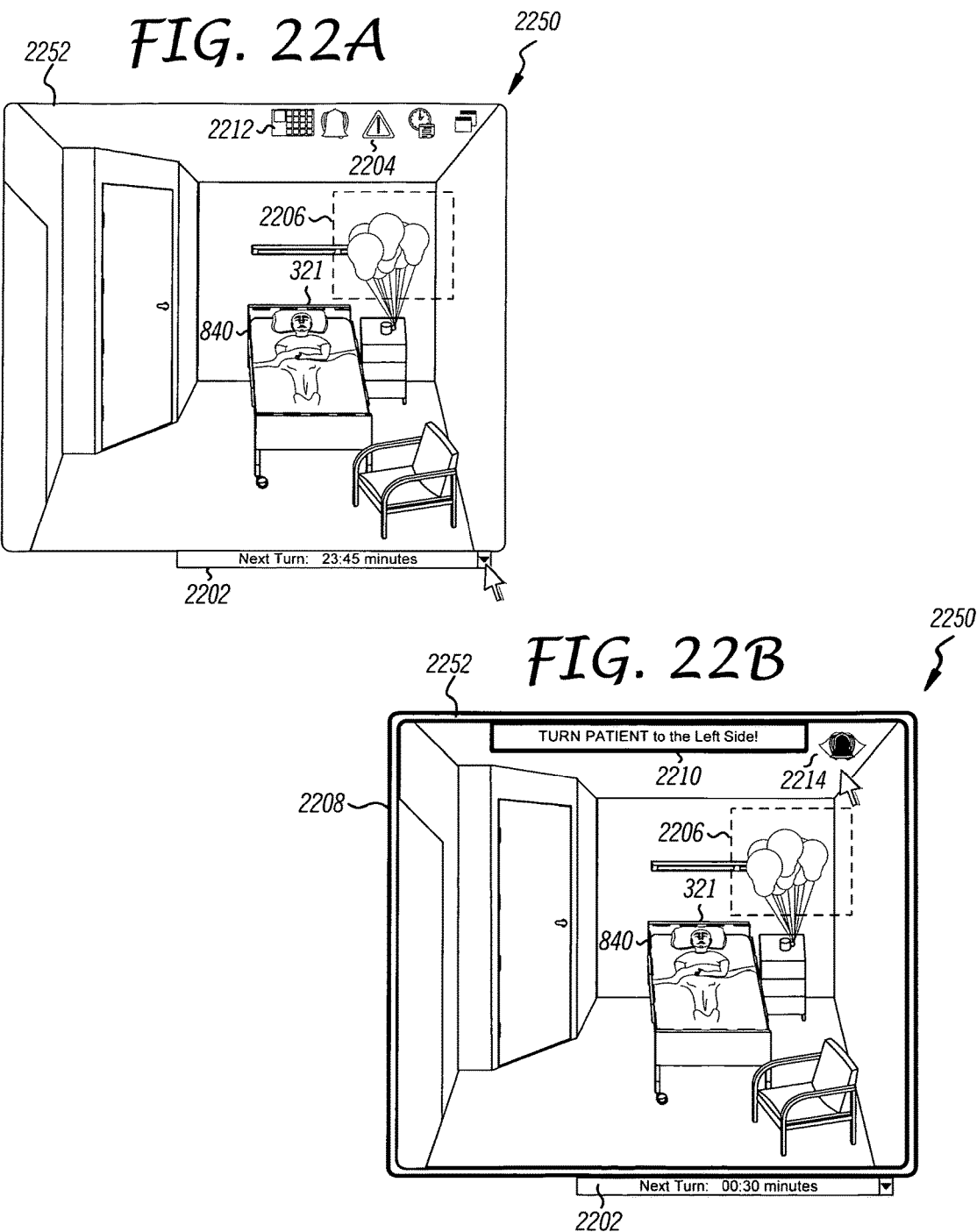

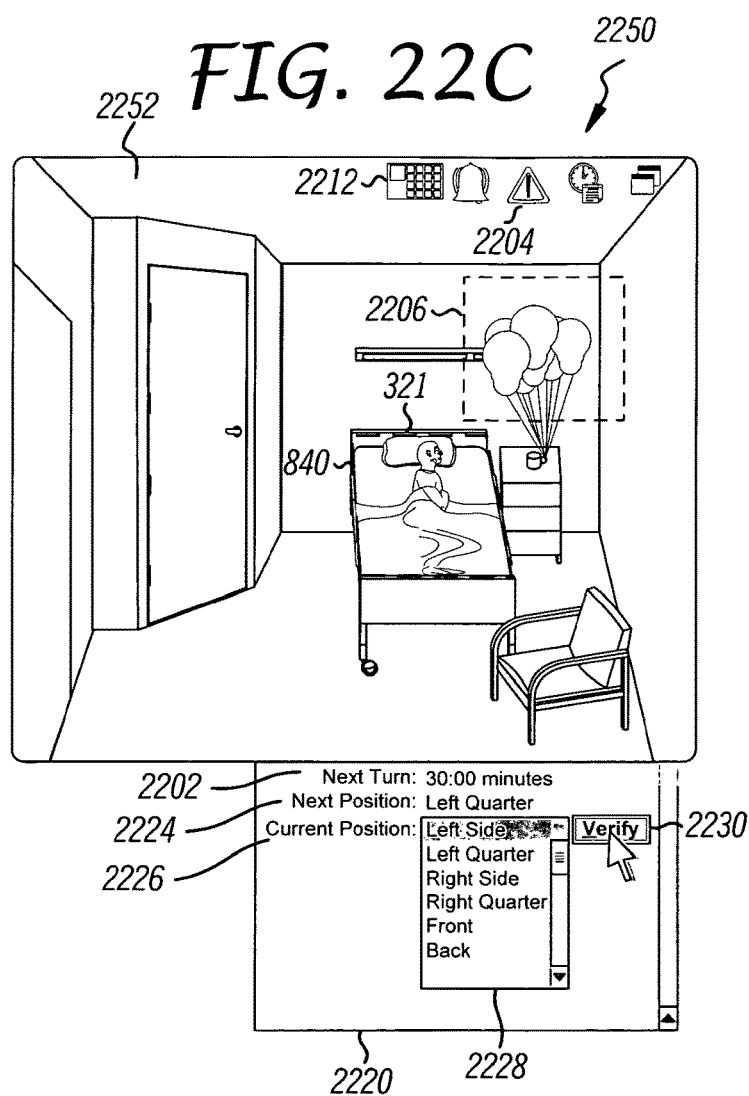

CREATING PATIENT HISTORICAL POSITION RECORD

COMPILING PATIENT HISTORICAL POSITION RECORD

SYSTEM AND METHOD FOR USING A VIDEO MONITORING SYSTEM TO PREVENT AND MANAGE DECUBITUS ULCERS IN PATIENTS

CROSS-REFERENCE TO RELATED APPLICATION

This application is a continuation of U.S. patent application entitled, "System and Method for Using a Video Monitoring System to Prevent and Manage Decubitus Ulcers in Patients", having application Ser. No. 12/804,774, and filed on Jul. 29, 2010, currently pending.

BACKGROUND OF THE INVENTION

Bed sores are lesions that form in the derma. Bed sores are often referred to as pressure ulcers or decubitus ulcers, sometimes improperly, as they may also be caused by forces other than pure pressure, such as shear and friction forces. These lesions may be caused by a number of different types of tissue forces, 1) pressure, or the compression of tissues; 2) shear force, where a patient's skin remains stationary while the deep fascia and skeletal muscle move, usually downward due to gravity; and 3) friction, or a force resisting the shearing of skin. The frequency, severity and duration of decubitus ulcers may be aggravated by humidity; temperature; age; continence and medication. While decubitus ulcers may erupt on any part of the body, they are especially prone on portions of the body over bony or cartilaginous areas such as hips, spine, lower back area, shoulders, sacrum, elbows, knees, ankles and heels.

Of the three tissue forces, decubitus ulcers occurring from pressure are the most prevalent, and some experts insist, are the most easily preventable and treatable type of wound. Pressure, or compression sores are caused by the weight (or force) of a portion of the body (usually proximate to a bone) against a surface. A patient is most at risk of forming or worsening of decubitus ulcers by remaining in a decubitus (recumbent) position for a lengthy period without moving. Essentially, blood circulation to an area is restricted by the pressure exerted on the tissue, usually located between a bone and the surface of a bed. An open lesion can form in as little as two or three hours. After an extended amount of time with decreased tissue perfusion, ischemia occurs and can lead to tissue necrosis if left untreated. Obviously, bedridden patients, who cannot reposition themselves, are among the most susceptible to develop pressure sores on their body.

The National Pressure Ulcer Advisory Panel (NPUAP) has categorized pressure ulcerations into four distinct stages: Stage I is the most superficial, indicated by non blanchable redness that does not subside after pressure is relieved. Stage II is damage in the form of a blister or abrasion to the epidermis extending into, but no deeper than, the dermis. Stage III involves the full thickness of the skin and may extend into the subcutaneous tissue layer. Stage IV pressure ulcer is the deepest, extending into the muscle, tendon or even bone. With higher stages, healing time is prolonged. For instance, while approximately 75% of Stage II ulcers heal within eight weeks, only 62% of Stage IV pressure ulcers ever heal, and only 52% heal within one year. (see Thomas D R, Diebold M R, Eggemeyer L M (2005). "A controlled, randomized, comparative study of a radiant heat bandage on the healing of stage 3-4 pressure ulcers: a pilot study". J Am Med Dir Assoc 6 (1): 46-9. doi:10.1016/j.jamda.2004.12.007. PMID 15871870). Therefore, it is imperative for the patient that: 1) the occurrence of decubitus ulcers be prevented; and 2) decubitus ulcers that have formed be aggressively treated and the treatment and progression of the sores monitored. Furthermore, while it was once accepted that decubitus ulcers form at the surface of the skin, which first begins to deteriorate and then proceeds inward toward deep tissue, it is now believed that the ulcers begin at the deepest tissue level, around the bone, and move outward until they reach the epidermis. Hence, once a bed sore becomes visible, there may be a significant amount of hidden tissue damage.

The Agency for Health Care Policy and Research has promulgated a set of clinical practice guidelines with recommendations for the prediction, prevention, and early treatment of pressure ulcers in adults and which provides a summary of supporting evidence for each recommendation. AHCPR. (1992, May). Panel for the Prediction and Prevention of Pressure Ulcers in Adults. Pressure Ulcers in Adults: Prediction and Prevention. Clinical Practice Guideline, Number 3. AHCPR Publication No. 92-0047. Rockville, Md.: Agency for Health Care Policy and Research, Public Health Service, U.S. Department of Health and Human Services. Level VI: Expert Panel Concensus.

The prevention and treatment of decubitus ulcers had escaped medical professionals for centuries, even though they presented a significant patient mortality risk, until Doreen Norton, FRCN (1922-2007) used research to demonstrate that the best prevention and treatment for decubitus ulcers was removing the pressure on the patient by turning the patient. "Turning" refers to exactly what it sounds like, turning the patient, or changing the patient's position, to prevent the build-up of pressure on the skin that can result in the loss of circulation. Since Doreen Norton's research, turning has been universally accepted as the most important factor in bed sore prevention. Yet, despite its universal acceptance, many healthcare facilities (hospitals and nursing homes) fail to properly implement turning techniques.

Recently, patient decubitus ulcers have become a hotspot for malpractice litigation primarily due to three factors: sympathetic plaintiffs (often bedridden or immobile patients); the demonstrability of the harm (decubitus ulcers are easily memorialized in pictures that convey credible record of harm to the plaintiff); and finally, it can be readily demonstrated that the treatment of the vast majority of cases is a simple protocol of evaluating the severity of the sore, implementing a turning regimen and monitoring the results. Juries are rightly concluding that the cost of prevention and treatment of decubitus ulcers is very low in comparison to the extreme harm that results from no or ineffective treatment. Another complication related to decubitus ulcers is their classification as 'Never Events', which are events defined by Medicare and the insurance industry as events that should never happen in a hospital. Because patient decubitus ulcers are considered to be completely preventable, most insurers will not reimburse healthcare facilities for the cost of treating patient's decubitus ulcers that erupted during a patient stay. If the hospital allows a patient to develop a bed sore, the hospital is responsible for all subsequent care for that sore.

To that end, some healthcare facilities have implemented specific steps to reduce the occurrence and severity of bed sores, and hence any potential costs and liability. Firstly, and perhaps most important is to identify and document the location(s) and severity of decubitus ulcers on all new admissions. Next, a related step is to encourage the staff to look for and document bed sores, even in their earliest stages. Moreover, any staff member, regardless of their job, is encouraged to alert physicians and supervisors of patients with bed sores, even the early signs of bed sores. Patients who are bed bound or whose skin comes into contact with medical equipment like oxygen masks or tubing deserve additional attention from the staff. Finally, many healthcare facilities also implement a strict wound prevention protocol for implementing daily skin checks, a patient repositioning regimen, followed up by intensive, hospital-wide skin checks on a regular basis to assess the effectiveness of the protocol.

Turning, or repositioning a patient, is a relatively uncomplicated concept, however properly implementing turning techniques is hard, labor-intensive work.

Consequently, patient turning is often performed haphazardly at irregular intervals, without any objective means for documenting the procedure, or oversight from the healthcare facility. Ideally, patient turning should be completed at intervals set forth by a physician and in the manner prescribed by the physician. Moreover, the healthcare facility should have minimum guidelines for preventing the occurrence of bed sores without specific patient orders from a physician. For instance, the turning of patients at least every two hours is often considered to be the minimally accepted interval. Depending on the condition of the patient, turning may be required more frequently. Ideally, the patient turns himself to the correct position at the prescribed interval. However, many bedridden patients cannot accomplish this task without assistance, so the healthcare facility staff should reposition the patient in accordance with directions from the attending physician or facility guidelines. Additionally, for patients who spend a significant amount of time in wheelchairs, the healthcare facility staff periodically removes the patient from their seat and then repositions the patient in the wheelchair, again, at the interval and as directed by the attending physician.

Implementing bed sore abatement regimen has been a manually intensive procedure, as has been protocols for documenting the regimen. Typically, a physician prescribes a particular turning regimen for a specific patient. Ideally, the bed sore prevention regimen can be integrated seamlessly into the caregiver's routine without any additional patient visits that might interfere with the routines of other patients. As a practical matter, however, most turning regimens require between three and eight additional patient visits per twelve hour shift. Because each patient assigned to a healthcare provider may have a unique turning interval (also referred to hereinafter as an intervention interval, healthcare professional intervention interval and nurse intervention interval), keeping the separate patient turning schedules is problematic. Thus, conflicts between patients' turning schedules are commonplace, with the labor-intensive turning procedures usually being subservient to more effortless care.

Furthermore, the staff is rarely aware of any unaided patient movements that might satisfy the turning protocol. The penchant for postponing or outright skipping turning procedures in view of seemingly conflicting and less strenuous patient care can be mitigated somewhat by a rigorous bed sore prevention documentation procedure and strict oversight. When healthcare professionals are held strictly accountable for implementing the regimen, they rarely falter. Of course, oversight is yet another manually intensive task that consumes valuable time from supervisory personnel. Hence, the documentation of turning and turning intervals is usually an additional responsibility assigned to the same healthcare professionals responsible for turning the patient. Obviously, this encourages fraudulent reporting, especially in situations where the caregiver is exceptionally busy, overworked or detained with more serious patient matters.

Recently, there has been a trend to automate scheduling and documentation of the bed sore prevention regimen. However, many of these efforts involve essentially recycling known technology for the prevention of bed sores. U.S. Pat. No. 7,378,975 entitled "Method and Apparatus for Mitigating the Risk of Pressure Sores," issued to Smith, et al. on May 27, 2008 discloses using a pressure sensor (such as a pressure-sensitive bed mat) in conjunction with a timer to alert healthcare professionals to the expiration of a turn interval for the patient. The use of pressure sensors for assessing a patient's presence on a bed for other support structures is extremely well known for patient fall detection. Smith, et al. describe a method that integrates patient movement detection into a fall detection procedure for alerting the healthcare staff of the expiration of a patient turn interval. Essentially, the patient pressure sensor mat senses the position of a patient by individual electrical contacts within the mat. Initially, a patient's position on the sensor mat is assessed and a turn timer reset for the turn interval. The turn timer continues to count down to the turn time unless a change is sensed at the pressure sensor mat. That change may involve movement indicative of a turn, movement indicative of the patient exiting the bed or movement not indicative of a turn. Once movement is sensed it is analyzed to determine if the patient left the bed, If so an alarm sounds and the turn timer is reset. If not, the system invokes a subroutine to determine if the movement is significant. A "significant move" is defined as a patient movement to a new location that is maintained long enough to re-oxygenate the at risk tissue. Hence, if a patient movement is determined to be to a new location on the pressure sensitive mat, apparently a second timer is initiated for testing the time at the new location. If sufficiently long, the turn timer resets the turn interval. If not, the turn timer continues counting the turn interval. Smith, et al. also suggests the use of infrared and ultrasonic motion sensors, as well as a conventional or infrared video camera for sensing patient movement.

The Smith, et al. invention has two distinct advantages over the prior art. Firstly the turning regimen prescribed for a patient may be satisfied by unaided patient movements, thereby eliminating duplicative and unnecessary turning. Secondly, the healthcare staff is automatically alerted to the expiration of a turn interval, regardless of when or how the interval commenced. In so doing, the attention of the staff is only necessary when turning is actually necessary.

The shortcomings with the prior art is that the detected patient movement may not actually satisfy the turning protocol, yet the turn timer may reset. Additionally, turning, or patient movement, is not documented. Documentation, with the exception of possibly noting the issue of a turn alert, apparently remains the responsibility of the turn staff. Finally, the Smith, et al. invention is directed to a labor-saving device that, based on certain parameters in the system, postpones caregiver turning.

BRIEF SUMMARY OF THE INVENTION

The present invention relates generally to a surveillance system and method for monitoring patients, assessing patient positions and documenting patient bed sore procedures implemented by the healthcare facility. More particularly, the present invention relates to a system, method and software program product for determining a patient's position from changes detected between video frames of a surveillance video.

A video monitoring system captures image frames of a patient in various positions. The captured image frames are analyzed by the system for patient movement and/or changes in a patient's position, Frames in which the system detects one or both of patient movement and repositioning are retained. The system analyzes an optional area of interest within each image frame that corresponds to an area in the camera's view filed with the patient. Sequential image frames are compared for motion, only frames without motion, where the patient is still, are analyzed. Analysis techniques include selecting a plurality of vertical positions on the area of interest, each vertical position corresponding to a part of the patient body indicative of the patient's position, horizontally scanning values along the horizontal pixel row at each vertical position in the area of interest, finding an average value for each vertical position and identifying a patient interval of the horizontal pixel row having pixel values different from the average and a representative median horizontal position of the patient interval for each vertical interval. Then, comparing those representative horizontal positions from a current image frame to the representative median horizontal positions for corresponding vertical positions from a previous image frame to determine a change in the patient's position. Alternatively, the angular relationship between the representative horizontal positions are calculated and compared to a library of angular relationships for known body positions. The monitoring system also alerts the healthcare professional each time the patient should be repositioned based on a patient repositioning schedule. The video monitoring system automatically retains an image frame for each scheduled repositioning event.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 1 is a flowchart depicting a procedure for the prevention and treatment of decubitus ulcers in accordance with the prior art;

FIG. 2 is a diagram of the logical components used in the present patient movement monitoring system for the prevention and treatment of decubitus ulcers in accordance with still another exemplary embodiment of the present invention;

FIG. 4 is a diagram of a flowchart illustrating a process for implementing a semiautonomous video patient repositioning procedure in accordance with an exemplary embodiment of the present invention;

FIG. 5 is a flowchart depicting a process for a procedure for prevention and/or treatment of decubitus ulcers using generic video analysis in accordance with an exemplary embodiment of the present invention;

FIGS. 6A and 6B illustrate a lower level view of a process for implementing a procedure for prevention and/or treatment of decubitus ulcers using generic video analysis in which alert events and decubitus ulcer procedure events are illustrated with regard to a current image frame in accordance with an exemplary embodiment of the present invention;

FIGS. 9A and 9B depict a flowchart illustrating a method for assessing changes in the position of a patient using video by evaluating discrete zones in accordance with an exemplary embodiment of the present invention;

FIGS. 11A and 11B are a flowchart depicting a process for assessing a patient's position by detecting the position and/or orientation of facial features in a video frame in accordance with an exemplary embodiment of the present invention;

FIG. 14 is flowchart depicting a process for assessing a patient's position by detecting the positions and orientation of the patient's shoulders in a video frame in accordance with another exemplary embodiment of the present invention;

FIGS. 16A and 16B are flowcharts depicting a process for assessing changes in a patient's position by detecting parts of a patient's body represented in a video frame that lie along one of a plurality of discrete horizontal lines in accordance with an exemplary embodiment of the present invention;

FIGS. 17A and 17B are flowcharts depicting a process for assessing a patient's position by representing the patient's body, from a representation in a video frame, as a patient position curve comprising line segments oriented from each other at particular orientations that may be referenced to a library of patient position angular orientations in accordance with an exemplary embodiment of the present invention;

FIGS. 18A-18C diagrammatically illustrate the area of interest superimposed on the patient's bed, in a video frame, with a plurality of horizontal stripes in accordance with an exemplary embodiment of the present invention;

FIG. 19 is a table that depicts the horizontal positions of the patient at the five discrete horizontal lines in accordance with an exemplary embodiment of the present invention;

FIGS. 22A, 22B and 22C are three screenshots of the video monitoring interface in response to different decubitus ulcer procedure events in accordance with exemplary embodiments of the present invention;

Figure 3:
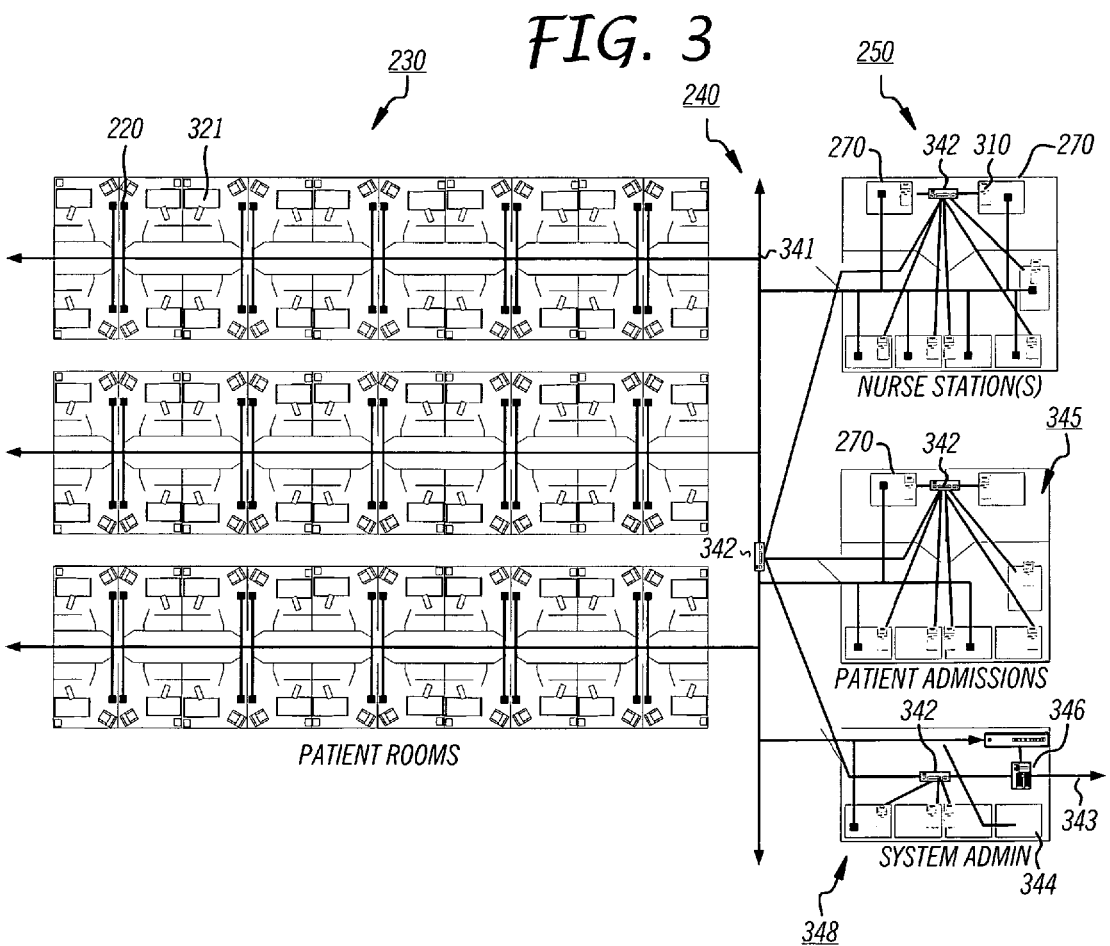
FIG. 3 is a diagram of an exemplary healthcare facility (HCF) in which the present patient movement monitoring system may be implemented in accordance with the exemplary embodiments of the present invention.

Other features of the present invention will be apparent from the accompanying drawings and from the following detailed description.

DETAILED DESCRIPTION OF THE INVENTION

| Element Reference Number Designations |
|---|
| 200: Patient movement monitoring system |
| 210: Camera control device |
| 211: Processor unit |
| 212: Network controller |
| 213: Video processor |
| 214: Primary nonvolatile memory |
| 215: Secondary nonvolatile memory |
| 216: Video camera |
| 217: Video monitor |
| 218: Medical procedure remote interface |
| 220: Local surveillance sub-system |
| 222: Medical procedure remote interface |
| 224: Autonomous sensing device |
| 226: Medical procedure/pillow speaker interface |
| 230: Patient room |
| 240: Distribution network |
| 250: HCF (Nurse) station |
| 260: Nurse monitor device |
| 261: Processor unit |
| 262: Network controller |
| 263: Video processor |
| 264: Primary nonvolatile memory |
| 265: Secondary nonvolatile memory |
| 266: Video camera |
| 267: Video monitor/touchpad |
| 268: Audible alarm |
| 269: Manual interface device |
| 270: Patient monitoring system |
| 310: General purpose computer |
| 321: Patient bed |
| 341: Transmission medium |
| 342: Network switch |
| 343: Broadband connection |
| 344: Network storage |
| 345: Patient administration |
| 346: Network server/router/firewall |
| 348: Network system administration |
| 700: ProcedureView screenshot |
| 701: Procedure comments |
| 702: Auto patient position selection |
| 704: Patient alarm selection |
| 706: Patient movement selection |
| 708: Position sample frame time |
| 709: Rolling time interval selection |
| 710: Patient turn schedule |
| 712: Patient position/time selections |
| 714: Position cycle summary |
| 720: Date/Time/Room |
| 730: Procedure information |
| 740: Patient information |
| 832: Pointer |
| 840: Area of interest |
| 1010: Vertical axis |
| 1012: Horizontal axis |

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals.

For simplicity, certain terms will be used synonymously throughout the specification and in the claims. For instance, the term "bed sore" will be used synonymously with pressure sore, pressure ulcer and decubitus ulcer even though there may be slight technical differences and medical definitions of the terms. Likewise, for inclusiveness, personnel with responsibility for or duty to a patient or resident will be referred to internally as a healthcare facility (HCF) staff, professionals or both, regardless of whether that person's vocation is that of a physician, nurse, therapist, aide (or nurses' aid), administrator or any other type of healthcare worker that interacts with the patient or resident for the purposes of providing or facilitating a healthcare service. It should, however, be appreciated that given the nature of certain aspects of the present invention, that the HCF staff may not necessarily be present on the facility campus but may be present at a remote site, such as an office for a physician, insurance compliance agent, lawyer, facility manager, etc. Additionally, the description of the present invention is better understood in relation to certain events that may or may not occur in accordance with a procedure for the prevention and treatment of decubitus ulcers. These events are referred to synonymously, among other terms, as repositioning events, turn events, decubitus ulcer events, decubitus ulcer procedure events, movement events, motion events, or any event that might define an action or omission relating to a procedure for, prevention of or treatment of decubitus ulcers. These events are memorialized videographically, on individual video frames, sequences of video frames or some combination of the two. While the present invention will be described largely with respect to a video frame or frames, a single video frame may contain additional information such as audio and annotated information, either manually input or derived automatically by the system, timestamps, etc., or alternatively a group of video frames may be collected as a file of related data that also contains additional related information, i.e., audio, annotated information, timestamps, etc. Still further, the term "healthcare facility" will be used synonymously with any facility in which the patient/resident receives medical treatment such as a hospital, clinic, nursing home, long term care facility (typically a facility for treating specialized ailments other than age, such as severely disabled or paraplegic patients, comatose patients, end-of-life patients, etc.) and may in fact extend to the assisted living facilities and patient's home or residence in cases in which ongoing care is provided in a non-hospital patient/resident setting (such as for hospice and care for Alzheimer's victims). Importantly, the present invention is directed to reducing and/or treating bed sores, therefore, the terminology used herein to describe the invention should not limit the intended scope of the invention or components or the function of components used therein.

FIG. 1 is a flowchart depicting a procedure for the prevention and treatment of decubitus ulcers in accordance with the prior art. Typically, the prior art procedure is largely non-automated and very labor intensive, usually requiring a healthcare professional or facility staff (HCF staff) to make observations of the patient at regular intervals, record observations in the patient record, turn (or reposition) the patient at scheduled time intervals and finally record the patient's repositioning. Essentially, the procedure begins with the receipt of a patient order for the prevention and treatment of decubitus ulcers that includes patient positions and a turn schedule for HCF staff interventions with time intervals corresponding to each unique position (step 102). Generally, a patient is allowed to remain in a particular position for only a predetermined amount of time, perhaps 50 minutes, and then should be repositioned. An order usually lists a sequence of patient positions with the corresponding time in the position, for instance: Back—30 minutes; Left Quarter—15 minutes; Left Side—15 minutes; Right Quarter—15 minutes; and Right Side—15 minutes. In the foregoing example the patient will be repositioned five times over a one hour and thirty minute repositioning cycle schedule. In that case the HCF staff sets the repositioning alert (step 104), for instance 30 minutes until the patient should be repositioned from the back to the left quarter in accordance with the exemplary patient order immediately above. The patient's record is updated with the patient's current position, currently on the back, and the time (step 106). The procedure then moves to the patient monitoring phase where the HCF staff continually monitors the patient's position (step 108), checks or verifies that it is not time to reposition the patient or that the patient has not repositioned himself contrary to the patient order (step 110) and records the observations in the patient record. These observations are necessary to ensure that the patient is not turning herself to a position between repositioning times that conflict with the turn schedule of the patient order and, if necessary, repositioning the patient back to a position specified in the patient order.

The aim of the patient repositioning procedure is to keep the patient off of parts of the body with existing decubitus ulcers, or where decubitus ulcers are prone to erupt, long enough to maintain (or reestablish) healthy blood flow at these sites (e.g., portions of the body over bony or cartilaginous areas such as hips, spine, lower back area, shoulders, sacrum, elbows, knees, ankles and heels). If the patient turns herself prematurely, contrary to the turn schedule, the attending HCF staff should return the patient to the correct position to ensure sufficient blood flow to vital tissue. Often a patient is uncomfortable on a quarter or side and will turn themselves to their back immediately after being turned away from that position by the HCF staff. This is especially common when the patient's view of visitors, reading materials or television is obstructed due to their position. As a consequence, if left unchecked the patient may spend substantially longer periods of time in the same position, precipitating the eruption of new or more severe decubitus ulcers.

In any case, the time is continually monitored by the HC professional. After the prescribed time interval has elapsed (step 110), the HCF staff repositions the patient to the next position in the turn schedule (step 112), resets the patient repositioning alert corresponding to the new position in the schedule (step 104) and updates the patient record to reflect the patient repositioning event and the time (step 106). The procedure then iterates through steps 108, 110 and 106 as described above until the prescribed time interval at that position has elapsed. The patient is then again repositioned in accordance with the patient order (step 112), and the alerts and patient record is updated (steps 104 and 106). The procedure continues unabated until the patient order is amended or canceled or the patient is discharged.

As may be appreciated from the forgoing, the prior art procedure for the prevention and treatment of decubitus ulcers is extremely tedious, manually intensive and prone to lapses in protocol and judgment by HCF staff. As the only record in support of a decubitus ulcer procedure being performed correctly is the written patient record, rarely will a record reflect lapses in the turning protocol. What is needed is a patient monitoring system that provides an unbiased and unassailable record of patient decubitus ulcer procedure events. What is needed is an automated patient bed sore system that independently documents patient movement and turning, without manual intervention from healthcare professionals. The record should be annotatable by authorized healthcare professionals. Additionally, the document record produced by the automated patient bed sore system should be protected from unauthorized alteration. Optimally, the system should accurately distinguish patient movement that satisfies the prescribed patient turning protocol from patient movement that does not. Ideally, the system should not only track healthcare professional intervention intervals, but also determine the orientation of the patient.

Therefore, in an effort to overcome the shortcoming of the prior art and to aid in the prevention and treatment of decubitus ulcers, a system and method for prevention and treatment of decubitus ulcers using a video monitoring system is presented. As will be described further below, the use of the present invention significantly decreases the amount of manual intervention necessary from the HCF staff by integrating the patient procedure order for the prevention and treatment of decubitus ulcers into the patient surveillance system, thereby, providing a real time view of the patient, alerting the HCF staff of patient-initiated repositioning events, automatically and simultaneously tracking both the time, elapsed time in a position, the current patient position and the next patient position as well as automatically alerting the HCF staff to scheduled repositioning events. Additionally, the present system and method for prevention and treatment of decubitus ulcers using a video monitoring system provides the HCF staff and others with a concise record of decubitus ulcer procedure events that can be reviewed as a sequence of annotated video frames without superfluous and unnecessary video. Finally, the present invention provides an attending HCF staff professional with a mechanism for rapidly reviewing the procedure over a predetermined time (perhaps a single repositioning cycle or a time interval) in order to quickly assess the state of the patient positioning in the turn cycle and the adherence to the patient order.

FIG. 2 is a diagram of the logical components used in the present patient movement monitoring system for the prevention and treatment of decubitus ulcers in accordance with an exemplary embodiment of the present invention. Typically, the presently described patient movement monitoring system 200 is implemented in a patient surveillance network, which usually comprises at least patient surveillance sub-system 220 and patient monitoring sub-system 270. Both patient surveillance sub-system 220 and patient monitoring sub-system 270 are available from CareView Communication, Inc. of Lewisville, Tex. As may be appreciated, the present patient movement monitoring system may also be implemented across several physical locations, such as patient room 230 (containing patient surveillance sub-system 220) and HCF or nurse station 250 (containing patient monitoring sub-system 270). The separate sub-systems may also be realized in virtually any location in the healthcare facility, such as the offices for patient administration, billing, medical records and network administration or even at off site locations such as at a healthcare provider's office, an insurance compliance agent's office, a lawyer's office, or on a mobile device capable of accessing the Internet such as a laptop, PDA, smartphone or other such net device, depending on the duties of the particular location. FIG. 3 is a diagram of an exemplary healthcare facility (HCF) in which the present patient movement monitoring system may be implemented.

The components that are typically located in patient surveillance sub-system 220, such as in patient room 230, include camera control device 210 that is usually juxtaposed to television 217, but its position is not essential to the practice of the present invention. In most patient rooms, television 217 is installed at a central location centered with the foot of the patient's bed, which is also a highly advantageous viewpoint location for installing surveillance camera 216. In accordance to one aspect of the present invention, surveillance camera 216 should be aligned lengthwise with the patient's bed, as close to centered as possible wherein the camera's view axis will equally subdivide the patient's position in the bed. The view angle with respect to the patient's bed should also be noted and considered during video processing as the vertical dimension of the patient is reduced as the view axis transcends 0 degrees (with the surveillance camera 216 positioned directly over the patient's bed) to the usual angle of approximately 30 degrees (with the surveillance camera 216 positioned on the wall in front of the patient's bed). The frontal placement of surveillance camera 216 changes the aspect (reduces the size) of the patient in the video frame by approximately half with respect to the overhead position (assuming 30 degrees view axis angle). Additionally, a microphone (not shown) may be disposed on surveillance camera 216 or medical procedure/pillow speaker interface 226 camera control device 210 or connected as a separate peripheral for capturing audio in the surveillance area. Hence, for many installations, camera control device 210, television 217 and surveillance camera 216 are loosely coupled together as a unit. In any case, camera control device 210 provides the local processing, storage and network connections for the surveillance peripherals and for the present patient medical procedure documentation system. Here it should be mentioned that much of the functionality of the present invention may be embodied in a standard personal computer, however, other aspects of the present invention may require supplemental video processing and/or storage capacity. Furthermore, as may be appreciated from the description of the set-top box in U.S. Pat. No. 7,477,825, issued Jan. 13, 2009, which is incorporated herein by reference in its entirety, and copending U.S. patent application Ser. Nos. 12/151,452 and 12/589,654, camera control device 210 may also have CATV, Internet, PSTN and other capabilities that are not traditionally found in a conventional personal computer.

With further regard to camera control device 210, processor unit 211 diagrammatically represents all the processing capacity, RAM and ROM memory, busses and the physical framework for storing and executing instructions for operating the other components of the control unit. Network controller 212 provides a connection to healthcare facility (HCF) distribution network 240 and to other devices connected to the HCF network, such as nurse monitor device 260 of patient monitoring sub-system 270. Video processor 211 comprises any video processing capabilities necessary for capturing, processing, video analysis and/or displaying any video and/or patient medical procedure documentation screens. Video processor 213 may be integrated in a general purpose processing system or supplement the video processing capabilities of the general purpose processing system. As such, video processor 211 is responsible for receiving the captured video frames from video camera 216, analyzing video for motion (see U.S. Pat. No. 7,477,825 and copending U.S. patent application Ser. Nos. 12/151,452 and 12/589,654), recognizing patients, patient areas and patient positions, prioritizing video frames based on content or external factors (such as labeling the frames as documentation for a patient medical procedure) and compiling medical procedure information screens for display on the local monitor, such as TV 217. Additionally, video processor 211 may also be capable of, by working in conjunction with the other subcomponents of camera control device 210, analyzing video image frames and comparing one frame with another for such attributes as detection motion in a frame or between frames, detecting patient movement motion in a frame or between frames, detecting a patient's position in a frame or between frames, inferring patient movement in a frame or between frames, identifying a patient's position in a frame, detecting patient repositioning in a frame or between frames and detecting, analyzing and identifying other motion in the patient's room that is not related to the patient.

Camera control device 210 also comprises receiver/interrogator and medical procedure remote interface 218 for communicating with a medical procedure sensing device (a manual or autonomous remote interface for sensing an event indicative of the commencement of a patient medical procedure). Optimally, receiver/interrogator and medical procedure remote interface 218 provides multiple communications ports for connecting with multiple types of medical procedure sensing devices, e.g., autonomous sensing devices 224, medical procedure remote interface 222, medical procedure/pillow speaker interface 226 and/or some type of legacy interface device. The medical procedure remote device may operate autonomously (usually by sensing the presence of the HCF staff through autonomous sensing devices 224) or manually by receiving manually invoked communication from an HC professional. In either case, the aim is for camera control device 210 to receive supplemental information indicative of the commencement (and possibly termination) of a patient medical procedure, such as turning the patient for the prevention treatment of decubitus ulcers in accordance with a patient order, turn schedule or general HCF ulcer prevention procedures. The receipt of this information enables camera control device 210 to flag any subsequently captured AN data as documentation for the information indicative of a patient medical procedure. Hence, that AN data may be prioritized and/or backed up locally for access in the future. To that end, camera control device 210 comprises at least one nonvolatile memory for temporarily storing AN data documentation of a patient medical procedure, for instance the prevention and treatment of patient decubitus ulcers.

As further depicted in FIG. 2, camera control device 210 further comprises primary nonvolatile memory 214 and optionally, secondary nonvolatile memory 215 for storing different classes of captured AN data. Generally, primary nonvolatile memory 214 is the designated archival storage from more important or higher priority surveillance data, while secondary nonvolatile memory 215 is a persistent system memory used for and by system processes. Hence, if persistence is not necessary, faster and cheaper volatile RAM can be substituted for the more expensive and slower flash memory of secondary nonvolatile memory 215. The storing operations of camera control device are generally discussed in U.S. Pat. No. 7,477,825 and copending U.S. patent application Ser. Nos. 12/151,452 and 12/589,654. It should be appreciated, however, that surveillance data received by camera control device 210 may comprise varying degrees of importance, and, therefore, treated differently depending on its importance and age. Although the operation of the present invention will be described throughout with regard to the "single path" approach of handling surveillance data (i.e., AN data comprising surveillance full-motion video and audio, if present), the surveillance data may instead be handled in a "two path" approach. The particular type of memory management and data retention technique is relatively unimportant for the practice of the present invention. Either of these approaches, or some other memory management approach may be utilized without departing from the scope of the presently described invention.

Typically, most surveillance data received by camera control device 210 is of relatively low importance and, therefore, need not be retained in primary nonvolatile memory 214. Using the single path approach, the surveillance data makes a single path from the capture device(s) to secondary nonvolatile memory 215 and finally, depending on its importance, to primary nonvolatile memory 214. Initially, captured surveillance data is temporarily retained in secondary nonvolatile memory 215 regardless of its importance for eventual transmission to monitoring device 260 for temporal monitoring by the HCF staff in near real time (such as a nurse at nurse station 250). Surveillance data that camera control device 210 recognizes as having a higher priority, such as documentations of patient medical procedures, is typically archived to primary nonvolatile memory 214 for retention, downloading and/or reviewing at a later time. Consequently, some of the data in secondary nonvolatile memory 215 is considered to have a relatively low priority. Low priority and older surveillance data in secondary nonvolatile memory 25 will be the first data to be overwritten by fresher surveillance data received at camera control device 210 (the decision of which surveillance data in secondary nonvolatile memory 215 to overwrite may be based on the results of the application of a weighted algorithm to the data). Additionally, some surveillance data received by camera control device 210 may be flagged for further review by the HCF staff, thereby increasing its importance, at least temporarily. That surveillance data is also stored in primary nonvolatile memory 214. This type of data might include AN data that failed to be immediately transmitted over distribution network 240 due to network bandwidth or operation issues. Various techniques may be applied to this data for achieving a rapid resolution to the problem, such as alarms, frame rate reduction and locally backing up the AN data. Hence, in the single path approach, only surveillance data of relatively high importance is archived in primary nonvolatile memory 214, while conversely, most or all of the surveillance data, regardless of its importance, is temporarily saved in secondary nonvolatile memory 215 to be, for example, available for system use. The system constantly analyzes the importance and age of the data in secondary nonvolatile memory 215 for archival in primary nonvolatile memory 214 and for overwriting with fresher surveillance data (using, for example, a weighted algorithm). Similarly, system also analyzes the importance and age of the data retained in primary nonvolatile memory 214 whenever additional archival space is needed for fresher high priority surveillance data.

Alternatively, using the two-path the surveillance data follows separate paths through camera control device 210. Initially, surveillance data (i.e., AN data comprising surveillance full-motion video and audio, if present) is recorded directly and continuously into secondary nonvolatile memory 215. The system periodically moves the surveillance data into the larger primary nonvolatile memory 214, where it archives the data indefinitely, or until it reaches the capacity of primary nonvolatile memory 214. Separately, camera control device 210 receives captured image frames from surveillance camera 216, and performs image analysis on those frames to support detection methods such as discussed below (in some cases the video format of the captured surveillance data will be converted to another format more suitable for video processing, such as from an MPEG specification standard format to a JPEG specification standard format). The still images and corresponding image data processed by the system are kept in a volatile memory (not shown) to allow for efficient processing. As useful patterns or events are detected through the image analysis, the system persists those events into a database in primary nonvolatile memory 214. The information persisted by these events includes at least the system timestamp, an offset for referencing into the currently recorded video, the type of event, any supporting data pertaining to that event, etc. Higher priority surveillance data in primary nonvolatile memory 214 will be associated with specific event information. Surveillance data in primary nonvolatile memory 214 without any associated event information has a lower priority and is subject to overwriting. At some point in time, usually determined by a weight algorithm, even high priority surveillance data is subject to overwriting with fresher and perhaps lower priority surveillance data.

On an ongoing basis, the system reviews the events associated with specific timestamps in the video, and uses a weighted algorithm to determine which segments of video are least important, and may be purged from the archival data retained in primary nonvolatile memory 214. The system then extracts the portions of the recorded video on primary nonvolatile memory 214 which are the least important as determined by the weighted algorithm, and deletes them. This allows the presently described patient movement monitoring system to maximize the effectiveness of the limited nonvolatile storage available, and retain as much video which would be necessary to review at a later date as possible.

Other classes of data that should be treated separately are surveillance data relating to patient medical procedures. One type of surveillance data is associated with information received by receiver/interrogator and medical procedure remote interface 218 that is indicative of a patient medical procedure. All surveillance data captured within a time window of the receipt of patient medical procedure information may be treated as documentary evidence of that patient medical procedure. Hence, surveillance data retained in secondary nonvolatile memory 215 prior to receiving the patient medical procedure information may be considered as documentation of a patient medical procedure and copied to primary nonvolatile memory 214 for more permanent storage.

Another type of data is information derived independently by camera control device 210 is that which is indicative of motion, patient movement or repositioning and other events that might be applicable to the prevention and treatment of decubitus ulcers, i.e., at least potential motion, patient movement and patient repositioning. This type of data are flagged for further review and/or verification by the HCF staff, but is also automatically saved to a secure memory, such as primary nonvolatile memory 214, a network database, or both, by a system process that is beyond the control of the HCF staff. Hence, video information related to the decubitus ulcer procedure events may be automatically, accurately and securely retained for documenting prevention and treatment procedures for decubitus ulcers.

Before proceeding, it should be mentioned that surveillance AN data may be retained in one of several formats. One retention format involves storing the sequentially captured image frames as separate image frame files. Patient procedure information received at patient surveillance subsystem 220 is included in the frame header for corresponding image frame. This retention format is useful for streaming video across the HCF distribution network; if documentation of a patient medical procedure is needed, each of the image frames in storage must be searched and returned separately. The returned AN frames may then be combined into a single surveillance AN documentation file for the procedure. A second type retention format is storing a group of related video image frames in a single surveillance AN file. Here, rather than duplicating the patient procedure information to each frame header, the information is saved with the file. For example, patient surveillance data for a medical procedure residing in secondary nonvolatile memory 215 that were captured within a predetermined time window are included in a single procedure documentation AN file. All NV data captured at patient surveillance subsystem 220 are bound to the procedure documentation AN file until an end-of-procedure event is logged. The end-of-procedure event may be any information indicative of an end of the patient medical procedure, for instance, receiving a manual command from the HCF staff to terminate the medical procedure NV data file, detecting the end of a predetermined time period, or by failing to detect any motion in the surveillance area for a predetermined time period, or any combination of the sub-processes described above. With further regard to either retention format, the aim is to create documentation of a patient medical procedure as a concise sequential, although not necessarily continuous, stream of surveillance data that can be easily identified as corresponding to a particular patient medical procedure.

It should be mentioned that, in some situations patient surveillance sub-system 220 automatically identifies video frames associated with a particular patient procedure without manual intervention from the HCF staff, e.g., the patient procedure for the prevention and treatment of decubitus ulcers patient. Unlike some medical procedures which store video frames based on, first, the medical procedure being initiated by the HCF staff, and then opening a predetermined time window associated with the procedure for retaining video frames for the subject procedure, the presently described procedure analyzes individual image frames and groups of frames for content related to the prevention and treatment of patient decubitus ulcers, (i.e., . . . decubitus ulcer procedure events) in accordance with the presently described invention. This is necessary because, in practice, the medical procedure for the prevention and treatment of patient decubitus ulcers is ongoing, although only certain "patient turning" events, alert events and timed sample events are of importance as documentation or for further review by the HCF staff and retention. These features will become more apparent from the description below.

In any case, it should be appreciated that exemplary nonvolatile memories 214 and 215 may be provided in various configurations, such as separate memory devices or partitions in a single memory. It should also be understood that camera control device 210 should have a nonvolatile memory for storing patient medical procedure AN data for future access. Optimally, secondary memory 215 is a nonvolatile memory that is capable of retaining data in the event of a power loss. However, in accordance with other exemplary embodiments of the present invention, secondary memory 215 may instead be configured as conventional RAM memory, wherein priority AN data is copied to a primary nonvolatile memory immediately (such as primary nonvolatile memory 214). While this configuration provides far less security for the priority surveillance AN data, utilizing smaller RAM memory is usually more economical than utilizing a nonvolatile flash memory. Additionally, a portion of secondary nonvolatile memory 215 may be allocated for use by video processor 213. In this configuration, even surveillance data being processed by video processor 213 will be retained in the event of a power failure. Here it should be mentioned that generally, access time for nonvolatile memory devices are significantly slower than for comparable volatile memory devices, hence a tradeoff exists between processing speed and persistence.

Surveillance system 220, including camera control device 210, along with its ancillary and peripheral components, is connected to a variety of physical locations (see FIG. 3), wherein the captured surveillance AN data may be monitored, retained or otherwise processed for the HCF. Virtually every surveillance system 220 on HCF distribution network 240 will be connected to a patient monitoring sub-system for dedicated monitoring (depicted in the figure as patient monitoring sub-system 270 of nurses station 250). In accordance with one exemplary embodiment of the present invention, nurse monitor device 260 of patient monitoring sub-system 270 may be configured identically to camera control device 210. In that case, nurse monitor device 260 generally comprises processing unit 261 for storing and executing instructions, network controller 262 for connecting to HCF distribution network 240, video processor 263 and nonvolatile memories 264 and 265 for processing and/or displaying any captured surveillance data and/or patient medical procedure documentation screens. Video processor 263 may be integrated in a general purpose processing system or supplement the video processing capabilities of the general purpose processing system, which is coupled to video monitor 267 for viewing. Nurse monitor device 260 may also be coupled to a surveillance camera (not shown); in that case video processor 263 is also responsible for surveillance video captured as discussed above with regard to video processor 213. Additionally, patient monitoring sub-system 270 should also comprise audible alarm 268 for supplementing visual alarms and warnings displayed on video monitor 267. Because patient monitoring sub-system 270 may also be used as a supplemental input device for entering, editing or supplementing the information relating to a patient medical procedure, patient monitoring sub-system 270 is typically connected to a variety of data entry peripherals, such as manual interface device 269 (typically a mouse and/or keyboard) and/or touch screen video monitor 267.

FIG. 3 is a diagram an HCF distribution network in which the present patient movement monitoring system may be implemented in accordance with an exemplary embodiment of the present invention. HCF distribution network 240 is coupled between patient rooms 230 and various HCF offices, such as nurses station 250, patient administration offices 345 and system administration offices 348 via transmission medium 341 (such as twisted pair, coaxial conductor, power conductor, optical fiber, air or any other suitable transmission medium). Camera control device 210 is located in each patient room 230, as well as any other location that surveillance and/or monitoring is desired (such as nurse's station 250) and coupled through transmission medium 341 to a variety of network switches 342 and other routing hardware. As mentioned, the present invention is flexible enough that for many applications, general purpose computer 310 (i.e., PC, laptop, handheld, palmtop, or other network device) may replace camera control device 310. If broadband access is required, HCF distribution network 240 may be connected to broadband connection 343 through network server/router/firewall 346. In practice, one or more servers may be connected to HCF distribution network 240, however at least one network storage, HCF network storage 344, should be provided for maintaining patient and other information, such as patient medical procedure AN files.

One advantage of the presently described HCF distribution network 240 is that the network is capable of retaining archival data in a decentralized structure of semi-autonomous storage devices, i.e., primary nonvolatile memory 214, for instance, in each of patient rooms 230. Ideally, all surveillance data from every surveillance camera 217 is retained in HCF network storage 344 and all surveillance data associated with a patient is retained with that patient's medical records. However, as a practical matter, server storage space and network bandwidth come with a relatively high price. Therefore, the less surveillance data transmitted across HCF distribution network 240 and retained in HCF network storage 344, the lower the costs associated with that data. However, at least the high priority surveillance data designated for archival retention and written to primary nonvolatile memory 214 will be available locally in patient movement monitoring system 200 at respective patient room 230 for a significant time period, perhaps between several months to in excess of a year. As a practical matter, however, lower priority surveillance data may also persist for long periods of time in patient movement monitoring system 200 depending on the data handling approach and the amount of surveillance data designated as being high priority. During that time period, authorized HCF staff may access the surveillance data retained at primary nonvolatile memory 214 of patient movement monitoring system 200 in the separate patient rooms 230 based on a patient identifier, a time period, a procedure or event identifier or the like. In so doing, high priority surveillance data of particular interest can be further designated for more permanent retention, such as in HCF network storage 344. Consequently, the decentralized structure of semi-autonomous storage devices of HCF distribution network 240 enable the HCF to retain a significant amount of high priority surveillance data for an extended period of time without the additional expense of increased network storage capabilities or network bandwidth.

Using the exemplary surveillance, monitoring and network hardware described immediately above, the workload on the HCF staff can be significantly and immediately reduced through the implementation of a semiautonomous patient decubitus ulcer procedure by using and analyzing video surveillance data in accordance with exemplary embodiments of the present invention. Here, the aim is to reduce the overall workload on the HCF staff professionals, while simultaneously creating a succinct video record of decubitus ulcer procedure events by tightly integrating the patient decubitus ulcers prevention/treatment order with the video monitoring system.

FIG. 4 is a diagram of a flowchart illustrating a process for implementing a semiautonomous video patient repositioning procedure in accordance with an exemplary embodiment of the present invention. The process begins by invoking a patient decubitus ulcer protocol (step 402). The patient decubitus ulcer protocol may be derived from a number of sources, for instance the patient order, the HCF care guidelines, patient repositioning schedules, etc. for documenting a procedure for the prevention and treatment of decubitus ulcers as a collection of annotated video frames. Much of this protocol information is manually entered, updated or verified in a setup phase of the video monitoring procedure. While it may be important for the video record of some procedures to memorialize the procedure as an uninterrupted video sequence, it is far less so with regard to documenting the procedure for preventing/treating decubitus ulcers. In fact, it is highly advantageous to represent the decubitus ulcer procedure as a chronological group of individually time stamped video images, each annotated with relevant procedure information, that separately represent patient decubitus ulcer events. Hence, a patient's entire HCF admission, or any sub-portion can be reviewed as a storyboard of time stamped and annotated video images representing decubitus ulcer events.

With the patient decubitus ulcer protocol defined in the system, the process enters the run mode in which the system performs two primary functions: it alerts the HCF staff of decubitus ulcer events (step 404), whether the decubitus ulcer events have actually occurred, will occur, are merely potential events or forthcoming events. Additionally, the system may also alter the patient herself of a decubitus ulcer event that might be resolved solely by the patient, such as a turn alert that can be resolved without HCF staff intervention by the patient turning herself into the next scheduled position.

In accordance with still another exemplary embodiment of the present invention, patient movement monitoring system 200 uses a set of escalating alerts and alarms to ensure that the proper attention is being paid to the patient's turn requirements. Alerting the patient and the HCF staff of decubitus ulcer events should not be taken lightly, however some events require far less attention from the HCF staff than others. The type of event alert issued by patient movement monitoring system 200 is proportional to the seriousness of the event and/or the action or inaction taken by the HCF staff. For example, standard alerts are issued for events that should be noticed by the HCF staff, but typically should not require any intervention by the HCF staff. The alert may take the form of a visual screen message, signal or queue, or an audible tone, beep or verbal message, or a combination of the two. This type of alert is reserved for events of very low importance, such as the system detecting motion without detecting patient repositioning. It may be resolved by merely acknowledging the alert. The next higher level is a warning alert which requires the patient and/or HCF staff to take some type of action within a reasonable time, such as verifying a patient's position or turning a patient and verifying the patient's new position. A warning alert may also take the form of a visual and/or audible message, but should be distinctly recognizable from a standard alert. The highest alert level is an alarm alert which requires the HCF staff to take a specific and immediate action or intervention. An example of a decubitus ulcer procedure event that would result in an alarm alert being issued if the patient remains in a position for an extended period of time and over the prescribed time for the particular position. The visual and audible affects associated with an alarm are sharper, louder, more vibrant, frequent and sustained, than other types of alerts and virtually impossible to ignore.

Although the present alert system is based on discrete alert types, under certain conditions an alert may escalate from one level to the next higher level if the event is not resolved by the HCF staff. For example, if the system throws an event alert such as a patient turn warning based on an upcoming turn time, it may escalate the alert and associated alarm if an appropriate HCF staff intervention is not verified to the system. Subsequent to the initial alert and without a resolution of the event, the system repeatedly issues the turn warnings, and may escalate the form of the visual and audible queues to the HCF staff at each iteration. If the system exceeds some predetermined number of repeated warnings, the system may automatically escalate the alarm by generating an email, text or audible message or HCF electronic post describing the alert to an HCF supervisor of the alert event. Additionally, once the seriousness of event exceeds the parameters for the event warning, the alert level is automatically escalated to the next appropriate level, for example from a warning event to an alarm event, and the form of the alert altered for the new level. Here again, the system may automatically escalate the alarm by contacting HCF supervisor personnel over a predetermined medium.

The system then associates all relevant information attributed to the decubitus ulcer event with the video image(s) (step 406). With regard to either alerting the HC professionals of decubitus ulcer events or recording the event, the video monitoring system uses the patient decubitus ulcer protocol to discriminate decubitus ulcer events from non-events. With that information, video frames that represent non-events are purged from the decubitus ulcer procedure record (step 408). Individual video frames and/or groups of video frames are generally designated for retention by associating some patient decubitus ulcer procedure information with the frame. The information may be retained separately and related to the frame, annotated directly in the frame header or saved in a separate file of related image frames. Frames that are not associated with some type of patient decubitus ulcer procedure information are generally not included in the record of decubitus ulcer events. As the procedure for the prevention and treatment of decubitus ulcers will often be implemented simultaneously with other patient procedures, it is possible for a single video frame to be associated with two or more patient procedures. Therefore, a single video frame retained as being representative of two or more separate patient procedures and associated with the relevant non-video information for each patient procedure. As a practical matter, the patient video record may be retained as a single video record or file, that can be parsed into separate patient procedure records by traversing the record for key information, such as the type of patient procedure. Alternatively, the video patient repositioning procedure may create separate records of some or all of the active patient procedures that can be accessed immediately without the need for analyzing the entire patient video record.

Two categories of decubitus ulcer events are particularly useful in lessening the workload on the HC professional, alert events and repositioning events. Alert events are communicated usually to inform the HCF staff of a potential task. The most prevalent of these is the turn alert which alerts the HCF staff that the time interval in a particular patient position has or will soon elapse. The HCF staff should then take steps to continue the patient procedure decubitus ulcer procedure in accordance with the turn schedule and/or patient order. Patient repositioning events involve some information attributable to a change in the patient's position. While this information might be derived from various sources, for instance manually input by the HCF staff or received from motion detectors, pressure mats, etc., for the purposes of describing the present invention, the primary source of information attributable to a change in the patient's position is the surveillance video of the patient. Hence, one or both of patient surveillance sub-system 220 and patient monitoring sub-system 270, in particular one of camera control device 210 and nurse monitor device 260 analyzes the patient video surveillance for information attributable to a decubitus ulcer procedure event, such as a change in the patient's position. While both alert events and repositioning events are recorded as part of the patient decubitus ulcer record, not all patient repositioning events are communicated to the HCF staff. Some patient repositioning events, while being a necessary part of the patient record, are simply not important enough to alert the HC professional, these include, for instance, sample video frames depicting the patient at certain time intervals.

FIG. 5 is a flowchart depicting a process for implementing a procedure for prevention and/or treatment of decubitus ulcers using video analysis in accordance with an exemplary embodiment of the present invention. This process is executed at, generally, patient surveillance sub-system 220, but might instead be executed in whole or part at patient monitoring sub-system 270. However, because the processes described herein are executed on a system network, as a practical matter it is possible to execute a particular process on almost any network device in communication with camera 216 in patient room 230. The presently described method illustrates, generally, a loose relationship between the alert events and patient repositioning events, some of which are derived through analysis of the video frames. The process begins by setting up the procedure for the prevention and treatment of decubitus ulcers, including the decubitus ulcer protocol described immediately above, but also includes setting up the decubitus ulcer monitoring process (step 502). With regard to the presently described patient movement monitoring system 200, most setup procedures will be executed at the interface of patient monitoring sub-system 270. Because the present invention will be described with regard to a number of different analysis techniques, the set up steps associated with each may vary. In general, however, one useful preliminary task is to ensure that the video camera is aligned directly with the patient area, usually the patient's bed, and centered thereon. Because the patient area of the video is of significant importance to the video analysis, the video view port axis of video camera 216 should evenly subdivide the patient's bed, longitudinally, into left and right halves. In so doing, the patient will also tend to lie along the camera view port axis. Additionally, the HCF staff should define a patient area within the video frame using nurse monitor device 260, which will be discussed further with respect to FIGS. 8-A-8E. In so doing, the amount of video data to be analyzed might be greatly reduced. Other setup tasks will become apparent with the discussion of the separate analysis techniques below.

Next, in run mode the process continually tests the current (elapsed) time against a patient repositioning schedule of patient positions and corresponding time intervals, usually as defined by a patient order (step 504). This test is performed in the background regardless of most other types of event. At or near the expiration of a time interval or a scheduled event, the system issues an alert event and notifies the HCF staff of the pending expiration of the time interval as well as the next scheduled patient position as defined in the order. Typically, this process will run on patient monitoring sub-system 270 for a plurality of patients under the care of the charge HCF staff. Once a scheduled turn event is determined, patient monitoring sub-system 270 simultaneously alerts the HCF staff and communicates the event to patient surveillance sub-system 220 which then captures an image frame and annotates the frame for the event. Alternatively, however, the schedule monitoring process may run on patient surveillance sub-system 220, which, in response to a scheduled turn event captures and annotates an image frame of the patient's current position and simultaneously communicates the alert to patient monitoring sub-system 270, which alerts the HCF staff.

With further regard to the run mode, the process is typically executed on camera control device 210, which continually analyzes the video frames for changes that indicate one or all of three types of events: motion, patient movement and change in patient position. Essentially, the exemplary process flow detects motion, then attempts to discriminate patient movement from the motion and finally attempts to detect changes in patient's position from the patient movement. These events are detected by comparing the current video frame (usually identified as the $N^{th}$ frame) with a previous video frame (usually identified as the $(N-k)^{th}$ frame). Changes in the position of a patient cannot be accurately assessed unless the patient is at a rest state when the analysis of the video frame is accomplished, that is all patient motion has ceased. Any temporal motion and temporal movement will skew the analysis results. Temporal motion can be detected by testing frame N with frame (N-1), if motion is not detected, then no temporal motion is present in frame N. Consequently, more accurate video analysis results in assessing the patient's position, as well as changes in the patient's position, are achieved by using only video frames without temporal motion, that is, testing frames N and (N-1) for changes in the patient area that indicate motion prior to assessing patient movement or position events. If motion is detected between frames N and (N-1), it is generally preferable to disregard the current frame N from further analysis and capture a new frame N, and then retest the new video frames Nand (N-1) until no motion in the patient area is detected. That frame N will be designated as having no temporal motion (NTM) for further reference. Again, for most accurate analysis results, most techniques are better served using video frames without temporal motion {NTM frames). Hence, the video analysis detects motion between video frames (step 506) for two possible purposes: to identify NTM frames (where frame N=frame (N-1) in the patient area); and to identify video frames for further analysis to delineate patient movement in the area between frame N and the previously saved NTM frame (the previously saved NTM cannot be the previous video frame (i.e., frame N-1)).

Next, the automated process attempts to discriminate patient movements from motion. Patient movement can never be detected in a video frame without any motion. However, not all motion in the video frame can be attributable to patient movements. Therefore, a further aim of the present invention is to discriminate any motion from consideration that could not be attributed to a patient's movement, such as motion away from the patient. Patients will move their heads, arms, legs and even move their torsos, any of which may or may not be an indication of a patient repositioning event. Therefore, the motion is tested using one or more of the techniques describe below to decipher patient movement from motion in the current video frame (step 508). For instance, patient movement may be deciphered if a part of the patient changes position from the previous NTM video frame. Depending on how the decubitus ulcer procedure is configured, the HCF staff may be alerted to the patient's movement. However, what is actually sought is to detect changes in the patient's position from patient movement (step 510). When a patient changes her position from the patient order, the HCF staff should act immediately to reposition the patient in accordance with the order. One technique is to infer a change in position using frame analysis based on the amount of patient movement; if the level of movement exceeds a threshold amount, a change in position is inferred and the HCF staff alerted (discussed below with regard to FIGS. 9A, 9B 10A and 108). Other techniques attempt to identify the patient's position, i.e., back, right side, left side, etc., and compare that position with the patient's position in the previous NTM frame (discussed below with regard to FIGS. 11A, 118, 12A-12F, 13A-13L, 14A-14C, 17, 18A-18E, 19A, 19B, 20A, 20B, 21 and 22). If the two positions are different, the HCF staff is alerted. The latter technique may require an immense amount of analysis to identify a particular patient position. In any case, once the patient's current position is identified, it is compared to the patient order (step 512). Where a conflict with the order is detected (i.e., the wrong patient position for the time), the HCF staff is alerted with all relevant information (such as the current patient position, the correct patient position by the order, time remaining in the position and perhaps the next patient position according to the order). Obviously, there may be cases where the patient has repositioned himself contrary to the order, but to an acceptable alternative position. One such case involves the treatment of decubitus ulcers at a particular site, for instance the patient's back. The attending physician may order that the patient be kept off her back for an hour of each hour and a half. There, the patient may be free to move from one side to the other as much as necessary to keep comfortable so long as the patient does not stay on one side more than a half hour or return to her back. In those situations the process would detect changes in the patient's position, perhaps alert the HCF staff to the changes, but recognize that the changes do not conflict with the patient order.

Figure 6B:
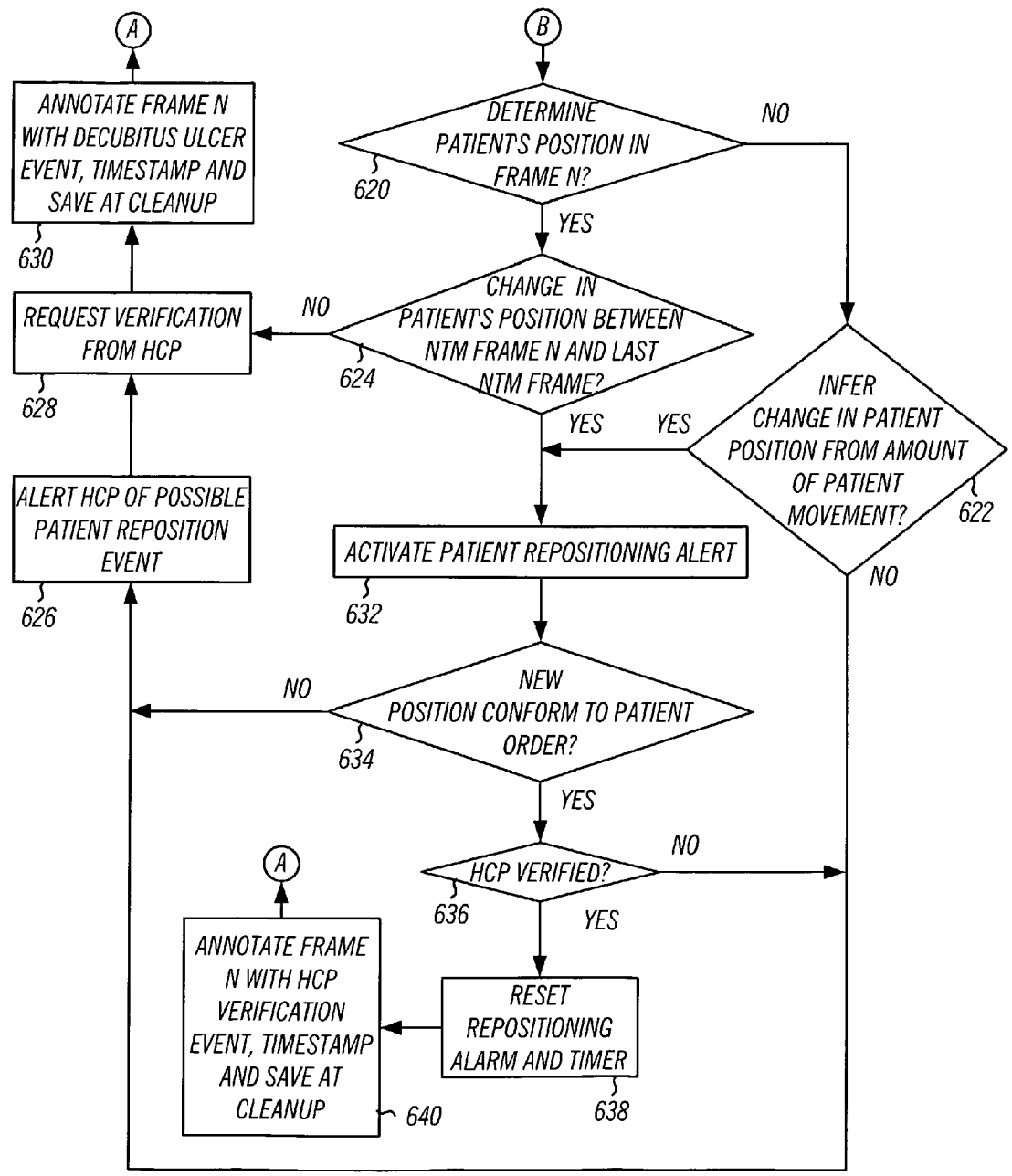

The process described above in FIG. 5 is an extremely high revel view of the present process for procedure for prevention and/or treatment of decubitus ulcers using video analysis in accordance with an exemplary embodiment of the present invention. FIGS. 6A and 6B depict a flowchart of a lower level description of the generic process, in accordance with exemplary embodiments of the present invention. Here, the process is described at the level of an individual video frame. However, before describing the generic process a brief description of video capture data might be helpful. Generally, a typical video camera captures a sequence of digital video frames, each at a predetermined resolution, at a predetermined frame rate, for instance sixteen, twenty, twenty-four and even up to thirty-six frames per second. The resolution of digital cameras is usually defined by the number of pixels both horizontally and vertically (such as 640×480) or as a total number of pixels in the image (such as 1.4 mega pixels), while the resolution of analog video cameras is typically defined by the number of television lines, for instance 320 lines: Most prior art digital video cameras used for surveillance applications have a relatively low resolution, in the range of 640×480 pixels, however the resolution is often dependent on the application and the size of the surveillance area in the field of view of the camera. For instance, a larger surveillance area might necessitate the use of a higher resolution camera in order to recognize objects in the field of view. As patient rooms in a HCF are relatively small, adequate surveillance video has been achieved using relatively low resolution cameras. Maintaining resolutions as low as possible is often important because the AN traffic on network 240 often creates bottlenecks for other, sometimes more important, network traffic data (see generally U.S. Pat. No. 7,477,825 discussing techniques for handling AN network traffic). Hence, video resolution often suffers for the sake of network flow.

Furthermore, for the purposes of describing the video processing and analysis techniques below, it should be appreciated that each pixel of the 1.4 mega pixel exemplary frame alluded to above, is defined by two optical characteristics: chrominance and luminance. Using luminance and chrominance image encoding, each pixel of a frame is allocated a predetermined number of bits for describing the pixel, for instance a 12 bit pixel encoding in the YUV12 planar pixel encoding devotes 8 bits to the Y, or luminance channel, and the remaining 4 bits allocated for the chrominance of a 2×2 pixel block. In any case, the chrominance bits describe the pixel's color (or the coordinates of the color in some predetermined color space), while the luminance bits describe the intensity of the light. Hence, chrominance pixel characteristics may be extremely useful in recognizing a patient in a video frame by skin tone, or other bodily colorations. However, the use of chrominance pixel characteristics is susceptible to changes in the ambient brightness of the surveillance area, as the ambient light in the area diminishes, the chrominance bits fall within a narrow range of color coordinates in the color gambit, typically near the gray scale. While it may still be possible to distinguish the patient from the surrounding area using contrasts in the chrominance characteristics of the pixels in the video frame, the process is far more difficult and less reliable.

Luminance pixel characteristics, on the other hand, are far less susceptible to changes in the ambient brightness of the surveillance area for two reasons. First, the amount of light reflected off a surface (the luminance value) is highly influenced by the distance from the light source in the surveillance area and that distance can be generally referenced to a patient's position in a surveillance area. Assuming illumination in a patient's room is provided by one or both of an overhead room light and a video camera equipped with infrared illumination elements that are generally arranged around the lens and oriented toward the view axis of the camera (i.e., coaxial to the camera's view axis), optimally the patient's bed should be positioned at the cross-section between the two illumination vectors. That is, the patient's bed should be positioned directly under and centered with the overhead room light and directly in front of and centered on the IR illumination from the camera. In so doing, the luminance values along any lateral stripe along the view port, and hence a video frame, will vary proportionally with the relative distance to the light source, either the overhead light of their elements on the camera. In a small predefined area of the view port, for instance the patient's bed, the variance of the luminance may be negligible. Hence, changes in the luminance across lateral stripes of the patient's bed will be highly indicative of changes in the relative height of the target surface on the patient's bed. These changes in height are largely due to the patient's position on the bed. For simplicity, the directional nomenclature used hereinafter will correspond to the image frame, for instance since, optimally, the patient's bed is aligned along the view port axis of the camera, vertical runs from along the length of the patient's bed (from top (headboard) to bottom (footboard)) (vertical pixel lines in an image frame) and horizontal runs across the bed (horizontal pixel rows in an image frame), that is, horizontal traverses the lateral extent of the bed. Consequently, it is sometimes advantageous to process pixels in a video frame along horizontal pixel rows when attempting to identify the pixels corresponding to the relative highest elevated locations along the stripe in the surveillance area, because pixels of like elevation will have similar luminance values.

While evaluating the luminance characteristics has some advantages over using chrominance characteristics, and vice versa, the procedure for prevention and/or treatment of decubitus ulcers using generic video analysis is not necessarily dependent on the luminance characteristics, chrominance characteristics or some other pixel characteristic. Hence, luminance and chrominance will be generally referred to throughout as color temperature of a pixel, group of pixels, area of the image frame, etc.

Turning now to FIGS. 6A and 6B, a lower level view process for implementing a procedure for prevention and/or treatment of decubitus ulcers using generic video analysis is depicted in which alert events and decubitus ulcer procedure events are illustrated with regard to a current image frame in accordance with an exemplary embodiment of the present invention. While it is contemplated that this process is largely performed with camera control device 210, as a practical matter the process might also be executed within patient surveillance sub-system 220 in nurses station 250 or any other location within the HCF, such as administration offices 345 and/or system administration offices 348. The process continues in an iterative loop during the patient's stay at the HCF, or at least while the patient order is active, each cycle beginning with the capture of a digital image frame, current frame N (or digitizing of a captured analog frame) (step 602). Initially, the current elapsed time with the patient in the current patient position is compared to the patient order, the turn schedule or some other metric, in order to determine if it is time to turn (reposition) the patient (step 604). If the process determines that it is not time to turn the patient, it flows directly to step 608 without executing step 606. If it is time, nurse monitor device 260 of patient monitoring sub-system 270 issues a turn alert, such as a visual warning displayed on video monitor 267 and/or audible alarm from audible alarm 268. Alternatively, the system may issue the alert to the patent herself, thereby relieving the HCF staff of alerting the patient. For example, patient movement monitoring system 200 issues an audible turn alert via medical procedure/pillow speaker interface 226 with the turn information, for instance, "The time is now 12:36 PM. You must turn from your back to your left side. If you are having difficulty or do not understand these instruction, please push the Nurse Call Button on your remote."

The event alert is then recorded by, for instance, annotating current image frame N with the decubitus ulcer procedure event information and a timestamp or by associating the event data stored at a separate location to the current image frame. The event information typically includes the alert event, the current patient position, elapsed time in that position, the next position, verification information from the HCF staff and any other information that may be useful in evaluating the procedure for prevention and/or treatment of decubitus ulcers. Next, optionally, the process identifies an area of interest in frame N that should contain the patient, as discussed with regard to step 502 depicted in FIG. 5 (step 608) and as will be further discussed with regard to FIGS. 7 and 8A-8E below. Providing a description of the area of interest reduces the amount of image frame to be analyzed to only the portion of the image frame where the patient is known to be present, thereby accelerating the analysis procedure. Without the description of the area of interest, one of camera control device 210 and patient surveillance sub-system 220 will evaluate the entire image frame in the manner discussed below. With the area identified, frame N is tested for temporal motion, that is, if the pixels defining the area of interest in frame N are substantially unchanged from the pixels defining the area of interest in the previous image frame, frame (N−1). It should be appreciated that patient repositioning takes from several to hundreds of image frames to complete and each of the transitional image frames merely exhibit temporal motion without necessarily showing any useful patient position information. Therefore, if frames N and (N−1) are not substantially similar, at least in the area of interest, frame N is flagged as having temporal motion (step 612). Image frames with temporal motion are generally discarded sometime after frame (N+1) is received and, therefore, flagged for deletion at cleanup (step 614), in favor of frames showing the patient at rest without motion. Here it should be appreciated that in most image analysis embodiments discussed herein, each image frame N is tested for temporal motion by comparing the current frame to the preceding image frame (N−1) for motion exceeding a predetermined threshold amount, at least in the area of interest. This NTM test is performed regardless of whether or not frame (N−1) has been designated as an NTM frame, hence the preceding image frame (N−1) is generally saved in secondary nonvolatile memory 215 at least until the NTM test for the next frame N is completed.

Typically, temporal image frames are cached temporarily in smaller secondary nonvolatile memory 215 and removed only when space in needed for more current image frames. Image frames residing in secondary nonvolatile memory 215 are only written to larger primary nonvolatile memory 214 if the frame is annotated with decubitus ulcer event information and/or if the frame is annotated to be saved at cleanup. In so doing, image frames without useful decubitus ulcer procedure event information are deleted from secondary nonvolatile memory 215 whenever the memory is cleaned to make room for more current image frames. As discussed in U.S. Pat. No. 7,477,825 and elsewhere in application Ser. Nos. 12/151,242 and 12/589,654, image frames often reside in secondary nonvolatile memory 215 while waiting to be transmitted over network 240 to patient monitoring sub-system 270. Due to a myriad of reasons, some of these frames may never reach nurse monitor device 260 and therefore be copied to primary nonvolatile memory 214 for future reference. Also, although the scope of this application is limited generally to procedures for prevention and/or treatment of decubitus ulcers using video analysis, other patient procedures will often be running simultaneously, hence frame N might be designated for deletion by decubitus ulcer procedure, but designated for saving for another reason, such as by another patient procedure.

Returning now to step 614, the process reverts to step 602 for another video frame. However, if at step 610, frame N is determined to have no temporal motion, the frame is flagged as a NTM frame (step 616) and the current NTM frame N is compared to the most recent NTM saved in memory for patient movement (step 618). That is, using some image analysis technique, at least the area of interest in frame N that contains the patient is analyzed for patient movement when compared to the last NTM image frame. If the results of the image analysis indicate that the motion detected in NTM frame N is not patient movement, then frame N has no additional decubitus ulcer procedure event information over the preceding NTM frame and therefore frame N can be discarded, in favor of saving the older NTM frame (step 614). Alternatively, since NTM frame N and the preceding NTM frame convey identical information concerning the patient's position, either frame may be designated as representative of the current patient position state or decubitus ulcer event.

Returning to step 618, if patient movement is detected in frame N, frame N should be analyzed further to determine if that movement reached the level of a repositioning. One mechanism is to assess if it is possible to determine or identify the patient's current position in frame N (step 620). Depending on the analysis technique being used, or other factors, the patient's current position may not be recognizable using the analysis techniques being employed. If that is the case, a change in the patient's position might be inferred from other factors, such as the amount of patient movement detected even if the current patient position remains unknown (step 622). Additionally, the inference of patient repositioning might also be substantiated by detecting movement outside the area of interest where the patient resides in the frame immediately preceding and possibly subsequent to the NTM frame exhibiting patient movement. It is a reasonable inference that the HCF staff entered the patient's room and repositioned that patient, even though it may not be possible to determine the patient's current position using the image analysis technique currently being employed.

Returning to step 622, if the system detects patient movement, but the patient's current position cannot be determined nor can a change in the patient's position be inferred, it is still possible that the patient has repositioned herself, hence, the HCF staff is alerted to the possibility of a patient repositioning event (step 626), a request for HCF staff verification issued (step 628) and the current NTM frame N annotated with the decubitus ulcer event, timestamp and designated to save at cleanup (step 630). From here, the process iterates again to step 602 for the next video frame N. Returning to step 622, if the results of the current analysis technique infers that the patient has repositioned herself, a repositioning event has occurred and, as a result, patient movement monitoring system 200 activates a patient repositioning alert at nurse monitor device 260 to alert the HCF staff of a potential improper repositioning event, that is one that is not scheduled, to a position that conflicts with the patient order, or both (step 632).

The process loop across step 622 assumes that the patient's position is undeterminable, however, if at step 620, the patient's position can be determined, than that patient position is compared to the last NTM frame. If the potentially new patient position is not a change from the patient's position in the last NTM frame, a request for HCF staff verification of the nonevent may still be issued as a safeguard (step 628) and the current NTM frame N annotated with the decubitus ulcer event, timestamp and designated to save at cleanup (step 630). Periodically, a patient may adjust her position without actually changing positions, and patient movement associated with these adjustments might generate decubitus ulcer events that may be misinterpreted by the automated system process, therefore, the system seeks verification of the patient's positional state from the HCF staff.

Alternatively, if the patient movement is attributable to a repositioning event (step 624) a patient repositioning alert is activated at nurse monitor device 260 and the new patient position is automatically compared to the patient order for validity (step 634). The aim here is to identify patient repositioning events that correlate close enough with the patient order (or turn schedule or HCF decubitus ulcer procedure guidelines) to be compliant, without generating unnecessary HCF staff intervention. Therefore, no additional attention is necessary from the HCF staff, aside from verifying the patient's position (step 636), resetting the repositioning alert and timer (step 638) and frame N with the annotating decubitus ulcer event, the HCF staff verification, timestamp and to designating the frame for saving (step 640). It should be mentioned that it is not possible for the HCF staff to verify the alert, patient position or anything concerning the current decubitus ulcer event simultaneously with frame N being analyzed. Hence, steps 366, 638 and 640 actually occur subsequent to the video analysis of frame N, although the frame itself may be available for annotating in one or both of secondary nonvolatile memory 215 and primary nonvolatile memory 214. The process then reverts to step 602 for another video frame. If, however, at step 634, if the new patient position does not conform to the patient order, then the HCF staff should act to rectify the patient's position to one that conforms to the turn schedule. There, the HCF staff is alerted to the possibility of a noncompliant patient repositioning event (step 626), a request for HCF staff verification issued (step 628) and the current NTM frame N annotated with the decubitus ulcer event, timestamp and designated to save at cleanup (step 630). The process then reverts to step 602.

Figure 7:
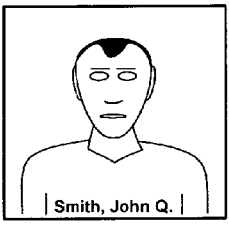
FIG. 7 is a screenshot of a setup page for a procedure for prevention and/or treatment of decubitus ulcers in accordance with an exemplary embodiment of the present invention.
Figure 8A:
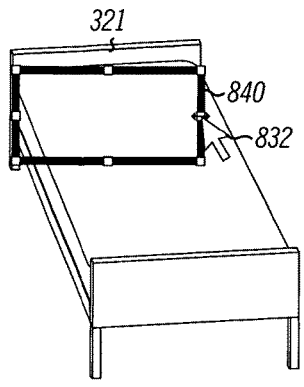
FIGS. 8A-8E illustrate another setup task that greatly optimizes the present invention, that of describing an area of interest within the video frame where the patient resides.
Figure 8B:
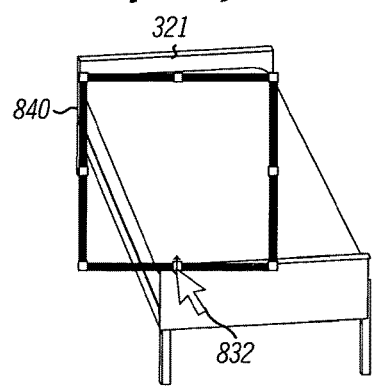
Figure 8C:
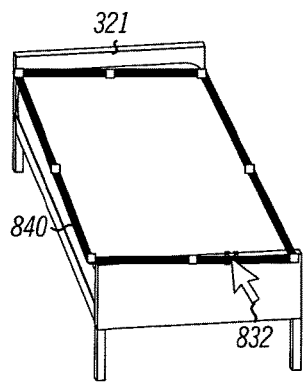
Figure 8D:
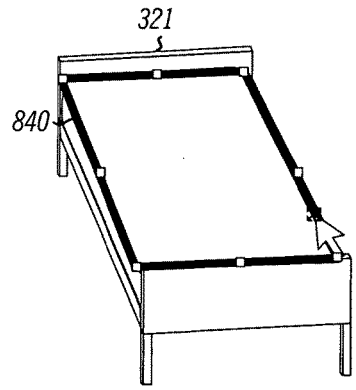
Figure 8E:
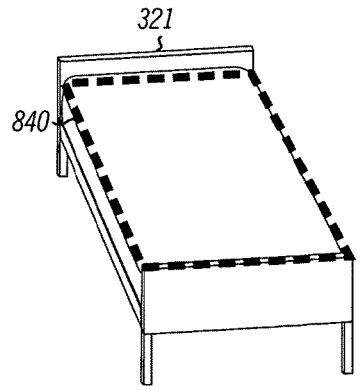
Figure 23:
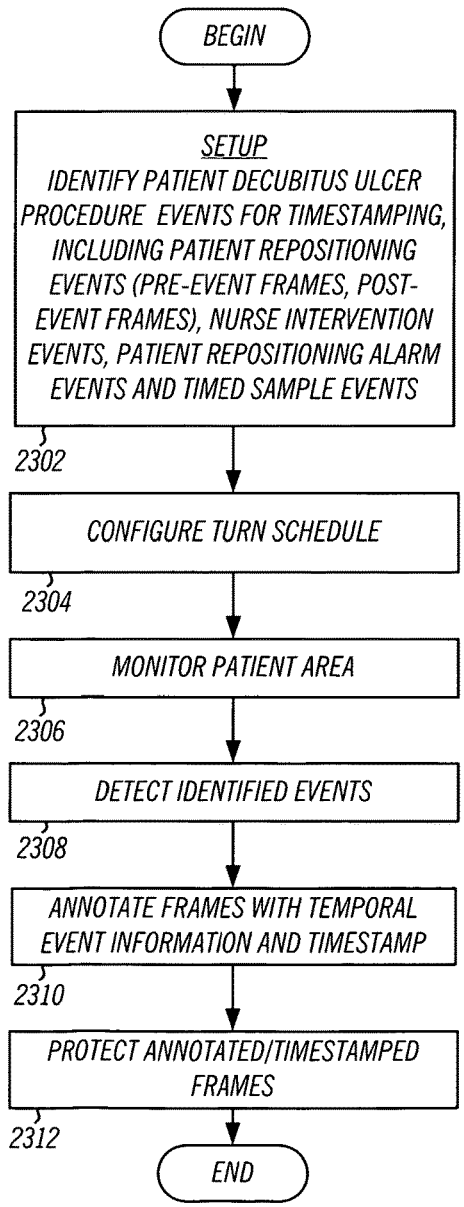
FIG. 23 is a flowchart depicting a method creating video history of patient decubitus ulcer procedure events in accordance with exemplary embodiments of the present invention.
Figure 24:
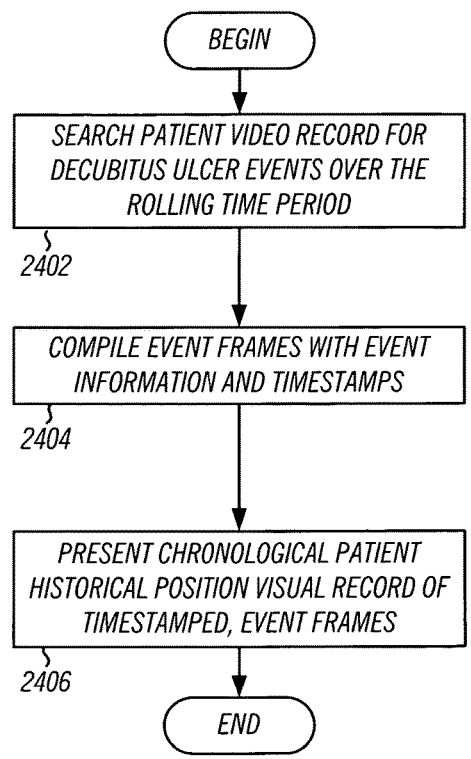
FIG. 24 is a flowchart depicting a method for compiling the video history of patient decubitus ulcer procedure events and presenting the video history to HC staff as a chronologically ordered set of screenshots of the patient in accordance with an exemplary embodiment of the present invention.

Returning to the high level process flow depicted in FIG. 5, the presently described invention may be subdivided into several discrete subparts: setup phase (step 502); monitoring phase (step 504); image analysis phase for detecting and evaluating patient repositioning events (steps 506, 508 and 510) and a compliance phase where the results of the image analysis phase are compared to the patient order (step 512). Consequently, the remainder of the specification is subdivided similarly: FIGS. 7 and 8 depict tasks accomplished in setup phase; FIGS. 14 and 16 depict monitoring phase events and screenshots; while FIGS. 9, 10, 11, 12, 13, 15 and 17 through 22 depict various analysis techniques applicable to the image analysis phase for deriving useful repositioning event information from the image frames. Finally, although not illustrated in FIG. 5, FIGS. 23 and 24 illustrate processes for creating and compiling a historical record of patient decubitus ulcer procedure events from the annotated image frames maintained in storage.

Before discussing the various analysis techniques of the present invention, it is important to remember that currently there is no integrated system for using a video monitoring system to prevent and manage decubitus ulcers for a group of patients. Therefore, as a threshold the present invention enables attending HCF staff professionals, who are monitoring the video images of the patients on patient monitoring sub-system 270, to manually record patient movement, restarting the timer after each HCF staff intervention. Essentially, one of patient monitoring sub-system 270 and patient surveillance sub-system 220 tracks patient turn intervals (based on a turn schedule compliant with a patient order and/or HCF care guidelines for treating/prevention decubitus ulcers) and patient monitoring sub-system 270 alert the HCF staff that it is time to change the patient's position. The HCF staff then repositions the patient. Finally, the HCF staff uses the touch screen interface 267 to select the patient, and indicates that the patient was repositioned manually. The system then automatically designates one or several current image frames to be saved as a position record for the patient. Alternatively, the system automatically designates an image frame of the patient for the patient position history simultaneously with notifying the HCF staff to change the patient's position. This frame is that pre-event frame and the former is a post-event frame.

However, it is important to reduce as much manual intervention from the HCF staff as possible. Below are described several analysis techniques for accurately tracking a patient's position, with respect to a turn schedule, for instance, which may be used, for example, to automatically alert the HCF staff of incompliant patient positions and thereby reduce HCF staff monitoring efforts and manual interventions with the patient. The processes typically begin by setting up the patient and system of the particular technique.

FIG. 7 is a screenshot of a setup page for a procedure for prevention and/or treatment of decubitus ulcers in accordance with an exemplary embodiment of the present invention. Setup includes at least three discreet manually implemented tasks: setting up the patient room to optimize the automated position/movement/change detection analysis; setting up the video image to optimize the automated position/movement/change detection analysis; and setting up patient order and procedure execution information. The screenshot in FIG. 7 depicts the latter of the three. This setup may be implemented similarly to that described in U.S. application Ser. No. 12/589,654 directed to the ProcedureView product available from CareView Communication, Inc. of Lewisville, Tex. and described elsewhere above. Essentially, screenshot 700 contains patient information 740, Date/Time/Room information 720, and procedure information 730. The HCF staff begins by bringing up the patient information by typing the patient's name in text entry 740, or selecting the room number for the patient in entry 720. In either case, screenshot 700 is populated with patient information that is then verified by the HCF staff before entering new patient procedure information. The present setup procedure is relatively uncomplicated with auto-fill features wherever appropriate. For instance, once the patient's screen has been displayed, the HCF staff merely selects that correct procedure in entry 730, or alternatively the procedure billing code. In response, the comment entries, warning, alert and sampling selection, as well as the Turn Schedule selection box are automatically displayed for HCF staff editing. Once displayed, the HCF staff enters patient comments respective of the patient order, such as a description of the ailment "stage II decubitus ulcers present on right hip and ankles with stage III ulcers on the patient's right shoulder." The HCF staff then enters procedure events, for instance by merely selecting position options corresponding to the patient order. In accordance with the exemplary setup screen, a plurality of patient position selections and corresponding timer selections are displayed in turn schedule 710. As depicted in the example, the patient order might specify 30 minutes on the Back position, followed by 40 minutes on the Left Side position, then 20 minutes on the Rights Side position, followed again by 40 minutes on the Left Side position. The system calculates the position cycle summary 714 including the number of position changes per cycle and the cumulative cycle time. The HCF staff can readily appreciate the need for limiting the patient's time on back and right side due to the eruption of ulcers on those parts. Additionally, the HCF staff selects the types of automated detections to be performed, such as patient position selection 702, as well as selecting position change alarms 704 to alert the HCF staff whenever the system detects a change in the patient's position. The HCF staff may also designate other warnings and alarms, such as issuing patient movement warnings 706 when the system detects movement. Additionally, the system may save sample frames depicting the patient at certain time intervals set by the HCF staff in patient turn schedule 710. Finally, the HCF staff also sets the time interval for a historical position report using rolling time interval selection 709. A historical position report for the patient is then displayed for the time interval selection at the click of an icon. For example, when queried, the system will display all repositioning and alert events and perhaps sample position frames, for the immediately preceding 90 minutes.

FIGS. 8A-8E illustrate another setup task that greatly optimizes the execution of the present invention, that of describing an area of interest within the video frame where the patient resides. Once accomplished, most image analysis techniques will be confined to that area. Typically, the area of interest is the patient's bed, but may be any area where the patient will reside for periods of time, e.g., gurneys, chairs, wheelchairs, treatment apparatus, etc. The aim is merely to place a bounding box around the patient area in the view area of screen 267. As depicted, bed 321 may not be completely parallel with the view axis, which may occur in physical locations where camera's 216 position is not directly in line with patient bed 321. This setup may be implemented similarly to that described in U.S. application Ser. No. 12/151,242, directed to the Virtual BedRail product available from CareView Communication, Inc. The HCF staff begins by tapping touch screen 267 or double clicking pointer 832 to bring up bedrails 840. Bedrails 840 are aligned on the upper extent of bed 321 (FIG. 8A), extended downward over the lower extent of bed 321 (FIG. 88), skewed horizontally over the surface of bed 321 (FIG. 8C) and finally skewed vertically over the remaining surface of bed 321 (FIG. 80). Virtual bedrail 840 is then superimposed over the area of interest in a transparent or unobtrusive color that does not inhibit the view of patient bed 321. Alternatively, in a more automated procedure the operator sequentially taps on the view area of screen 267 at the corner positions of the intended area of interest, such as at the corners of patient bed 321 or around a patient's gurney, chair or wheelchair. The system then automatically generates bedrails 840 on display screen 267.

Figure 10A:
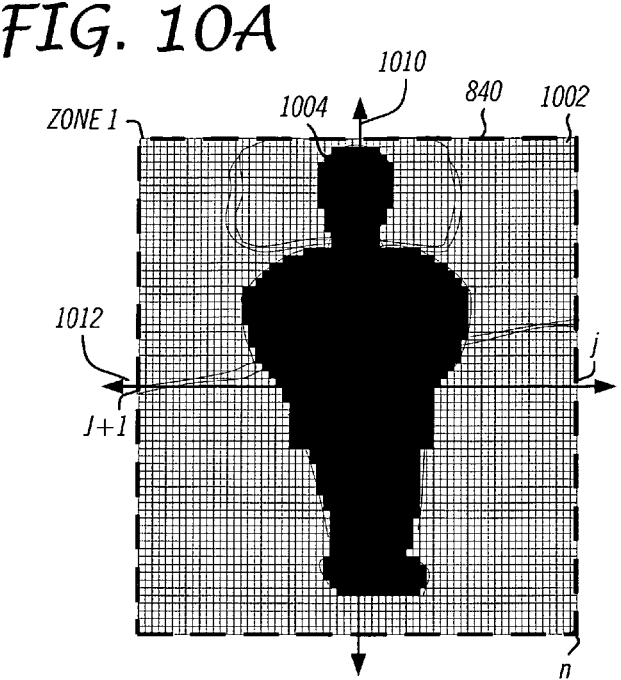
FIGS. 10A and 10B depict a table of image analysis results that may be held in system memory and a corresponding diagram of the zones in accordance with other exemplary embodiments of the present invention.
Figure 10B:
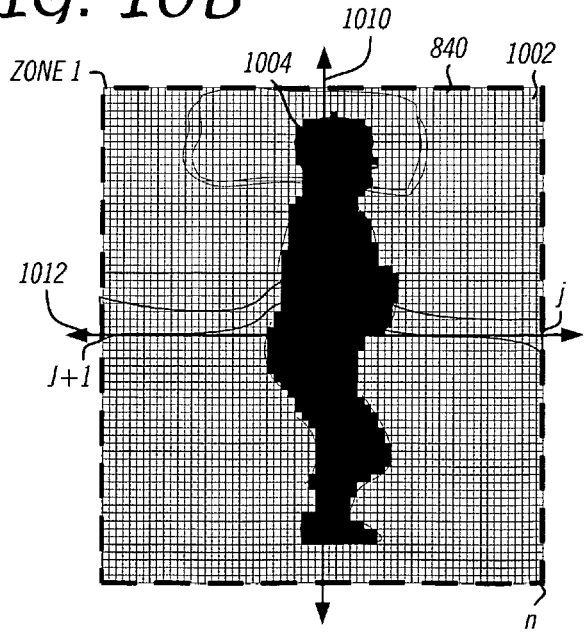

FIGS. 9A, 9B, 10A and 108 illustrates one exemplary method for automatically assessing changes in the position of a patient using video in accordance with one exemplary embodiment of the present invention. The present example depicts the patient in a recumbent position on patient bed 321 for simplicity and is not intended to limit the scope of the present invention. The patient may be, in addition to recumbent in a bed, seated in a chair or wheelchair or in some other position at, for example, a medical diagnostic or therapy apparatus. FIGS. 9A and 9B depict a flowchart showing a method for assessing changes in the position of a patient using video by evaluating discrete zones and FIGS. 10A and 10B depict a table of image analysis results that may be held in system memory and a corresponding diagram of the zones (the representation of the zones is presented merely to illustrate the process and need not be rendered for the image analysis). Essentially, this method subdivides that area of interest within the virtual bedrails into n equal-sized zones (i=1 to n), determines which zones the patient is present and then monitors those zones for changes that indicate the patient's position has changed. In so doing, the system need only track a subset of all image analysis information and, therefore, need not reanalyze the entire area of interest or recalculate all of the values. The process begins by receiving a definition of the area of interest that might be created as discussed above with regard to FIGS. 8A-8E (step 902). Next, the process determines vertical axis 1010, horizontal axis 1012 and subdivides the area of interest 840 into n equally-sized zones. For example, a camera resolution of 640×512 (327,680 pixels) and an area of interest of 256×300 (81,920 pixels), each zone having 4×4 (16) pixels or 64×80 zones, where n=5120, with 2560 zones below horizontal axis 1012 and 2560 zones above horizontal axis 1012.

The process begins by receiving a video frame (step 906) and then scanning the horizontal pixel rows by reading values for each pixel in each row (step 908), with reference to the diagrams in FIGS. 10A and 108, each of the 256 pixels of the 160 horizontal pixel rows in the area of interest are scanned in this fashion. The pixels may be scanned left to right or right to left and the pixel values may be either chrominance or luminance. Next, each pixel is assigned a color temperature based on the scanned value (step 910). In accordance to one exemplary embodiment, the color temperature equates to the scanned value, however, according to another exemplary embodiment each color temperature value corresponds to a range of scanned values so that the amount of discrete values being saved is reduced. Next, boundaries of like color temperatures are defined and like colors are grouped into discrete areas (step 912).

One exemplary mechanism for determining boundary conditions and grouping like color temperatures is by using high contrasts to delineate pixel boundaries. A boundary along a horizontally scanned row can be determined from a contrast threshold between adjacent pixels in the row. For example, scanning from left to right, any pixel that exceeds a contrast threshold with its neighbor to the left is considered a candidate boundary pixel. It is possible for several sequential candidate boundary pixels to exceed the contrast threshold. If this is the case, any of the candidate pixels may be selected as the boundary pixel, however the color temperature of the pixel furthest to the right should be most like the color temperature of the pixels filling the interior of the boundary area. Additionally, along any horizontal pixel line where a first boundary is detected that defines the left side of the patient, a second boundary should also exist that defines the right side of the patient. It is assumed that the boundary condition across all pixel rows will define an essentially continuous outline of the patient's position in the area of interest. Thus, if the contrast threshold is exceeded by scanning from the left, then further along the pixel row to the right, a negative contrast threshold should also be crossed that designates the boundary condition on the right side of the patient. The candidate pixel selection rules are essentially identical for the right side as the left. The absolute color temperature values for the boundary is relatively unimportant, what is being sought is a boundary that is essentially filled with a like color temperature value that can be correlated to the patient. Typically, the largest area of like color temperature will be the patient and that color temperature is noted as the patient color.

Next, a weight $(W(i)_N)$ for each of the n zones in the area of interest of frame N is calculated and saved. Weight $(W(i)_N)$ correlates the number of pixels in a zone having the patient color temperature (step 912), i.e., the weight $(W(i)_N)$ of any zone in frame N is between 0 and 16, according to the above example and as depicted in the third column of the tables in FIGS. 10A and 108. Next, the cumulative zone weight $(\Sigma W(i)_N^{(1-n)})$ of all zones n for frame N is summed, the cumulative zone weight of the zones in the top section (zones 1–j) is summed $(\Sigma W(i_{TOP})_{N-j}^{(1-j)})$ and the cumulative zone weight of the zones in the bottom section (zones j+1)–n) is summed $(\Sigma W(i_{BOT})_N^{((j+1)-n)})$. The cumulative weight of the n zones in frame N is compared to the cumulative zone weight of the same n zones of the previous frame $(\Sigma W(i)_{(N-1)}^{(1-n)})$. The absolute value of the difference between the two cumulative values $(\Delta|\Sigma W(i)_{(N-(N-1))}|)$ is calculated, as is the absolute cumulative zone weight differences between the two top sections $(\Delta|\Sigma W(i_{TOP})_{(N-(N-1))}^{(1-j)}|)$ and the absolute cumulative zone weight differences between two bottom sections $(\Delta|\Sigma W(i_{BOT})_{(N-(N-1))}|^{((j+1-n)})$. The zone weights $(W(i)_N$, the cumulative zone weight $(\Sigma W(i)_N^{(1-n)})$, the absolute change in cumulative zone weight from the previous frame $(\Delta|\Sigma W(i_{TOP})_{(N-(N-1))}^{(1-j)})$, the absolute change in cumulative zone weight of the top section from the previous frame $(\Delta|\Sigma W(i_{TOP})_{(N-(N-1))}^{(1-j)})$ and the absolute change in cumulative zone weight of the bottom section from the previous frame $(\Delta|\Sigma W(i_{BOT})_{(N-(N-1))}^{(j+1-n)}|)$ are all saved.

Next, temporal motion in frame N is tested by comparing a respective threshold value to one or all of the absolute change in cumulative zone weight from the previous frame $(\Delta|\Sigma W(i)_{(N-(N-1))}|)$, the absolute change in cumulative weight of the top section from the previous frame $(\Delta|\Sigma W(i_{TOP})_{(N-(N-1))}^{(1-j)}|)$ and the absolute change in cumulative weight of the bottom section from the previous frame $(\Delta|\Sigma W(i_{BOT})_{(N-(N-1))}^{((j+1-n)}|)$ (step 918). If temporal motion is detected, then the values for frame N are saved temporarily for comparison with the next image frame for temporal motion, and the process reverts to step 906) for another image frame. If, on the other hand, no temporal motion is detected, then current frame N is flagged as a no temporal motion frame (NTM) (step 922), which can then be compared to a previous NTM frame in order to determine if the patient has changed position.

Next, zone weights $W(i)_N$ and $W(i)_{NTM}$, cumulative zone weights $W_N$ and $W_{NTM}$ are retrieved from memory. Changes in zones' weights for zones 1 to n is calculated between NTM frame N and the previously saved NTM frame $(\Sigma \Delta W (i)_{(N-(NTM))}^{(1-n)})$, as is the sum of the absolute change in the weight of zones 1 to n from the previous NTM frame to frame N $(\Sigma|\Delta W(i)_{N-(NTM)}|)$, in only the zones in the top section $(\Sigma|\Delta W(i_{TOP})_{(N-(NTM))}^{(1-j)}|)$ and in only the zones in the bottom section weight $(\Sigma|\Delta W(i_{BOT})_{N-(NTM)}^{((j+1)-n)}|)$ (step 924). $\Sigma W(i)_{(N-(NTM))}^{(1-n)}$, $(\Sigma|\Delta W(i)_{N-(NTM)}|)$, $(\Sigma|\Delta W (i_{TOP})_{N-(NTM)}^{(1-j)}|)$ and $(\Sigma|\Delta W(i_{BOT})_{N-(NTM)}^{((j+1)-n)}|)$ are all saved (see the tables in FIGS. 10A and 108).

Finally, changes in the patient's position can be assessed by comparing a respective weight threshold to one or all the absolute cumulative changes between the current NTM frame N and the last saved NTM frame, i all n zones $(\Sigma W(i)_{(N+(NTM))}^{(1-n)})$, or only the zones in the top section $(\Sigma|\Delta W(i_{TOP})_{(N-(NTM))}^{(1-j)}|)$ or only the zones in the bottom section weight $(\Sigma|\Delta W(i_{BOT})_{N-(NTM)}^{((j+1)-n)}|)$ (step 926). If the threshold is exceeded, then a patient repositioning event has occurred and the process can invoke a repositioning event sub-routine, such as exemplary steps 632-640 and 626-630 discussed with reference to FIGS. 6A and 6B.

The preceding process might be optimized by making several assumptions. First, it might be assumed that the patient's color temperature is generally constant over long time periods, if so steps 908 and 910 can be executed periodically instead of every frame. Additionally, if it is assuming the higher weighted zones that represent the patient are highly indicative of a patient repositioning event, then step 912 might also be omitted until and unless a repositioning event is detected at step 914, then fresh zone weights $W(i)_N$ and $W(i)_{NTM}$ should be recalculated by iterating thought the entire process. Similarly, if zones representing certain parts of the patient body can be identified that should change positions wherever the patient repositions herself, such as shoulders, hips or face, then only those zones need be analyzed for patient repositioning events.

The preceding process evaluates patient repositioning as the totality of patient movement within the area of interest. While this method is extremely reliable, it cannot identify a patient's position, nor can it distinguish one position from another. It is therefore advantageous to use feature analysis of the image frame to predict the patient's position and orientation. One exemplary method involves detecting the orientation of the patient's head from the image frame. When the patient is on her back, the patient's head is facing forward with both eyes and ears in view. When the patient is on her right side, the patient's face is to the left in the image frame (the patient's right), with only her left eye exposed near the left boundary of her head in the image. The left ear may also be visible, but near the center of the head. Finally, when the patient is on her left side, the patient's face is to the right in the image frame (the patient's left), with only her right eye exposed near the right boundary of her head in the image, with the right ear centered. Thus, the patient positions of recumbent on her back may be distinguished from recumbent on her left side and further distinguished from recumbent on her right side. Thus, this analysis approach has the further advantage of only limiting the more comprehensive analysis to the patient's head area.

Thus, the presently described system and method for using a video monitoring system to prevent and manage decubitus ulcers in patients will record an image of the patient, and will detect the location of the patient's face relative to the rest of the body. Initially, the area of interest, patient bed 321 is identified manually by the HCF staff as a rectangle defined by the four bounding corners. The patient will be identified by finding pixels which contrast with the actual bed. The patient's face will again be identified by finding pixels which contrast with the remainder of the patient's body. The position of the face relative to the remainder of the head will be used as the directional orientation of the face, which will be recorded and monitored over time. If the face is reoriented to face a different direction, the patient will be recorded as having moved. This process has a major advantage over other analysis techniques where patient's orientation is difficult to track visually due to the fact that the majority of the body is covered by a sheet. Other advantages will become apparent with the description of the process with regard to the figure drawings.

Figure 12C:
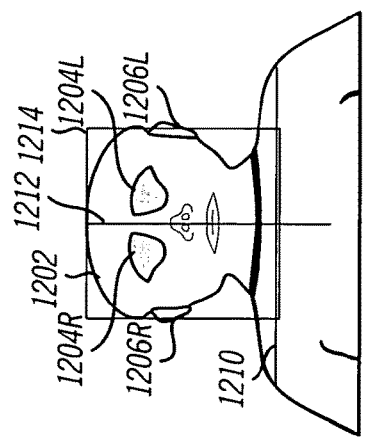
FIGS. 12A-12F are diagrams that graphically illustrate the process for detecting a patient's position from facial features with the patient's head in various orientations in accordance with an exemplary embodiment of the present invention.
Figure 12B:
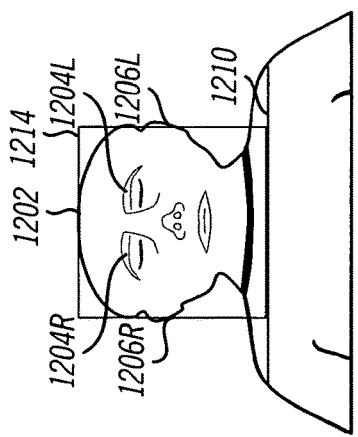
Figure 12A:
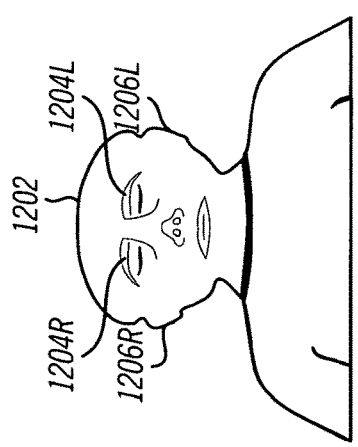
Figure 12F:
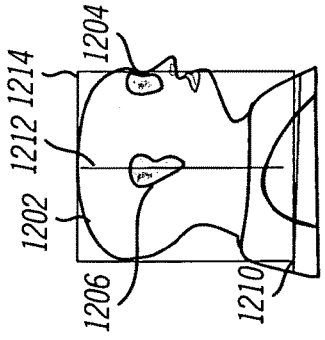

FIGS. 11A and 11B area flowchart depicting a process for assessing a patient position by detecting the position and/or orientation of facial features in a video frame in accordance with an exemplary embodiment of the present invention. The process begins by receiving setup information such as the description of the patient area in the frame, similar to that discussed elsewhere above (step 1102) and receiving frame N (step 1104). The remainder of the process comprise two discrete parts: distinguishing the patient's head; and distinguishing patient features on the head. Distinguishing the patient's head is similar to the process discussed with regard to FIGS. 9A and 9B, that is by scanning horizontal pixel rows, reading each pixel value (chrominance or luminance) (step 1106) and deriving the boundary between areas of like color temperatures, the largest continuous area will be the patient (step 1108). This area should define the general shape of the patient. Again, for this process, only the portion of the frame showing the patient's head need be analyzed further, represented diagrammatically in FIGS. 12A-12F. FIGS. 12A-12C illustrate the process with the patient on her back and FIGS. 12D-12F illustrate the process with the patient on her left side (right side omitted but is the mirror image of the left side).

Beginning at the uppermost area identified as patient 1202 in the image, scan down toward the patient's feet noting the widths and identify the patient's head and shoulders and create shoulder line 1210 between the lateral extents of the shoulders (step 1110). The portion of the image between the uppermost area identified as patient 1202 and shoulder line 1210 will contain one or both eyes (1204L and 1204R) and one or both ears (1206L and 1206R).

Here, frame N should be tested for temporal motion with frame (N−1) (step 1112). If present, the process should revert to step 1104 for a new frame N. Assuming no temporal motion in frame N, scan the patient face, within box 1214, for areas of high contrast to identify one or both of eyes 1204L, 1204R and ears 1206L, 1206R (step 1114) (see FIGS. 12C and 12F).

Figure 12E:
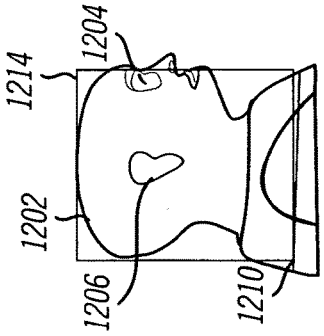
Figure 12D:
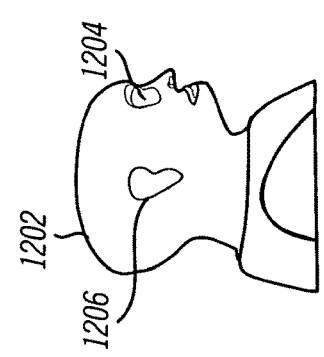
Figures 13A, 13B, 13C, 13D, 13E, 13F, 13G, 13H:
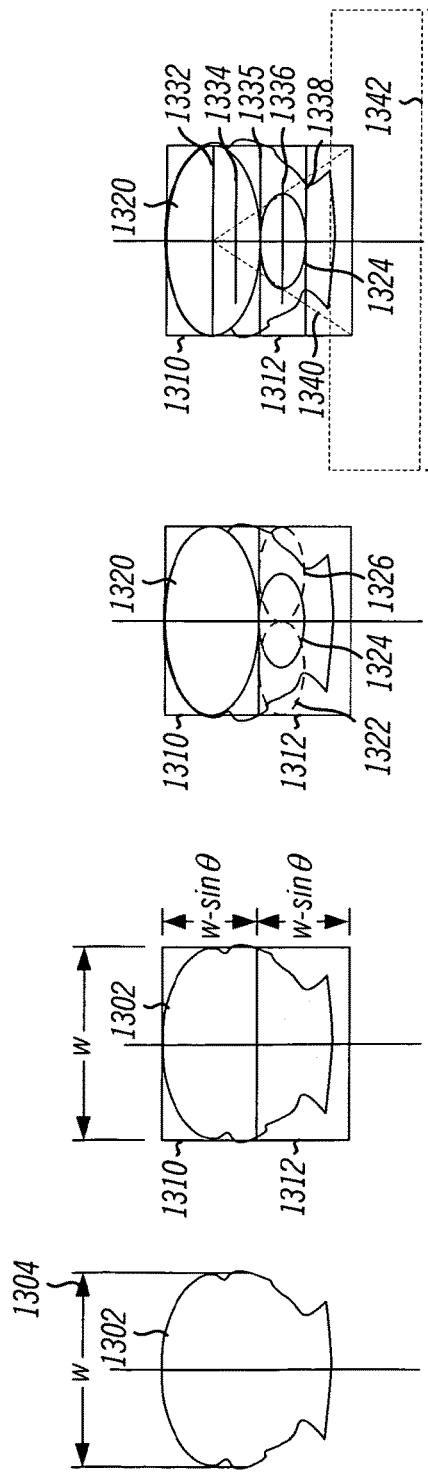
FIGS. 13A-13H are diagrams that graphically illustrate the process for detecting a patient's position using geometric element comparisons to the boundary of the patient's head in accordance with an exemplary embodiment of the present invention.

Next, the average lateral distance between the top of the patient and the shoulder line is calculated (represented in the diagrams as box 1214) and then divide that area into right and left halves represented in the diagrams as center line 1212) (step 1116) (see FIGS. 12B and 12E). Determine the patient's position from the visibility and positions of eyes 1204L, 1204R and ears 1206L, 1206R (step 1118) as follows: one eye visible on right facial side with one ear visible in proximate middle or across both sides—patient on left side; one eye visible on left right facial side with one ear visible in proximate middle or across both sides—patient on right side; and both eyes visible on right and left facial sides, ears, if visible on right and left facial sides—patient on back.

With the current patient's position being identified, the process can assess changes in the patient's position by comparing the position of the patient in current frame N with the position of the patient in the previous NTM frame (step 1120). The process then reverts to step 1104 for the next frame N.

The analysis process above can correctly identify the position of the patient only if the facial features are identifiable. In some cases the contrast of the patient's ears or eyes in the image frame is not sufficient even though larger features like the patient's head is clearly distinguishable. This is often caused by low resolution surveillance cameras or extremely wide aspect ratios where the patient area is relatively small.

An alternative to facial feature recognition for assessing patient positions is by using geometric element comparisons to the boundary of the head defined in step 1108. FIGS. 13A-13H, 15A and 15O are diagrams that graphically illustrate the comparison process. Initially, it is well known that in most cultures the relative dimensions of frontal and side views of a human face are relational. For example, a human head is approximately two thirds as wide as it is high. Therefore, once a boundary for the patient has been defined, the width (w) of the facial area is measured (shown as line 1304 in FIGS. 13A and 13E). From that width w, upper facial box 1310 having dimensions w×w can be constructed for constraining an ellipse 1320 to be fitted to the upper boundary of the patient's head. A lower facial box 1312 having dimensions w×w is aligned directly below box 1310. In practice, the dimensions of facial boxes 1310 and 1312 are actually w×w−sin θ, where θ is the angle between the view axis and the facial plane (see FIGS. 13B and 13F). In cases such as HCFs where the surveillance camera is not perpendicular to the facial plane, the vertical height of the patient in the frame is somewhat compressed, (where θ≈30°, the patient's height halved). With ellipse 1320 aligned with the upper boundary of the head 1302, a second ellipse is aligned with the upper portion in lower facial box 1312, fitted totally within the facial boundary, in one of three candidate positions: centered 1324, aligned right 1326 and aligned left 1322 (see FIGS. 13C, 13G, 15A and 15O). The lower ellipse has dimensions w/2×w/2−sin θ, half the size of the upper ellipse 1320. The orientation of the patient's head and face is based on which of the three ellipses fit within the facial boundary, if only centered ellipse 1324 fits within the facial boundary, then the face is oriented forward and the patient is positioned on her back; if right ellipse 1326 fits within the facial boundary, then the face is oriented toward the patient's left and the patient is positioned on her left side; if left ellipse 1322 fits within the facial boundary, then the face is oriented toward the patient's right and the patient is positioned on her right side (see FIGS. 13C, 13G and 15O). Finally, the proper fitting of the upper and lower ellipses also delineated approximate horizontal positions of facial features that is useful in optimizing scanning step 1116. For instance, brow line 1332 vertically bisects upper ellipse 1320 and is the approximate location of the eye brows; eye line 1334 bisects the lower half of located upper ellipse 1320 and is the approximate lower extent of the eyes; nose line 1335 is located at the intersection of the upper and lower ellipses and is the approximate lower extent of the nose; mouth line 1336 bisects the lower ellipses and is the approximate location of the mouth; and location of the eyes chin line 1338 is located at the lower extent of the lower ellipses is the approximate lower extent of the chin. Finally, the location of the connection of the neck and shoulders can be approximated along lines 1340 between the intersection between the center line and brow line 1332, and either lower corner of lower facial box 1312. The width of the shoulders is based on the orientation of the patient and width w; on the right or left sides, the outer extent of the shoulders is approximately 1.5 w in diameter (see box 1342 in FIG. 13H); and on the back of the outer extent of the shoulders is approximately 2.0 w in diameter (see box 1342 in FIG. 13O).

While facial feature recognition is a powerful tool in assessing the position of a patient, the analysis technique has some drawbacks in an HCF setting, that is often the resolution of surveillance camera 216 is not sufficient to distinguish contrast changes representing eyes 1204L and 1204R or ears 1206L and 1206R, or other distinguishing facial features such as the patient's nose or mouth. One method of determining which position the patient is in is to find the position of each shoulder relative to the patient's neckline. A conventional video camera does not have stereoscopic vision, so it does not have the information available to give it the same level of depth perception that human eyes have.

However, since the human body is symmetrical, an algorithm is used to determine which shoulder is closer to the camera. Initially, camera 216 is lined up with bed 321, so that the two sides of the bed begin and end at approximately the same vertical position in the camera's field of view, then the image can be used to deduce the patient's position by looking at the shoulders. The analysis technique for determining patient's position from the patient shoulders is described directly below.

FIG. 14 is flowchart depicting a process for assessing a patient's position by detecting the positions and orientation of the patient's shoulders in a video frame in accordance with another exemplary embodiment of the present invention. Essentially the process steps are identical to those discussed in FIG. 11A, however, identifying the location of the patient's shoulders in step 1110 may also include techniques for recognizing a pattern imprinted on the patient's hospital gown on the shoulders. The pattern, as further depicted in FIGS. 15A-15F, might be any clearly recognizable geometric shape, such as circles 1512L and 1512R. Optimally, a mechanism should exist for distinguishing the pattern imprinted on the left shoulder from the pattern imprinted on the right shoulder, for instance placing a distinct pattern on each shoulder. With respect to circles 1512L and 1512R, the two might have distinct coloration or color patterns, or alternatively, for example, the left shoulder may have a circle and the right a triangle, or parallel lines oriented vertically on one shoulder and horizontally on the other, etc. In any case, the process of FIG. 11A continues by observing the vertical positions of the left and right shoulder patterns (in FIG. 15A-15F, 1512L and 1512R), the vertical position and orientation of shoulder line 1510 (step 1412). Next, the patient's position can be assessed by one or several of the following conditions being met (step 1414): patient is on the back if shoulder line 1510 is located well below the patient's face and is approximately vertical and/or left shoulder pattern 1512L is clearly distinguishable on the patient's left side and right shoulder pattern 1512R is clearly distinguishable on the patient's right side (see FIGS. 15A and 15O); or the patient is oriented quarter turned to right if shoulder line 1510 is positioned below face and lower on patient's right (approximately 45°) (see FIG. 15E); or the patient is oriented quarter turned to left if shoulder line 1510 is positioned below face and lower on patient's left (approximately −45°) (see FIG. 15B); or the patient is on the right side if shoulder line 1510 is positioned above or near face and lower on patient's right or if only left shoulder pattern 1512L is visible (see FIG. 15F); or patient on left if shoulder line 1510 is positioned above or near face and lower on patient's right or if only right shoulder pattern 1512R is visible (see FIG. 15C); and finally, the patient is oriented to either the left or right side but which side is not determinable if shoulder line 1510 is undeterminable because only one of shoulder patterns (1512L and 1512R) are visible, but not recognizable from the other of shoulder patterns (1512L and 1512R). Next, changes in the patient's position can be assessed by comparing the patient's position in current NTM frame N with the previously saved NTM frame (step 1416). The process then reverts to step 1104 for a new frame N.

The principles discussed above are relevant even if the patient is lying at a position that is skewed from the center of bed 321. This could reverse the position of the shoulders in the camera's field of view. This is acceptable, however, because the aim of this analysis technique is to only detect changes in the patient's position.

Figure 15A:
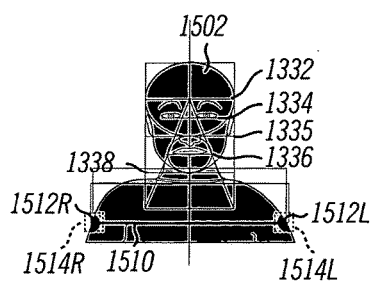
FIGS. 15A-15F are diagrams that graphically illustrate the process for assessing a patient's position by detecting the positions and orientation of the patient's shoulders in a video frame in accordance with another exemplary embodiment of the present invention.
Figure 15B:
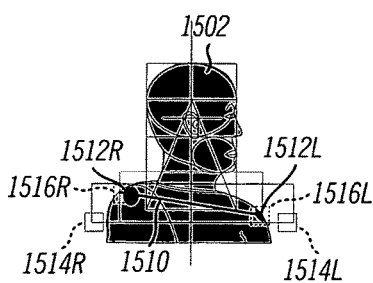
Figure 15C:
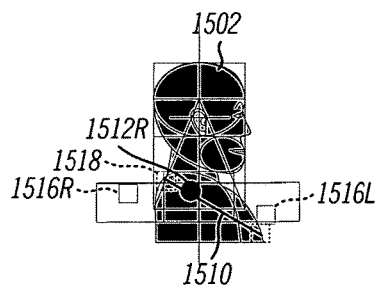
Figure 15D:
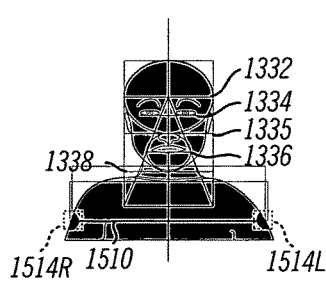
Figure 15E:
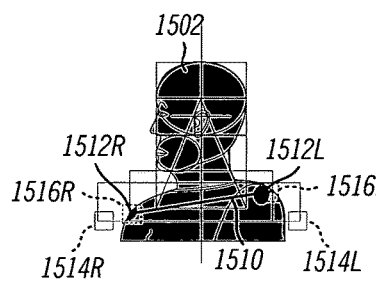
Figure 15F:
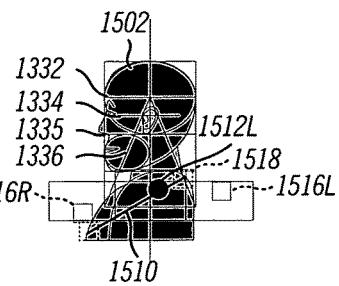

Assessing the patient's position from the position and orientation of the patient's shoulders is highly advantageous because the amount of frame analysis can be greatly reduced over facial feature recognition and because this analysis method lends itself to lower resolution cameras. However, the presently described process may be even further optimized by reducing the area to be analyzed within area of interest 840 to only the respective previous positions of left shoulder pattern 1512L and right shoulder pattern 1512R. This is possible by designating left shoulder area 1514L and right shoulder area 1514R for analysis in the next NTM frame identified. If, in the next NTM frame the positions of the patient's shoulders are found within left shoulder area 1514L and right shoulder area 1514R as in the previous NTM frame, then the analysis can cease as the patient's position has not changed. This processing step (or perhaps pre-processing step) is graphically illustrated between FIGS. 15A and 15B, showing right shoulder pattern 1512R having moved from area 1514R to 1516R and similarly, left shoulder pattern 1512L having moved from area 1514L to 1516L; and again between FIGS. 15B and 15C, showing right shoulder pattern 1512R having moved from area 1516R to 1518R and similarly, left shoulder pattern 1512L having moved from area 1516L to 1518L (assuming the left shoulder pattern is visible). The process is depicted for the right side between FIGS. 15O and 15E and again between FIGS. 15E and 15F.

With regard to recognizing patterns that correspond to patient positions, one of the difficulties in tracking the patient's position on the hospital bed using a video monitoring device is that often the lower portion of the patient's body is obscured by a solid-colored sheet or blanket. This inhibits patient surveillance sub-system 220 from detecting contrast between the patient and bed 321, thereby preventing the system from observing the position of the patient's lower body. To solve this problem, the presently described system and method for using a video monitoring system to prevent and manage decubitus ulcers in patients utilizes custom-printed sheets which contain a regularly repeating pattern (such as a grid, circles or other repeating geometric pattern that can be recognized by the system). This orientation of this pattern in the image frame will allow the camera to detect contours at different positions in the bed sheet, and will allow the system to infer the patient's position from those contours.

Figures 18C, 19:
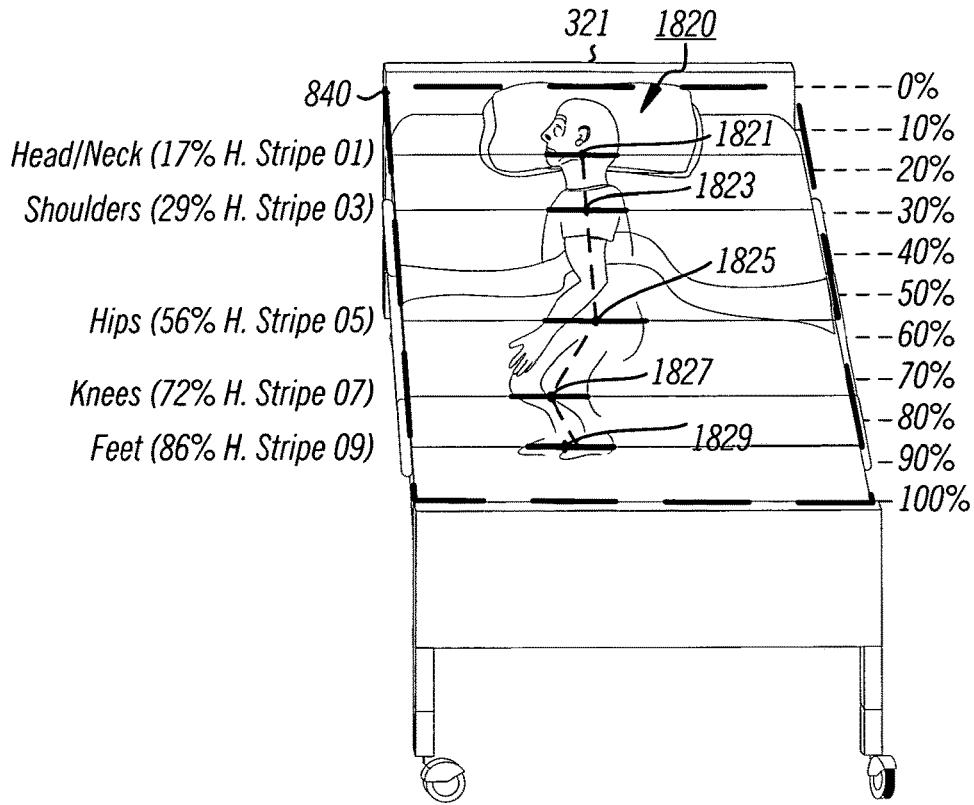

With regard to yet another analysis technique for assessing the patient's position and/or assessing changes in the patient's position, it is possible to identify the patient's position from representative horizontal patient positions taken at a discrete number of horizontal stripes within area of interest 840 or, alternatively, from the orientations between the respective representative horizontal patient positions taken in the horizontal stripes. With regard to either technique, the vertical positions of the respective horizontal stripes within area of interest 840 are predetermined to coincide with the vertical position of parts of the patient's body that are highly indicative of the patient's position, for instance shoulders, head/neck, hips, knees, torso and feet. The vertical positions of these horizontal stripes in a generic area of interest 840 may be designated in percentage increments from the top of area of interest 840; the top being 00%, to the bottom, being 100%, with the vertical middle of area of interest 840 being the 50% horizontal stripe (see the examples in FIGS. 18A-18C diagrammatically illustrating area of interest 840 superimposed on patient bed 321 with five horizontal stripes, where 17% stripe 01 corresponds to the patient's head, 29% stripe 03 corresponds to the patient's shoulders, 56% stripe 05 corresponds to the patient's hips, 72% stripe 07 corresponds to the patient's knees and 86% stripe 09 corresponds to the patient's feet). Alternatively, the vertical positions of the horizontal stripes may be designated as percentage increments of the patient, from the top of the patient's head to the bottom of the patient's foot. In so doing, the vertical position percentages are relational to the size of the patient and not the size of the area of interest. In any case, a single horizontal patient position along any discrete horizontal stripe may be selected within a line interval defined by using any of the analysis techniques described above, for instance by grouping color temperatures along the stripe, by finding the left and right extents of the patient interval along the stripe using contrast or alternatively, by using a representative horizontal position such as the median of an interval that deviates from an average luminance value by a predetermined amount for each horizontal stripe. The following algorithms describe methods for using a curve plotting horizontal position against pixel luminance to describe the position of the patient. Optimally, each uses a plotted curve showing the luminance of pixels as they range horizontally from one side of the area of interest 840 containing patient's bed 321, to the other side of the area of interest 840. Since the distance of the object from the light source (room light during the day, and infrared LEDs from the camera at night) affects the amount of light which is reflected to the camera, the luminance measurements can help describe the height of the various portions of the patient on the bed. Only luminance technique will be described immediately below, however, acceptable results may be obtained using other techniques disclosed here within without departing from the scope of the invention.

Figure 16B:
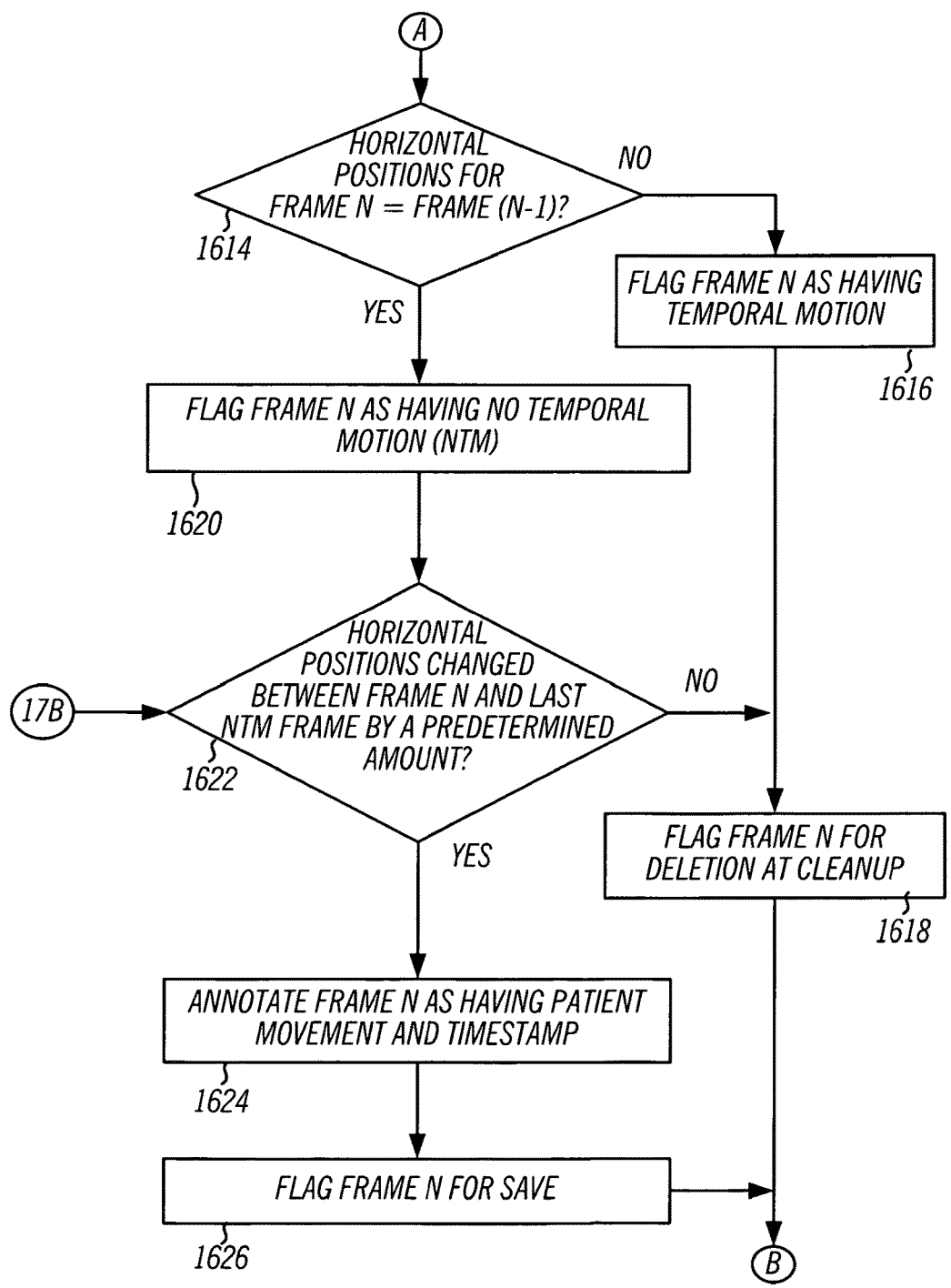

FIGS. 16A and 16B are flowcharts depicting a process for assessing changes in a patient's position by detecting parts of a patient's body represented in a video frame that lie along one of a plurality of discrete horizontal lines in accordance with an exemplary embodiment of the present invention. The present example depicts the patient in a recumbent position on patient bed 321 for simplicity and is not intended to limit the scope of the present invention. The patient may be, in addition to recumbent in a bed, seated in a chair or wheelchair or in some other position at, for example, a medical diagnostic or therapy apparatus. In accordance with this analysis process, the position of a patient's body can be described as a plurality of representative horizontal positions, one for each of the discrete horizontal lines. The process can be optimized by limiting the portion of the image frame to an area of interest that includes the patient. With regard to a specific example, assuming again the area of interest is 64×84 pixels of the view frame of camera 216. then, each of the five exemplarily horizontal positions would occur between pixel 0 and pixel 63 pixel of the horizontal line. See, for example, positions 1801, 1803, 1805, 1807 and 1809 for position 1800 depicted in FIG. 18A, positions 1811, 1813, 1815, 1817 and 1819 for position 1810 depicted in FIG. 18B and positions 1821, 1823, 1825, 1827 and 1829 for position 1820 depicted in FIG. 18C. These positions approximate the patient's position along the horizontal lines (for instance the 17% horizontal stripe 01, 29% horizontal stripe 03, 56% horizontal stripe 05, 72% horizontal stripe 07 and 86% horizontal stripe 09) (in the figures, stripes are labeled by odd element numbers to correspond with position element numbers). Typically, area of interest 840 will be displayed on video monitor/touchpad 267 (for instance as Virtual BedRails) however the horizontal stripes are represented in the figures for describing the present invention and are typically not displayed after exiting the setup phase). In any case, the analysis process determines the placement of the position along each horizontal line.

In accordance with one exemplary embodiment of the present invention the representative horizontal position of a particular horizontal line may be designated as the median of a pixel interval having a color temperature (optimally luminance) above the average color temperature of the particular horizontal line by some predetermined amount, percentage or ratio. The representative position may also be designated as some other predetermined point along the pixel interval. Hence, the patient's position in each image frame can be described by a plurality of positions along the horizontal lines at the respective vertical positions. It is expected that at least three position points are necessary, although in certain situations fewer positions may suffice to describe the patient's position. In the present example the patient's position along five horizontal lines are interrogated. The description of these patient positions can be compared between image frames to determine if the patient's position has changed (see the table in FIG. 19 that depicts the horizontal positions at the five discrete horizontal lines 17% stripe 01, 29% stripe 03, 56% stripe 05, 72% stripe 07 and 86% stripe 09, for patient positions 1800, 1810 and 1820).

Turning to the flowchart, the process begins by camera control device 210 receiving a description of the patient area (area of interest 840) which is manually input by the HCF staff, typically on video monitor/touchpad 267 (step 1602). Internally, camera control device 210 subdivides area of interest 840 into percentages, which also uses area of interest 840 as the horizontal extent of the interrogation interval using this method. The plurality of vertical positions in the area of interest are received (step 1604). Each of these vertical positions generally corresponds to a strategically positioned horizontal stripe that corresponds to a part of the patient's body that is particularly indicative of the patient's position, e.g. head/neck, shoulders, torso, hips, legs, feet, etc. (step 1604). Only these vertical positions will be interrogated for content within area of interest 840 of the image frame. Therefore, their selections within the image frame should accurately define the vertical position of the corresponding body part within the area of interest. The vertical positions within area of interest 840 are determined in advance and may be based on a generic set of vertical positions that generally correspond to every patient, or more preferably might instead be based on factors common to only the patient being monitored. These common factors include, for instance, the height of the patient, her current position relative to the top (or bottom) of area of interest 840 and/or patient bed 321, etc. Optimally, the vertical positions may be selected by the HCF staff at patient monitoring sub-system 270 that is unique for each patient being monitored for changes in position.

With the setup phase completed, the process receives frame N (step 1606) and scans the horizontal pixel rows at each of the vertical positions in frame N for predetermined pixel characteristics (step 1608). As discussed previously, the pixel characteristics selected for use may be any optical characteristic capable of distinguishing the patient, however, optimally, luminance values are scanned for the reasons discussed above and below. An average luminance value is determined for each of the sets of luminance values along the horizontal pixel rows and position points along each row that deviates from the average luminance of that row by a predetermined percentage are identified (step 1610). As discussed previously, it is expected that the luminance value will increase with the elevations on the patient's bed, therefore, areas within the image frame with the patient, with correspondingly higher elevations, will tend to exhibit higher luminance values in the image frame. Discriminating these values is optimized by analyzing pixels across horizontal rows because the light reflected off the patient area is relatively constant for like elevations along horizontal lines. This is due to the orientation of the patient's bed to the room light source and their light source of the video camera (see the discussion between FIGS. 5 and 6). Hence, the patient, if present, will appear along any horizontal pixel row in the video frame as an interval of pixel points having luminance values above the average luminance for that horizontal pixel row, usually by some predetermined amount, for example by a predetermined ratio or percentage (this is represented in FIGS. 18A-18C as an interval of shading along the five discrete horizontal stripes). A median horizontal position for the points having the above average luminance for the horizontal pixel row is determined for each of the vertical positions (see positions 1801-1809 for patient position 1800 in FIG. 18A, positions 1811-1819 for patient position 1810 in FIG. 18B and positions 1821-1829 for patient position 1820 in FIG. 18C) (step 1612). Although the concept is of little significance for this method, it should be appreciated that each median position corresponds to a vertex of a patient position representation curve that describes the patient's position (depicted in the figures as a dashed line connected to the patient position points). However, with regard to the presently described embodiment, only the absolute horizontal positions of the medians is used to determine patient movement.

In any case, frame N is tested for NTM (step 1614), for instance by comparing the absolute positions of the medians at the vertical positions determined for frame N with the median positions for corresponding vertical positions determined for frame (N–1). If the two corresponding sets of horizontal positions differ, frame N contains temporal motion, is flagged (step 1616) and not used for determining changes in the patient's position. Frame N is flagged for deletion at cleanup (step 1618) and the process then returns to step 1606 for the next frame N.

If, however, at step 1614, no temporal motion is detected, frame N is flagged as an NTM frame (step 1620) and the median positions at the vertical positions of frame N are compared with median positions for the corresponding vertical positions from the last saved NTM frame (N–1) (step 1622). The comparison between the median positions of the two image frames can be based on a predetermined difference between cumulative medial position values (for example a cumulative change in the median positions of fifteen pixel positions) or a predetermined different value for each vertical position (for example a median position of five pixel positions for the 17% horizontal stripe 01 and/or six pixel positions for the 29% horizontal stripe 03, and/or four pixel positions for the 56% horizontal stripe 05 and so on). It is expected that whether the patient is recumbent or seated will bear on the sensitivity between images necessary to demonstrate a change in the patient's position, e.g., greater differences between the medial positions are needed to demonstrate a change in recumbent patient's position in comparison to a seated patient.

If the two corresponding sets of corresponding median positions are identical (or within a predetermined amount), the patient's position is unchanged and frame N contains no useful decubitus ulcer procedure event information. Frame N is then flagged for deletion (step 1618). The process then returns to step 1606 for the next frame N.

If, at step 1622, the median positions from frame N have changed from the last NTM frame by the predetermined amount, patient motion is inferred in the current frame N and that frame is annotated as having patient movement and time stamped (step 1624). Frame N is also flagged for saving (step 1626) and the process then returns to step 1606 for the next frame N. As discussed elsewhere above, the magnitude of the patient's movement may also infer a change in the position of the patient, in addition to mere patient movement. Clearly, the present process is intended to automatically alert the HCF staff of patient movement for attention/intervention by the HCF staff. However, if the amount of patient movement detected exceeds a second, higher threshold level, it might be inferred that the patient has changed positions (see for instance step 622 in FIG. 6A). In that case, nurse monitor device 260 might instead issue a higher level alert, such as an alarm, that signifies more immediate attention may be required by the HCF staff.

While the process described immediately above is a particularly elegant analysis technique, requiring extremely low system resources for rapidly evaluating as few as three pixel rows, the process generally cannot identify a patient's position. One shortcoming associated with the presently described analysis technique is that it utilizes absolute horizontal positions of the discrete vertical positions that do not define or correspond to a particular patient position. However, the character of the patient position representation curve, comprised of the separate horizontal positions between the discrete vertical positions, may itself be indicative of patient positions. Hence, it is advantageous to describe the patient position representation curve with relative attributes rather than absolute attributes such as positional information. In so doing, a library of patient position representation curves can be determined in advance, each position representation curve corresponding to a specific patient position, that can be used for comparisons with a patient position curve constructed from a particular image frame.

Figures 20, 21:
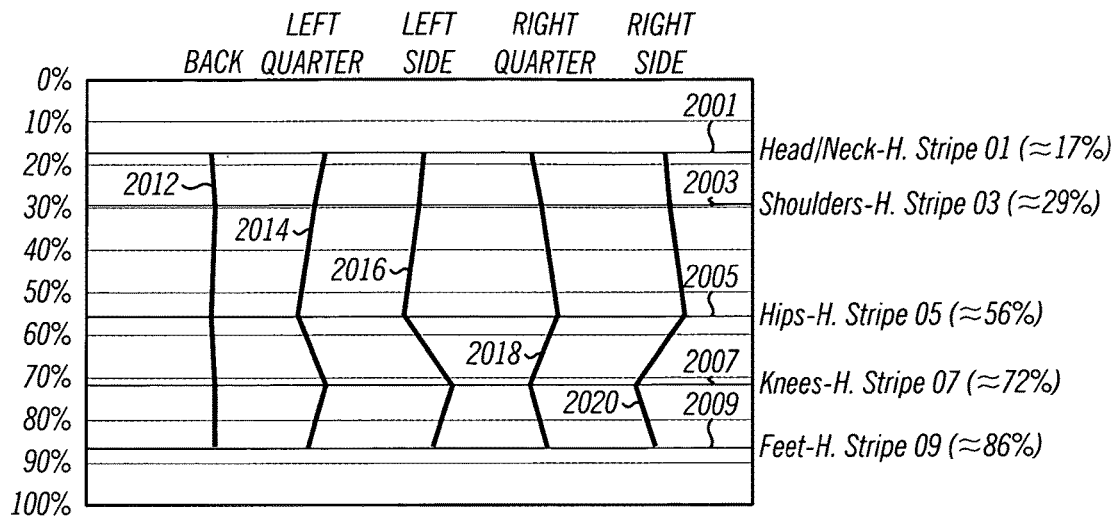
FIG. 20 is a diagram graphically illustrating a plurality of patient position representation curves represented by line segments at angular orientations between the five exemplary vertical positions in accordance with an exemplary embodiment of the present invention.
FIG. 21 is a table that illustrates a library of patient positions represented by a sequence of angular relationships between parts of the body at five exemplary vertical positions in accordance with an exemplary embodiment of the present invention.

One relative attribute used to describe is the orientation between position point vertices, or the line segment between vertices of the patient position representation curve. For the purposes herein, the orientations will be described as the angular orientation $\phi v$ of any line segment V between a vertex and an adjacent, lower vertex (i.e., $270°>\phi v<\phi_v>90°$, although the use of other notations are possible. For instance, see the library of patient positions illustrated in FIG. 20 depicting a plurality of patient position representation curves represented by line segments at angular orientations $\phi v$ between the five exemplary vertical positions. For example, patient position representation curve 2012 describes the patient on her back, patient position representation curve 2014 describes the patient on her left quarter, patient position representation curve 2016 describes the patient on her left side, patient position representation curve 2018 describes the patient on her right quarter and patient position representation curve 2020 describes the patient on her right side. The angular orientations $\phi v$ of these line segments can be tabulated (such as depicted in FIG. 21) for each patient position representation curve of the library. For instance, row 2102 contains the angular orientations $\phi$ of line segment $V_{1-2}$ between the highest and second highest vertices for patient positions 2012, 2014, 2016, 2018 and 2020, row 2104 contains the angular orientations $\phi$ of line segment $V_{2-3}$ between the second and third highest vertices, row 2106 between the third and fourth highest vertices and row 2108 between the fourth and fifth highest vertices for patient positions 2012, 2014, 2016, 2018 and 2020. With the library of patient positions represented by angular orientations between vertical positions, the process can easily recognize a patient's position by comparing the angular orientations between vertical positions from an image frame with those in the library.

FIGS. 17A and 17B are flowcharts depicting a process for assessing a patient's position by representing the patient's body, from a representation in a video frame, as a patient position curve comprising line segments oriented from each other at particular orientations that may be referenced to a library of patient position angular orientations in accordance with an exemplary embodiment of the present invention. This technique is also described with respect to a patient in a recumbent position on patient bed 321. The use of a recumbent patient is merely to simplify the discussion and is not intended to limit the scope of the present invention. The patient may be, in addition to recumbent in a bed, seated in a chair or wheelchair or in some other position at, for example, a medical diagnostic or therapy apparatus. Before proceeding it should be mentioned that even though the present process analyzes patient positional information in a video frame using only relative attributes, it is possible that the description of the positional curve is undefined in the library. In that case, the process merely reverts to a description of the positional curve using absolute median position information for assessing changes in the patient's position depicted in FIG. 16B. The distinctions will become apparent with the description. The process begins in setup phase by camera control device 210 receiving a description of area of interest 840 (step 1702) and plurality of vertical positions in the area of interest are received (step 1704), both discussed with specificity at steps 1602 and 1604 above. However, here it should be emphasized that the selection of the vertical positions should correlate to the vertical positions used for compiling the library of patient positions discussed below. What is important is the part of the patient body being monitored by the horizontal stripe and not the absolute vertical position of the stripe within the area of interest. The limitations of this selection will be discussed further below.

Next, the process receives frame N (step 1706) and scans the horizontal pixel rows at each of the vertical positions in frame N for luminance values for the pixels in the horizontal row (step 1708), as also discussed immediately above. As before, an average luminance value is determined for each horizontal pixel row and position pixel points along each row that deviates from the average luminance of that row by a predetermined percentage are identified (step 1710). Finally, a median horizontal position for the points having the above average luminance for the horizontal pixel row is determined for each of the vertical positions (step 1712). Although the presently described process does not utilize the median horizontal position information, it will be retained if it is later determined that frame N contains decubitus ulcer procedure event information in case the patient's position cannot be identified (see below step 1726).

From here, the process converts the absolute position points for each of the vertical positions to the angular orientation between position points (or of the line segment between the points) (step 1714). The process measures the angular relationships, or angular orientation $\phi v$ between position points in adjacent vertical positions, or the line segment V extending between the adjacent position points (see again the library of patient positions illustrated in FIG. 20 which are tabulated as depicted in FIG. 21). The aim here is to describe a patient's position as a sequence of angular relationships between parts of the body that accurately describe the patient's position. With regard to the example, angular orientation $V_{1-2}$ is measured between the first and second vertical positions, head/neck (horizontal stripe 01@17° and the shoulder (horizontal strip 03@29°, another angular orientation $V_{2-3}$ is measured between the second and third vertical positions, the shoulders (horizontal strip 03@29° and hips (horizontal strip 05@56° and so on.

Next, frame N is tested for NTM by comparing the angular relationships between the vertical positions for frame N with the angular relationships between the corresponding vertical positions for frame (N–1) (step 1716). If the corresponding angular orientations have changed between frames, frame N is flagged as having temporal motion (step 1718) and flagged for deletion (step 1720). The process the reverts to step 1706 for a new frame N.

If, at step 1716 no motion is detected, frame N is flagged for NTM (step 1722). Next, the patient's current position is identified by comparing the angular relationships for frame N with a library of angular relationship/body position data (step 1724) (see table of angular relationship/body position data depicted in FIG. 21). Because the present process describes body position in relative attributes, the attributes may be interpreted from a comparison to a library of similar attributes. The library of angular relationship/body position data describes body positions by angular relationships between parts of the body, for example between the head/neck and shoulders, or between the knees and feet, etc. Comparisons to these angular relationships are not constrained by the absolute positions of the position points from which the relations are gathered, or even the absolute dimension of the area of interest or the height of the patients being monitored. The library can be assembled from archived surveillance video by simply identifying patient positions in the video and interrogating the frame for the angular relationships. The data may be compiled, for example, by averaging the corresponding angular relationship data from identical patient positions over a time period, between different archival videos, or both. It is possible that for each angular relationship, a corresponding angular tolerance exists. In that case, if angular relationships from a particular video frame matches the corresponding angular relationships of a library position, within the tolerances, the position is matched. Using whatever tolerances, if a match is identified from the library, the patient's position if frame N is identified (step 1728) and can be compared with the patient's position last saved NTM frame (step 1730). If the patient positions in the two frames match, then the patient may have moved, but did not change position. In that case, frame N contains no decubitus ulcer procedure event information in addition to the previously saved NTM frame, and therefore frame N can be flagged for deletion (step 1720) and the process reverts to step 1706 for a new frame N. If, at step 1730 the patient's position from the two frames do not match, then the patient has changed positions. Frame N is then annotated as having a decubitus ulcer procedure event, i.e., a change in the patient's position, along with the patient's new position and being timestamped (step 1732) and is flagged for saving (step 1734). The process then reverts to step 1706 for a new frame N.

Returning to step 1726, there may be cases where the patient's position in frame N cannot be identified in the library of body positions, that is, the angular relationships derived in frame N do not match any of the known corresponding angular relationships for a body position. In those cases, the process cannot continue on the basis of comparing the patient's position between frames for changes and must revert to using the medial position to determine patient movement, hence the process continues at step 1622 of the process depicted in the flowchart of FIG. 16B. Once frame N has been interrogated, the process reverts to step 1706 as before.

While it is understood from the descriptions of the generic processes of the flowcharts depicted in FIGS. 5, 6A and 6B, the process performs additional functions that were omitted from the flowcharts depicted in FIGS. 9A, 9B, 11A, 118, 14, 16A, 6B, 17A and 178 for clarity, such as monitoring the time with regard to the turn schedule, alerting the HCF staff to decubitus ulcer procedure events, requesting verifications, etc. Furthermore, the process continually identifies video frames with useful decubitus ulcer procedure event information that should be saved as part of the patient position history. In addition to the decubitus ulcer procedure events discussed, the present system and method for using a video monitoring system to prevent and manage decubitus ulcers in patients may be configured to memorialize video frames of other information and events, such as pre-event frames, post-event frames, HCF staff intervention events, patient repositioning alert events and timed sample events.

The presently described system and method for using a video monitoring system to prevent and manage decubitus ulcers in patients greatly reduces the amount of manual intervention required from an attending HCF staff member by automatically detecting decubitus ulcer procedure events, identifying the events as being one or all of patient movement, a change in the patient's position or a patient turn event. The system independently documents patient movement, positions, changes in position and turning as a succinct video log containing only relevant video, without manual intervention from the HCF staff. Additionally, the video record is automatically annotated with relevant decubitus ulcer procedure event information, timestamps, HCF staff comments and verifications and archived to locations secure from unauthorized alterations. These processes run largely in the background until and unless the system determines that intervention by the HCF staff is warranted.

Simultaneously, the presently described system and method for using a video monitoring system to prevent and manage decubitus ulcers in patients provides the HCF staff with an easily understood visual interface at patient monitoring system 270 for interpreting decubitus ulcer procedure event information receiving alerts, alarms and warnings, as well as inputting data and responding to verification requests and other system queries. FIGS. 22A, 22B and 22C are three screenshots of the video monitoring system in response to different decubitus ulcer procedure events. These screens are merely exemplary for understanding the interface. In normal operating mode, video monitor/touchpad 267, connected to Nurse monitor device 260 displays surveillance videos from a plurality of patient rooms in miniature windows in a storyboard presentation (not shown) with one large window showing an enlarged view of a selected room (see FIGS. 22A, 22B and 22C). Additionally, the resolution of a selected patient room can be greatly enhanced, temporarily, by expanding the window over video monitor/touchpad 267. FIG. 22A depicts a typical surveillance window 2250 in which patient room 2252 is presented. Within room 2252 is patient bed 321 and aligned on the bed, area of interest 840 is delineated with a colored boundary. In run mode, without an active decubitus ulcer procedure event, certain decubitus ulcer procedure event information is displayed for the HCF staff in an abbreviated format. For instance, icons 2204 show the processes that are currently running, such as event alert/alarm processes, event warning processes, turn schedule monitoring process and navigation icons for reducing/expanding surveillance window 2250. In addition, within surveillance window 2250, substantive information related to the state of the turn schedule is displayed in time-to-turn field 2202, for example a dropdown box. As will be discussed below, surveillance window 2250 provides the means to access additional decubitus ulcer procedure event information as well as editing or verifying the information. Note also that the present invention recognizes that in certain situations the video data outside area of interest 840 will be analyzed for motion, such as for detecting the presence of the HCF staff in patient room 2252. Portions of patient room 2252 that tend to give erroneous or conflicting analysis results can be selectively omitted from processing by bounding the area to be omitted, such as area 2206 containing balloons that constantly move with the air currents within patient room 2252.

Because the attending HCF staff is charged with caring for several patients in different rooms, the system actively alerts the HCF staff to an event, visually and audibly, identifies the patient room by, for example, highlighting border 2208 of surveillance window 2250 and animating alarm icon 2214 to draw the attention of the HCF staff to that window and that particular patient room (see FIG. 22B). Additionally, decubitus ulcer procedure event information 2210 is prominently displayed within surveillance window 2250, for instance the HCF staff manual intervention for repositioning the patient in room 2252. At the conclusion of the event, the system recognizes that the patient has been repositioned consistent with the turn schedule and resets the timer in accordance with the new position in the turns schedule (see FIG. 22C). Additionally, the HCF staff can access addition information from, for example, field 2202, depicted opened as dropdown box 2220 in FIG. 22C. There, several useful data items are displayed, including time-to-turn field 2202, next patient position field 2224, current patient position field 2226 with patient position selection menu 2228 showing the sequence of patient positions, chronologically arranged, from the patient order. Also provided is button means 2230 for the HCF staff to verify the current event state of the process.

Finally, the presently described system and method for using a video monitoring system to prevent and manage decubitus ulcers in patients provides the HCF staff with a heretofore unknown mechanism of rapidly assessing the state of any patient and reviewing temporal events in chronological order merely by actuating patient position history report button 2212.

In addition to the heavy load a nursing staff faces, the nursing staff changes shifts twice per day, resulting in a new caregiver for each patient. The outgoing staff must exchange all relevant information with the incoming staff so that the care schedule for the patients is not interrupted. This is particularly important with prevention of decubitus ulcers. If the outgoing staff forgets to let the incoming staff know that the patient is due to be moved within the next 15 minutes, it's possible that the patient will go 60-90 minutes without attention from the HCF staff. Since the presently described system and method for using a video monitoring system to prevent and manage decubitus ulcers in patients creates and saves a video history of the patients in at least Local surveillance sub-system 220, the system can be leveraged to offer assistance to the incoming HCF staff in the form of an instant visual record of the previous few hours. Rather than rely on a verbal record from the outgoing staff, the incoming staff can click position history report button 2212 on the user interface and/or window 2250, and the system will respond with screenshots of the patient, chronologically ordered from a rolling time interval determined by the HCF staff (see the rolling time interval selection 709 for a historical position report in FIG. 7). These images include at least frames of the patient before and after a repositioning event. The images may also contain annotations of decubitus ulcer procedure event information. The video history may also include images of all decubitus ulcer procedure events that occurred within the rolling time interval, alert events, sample frames taken at predetermined time intervals and the like.

With further regard to creating, compiling and presenting a video history of patient decubitus ulcer procedure events, the flowchart presented in FIG. 23 depicts one exemplary method creating video history of patient decubitus ulcer procedure events, while the flowchart presented in FIG. 24 depicts an exemplary method compiling the video history of patient decubitus ulcer procedure events and presenting the video history to the HCF staff as a chronologically ordered set of screenshots of the patient in accordance with the present invention. Initially, the HCF staff identifies which events should be included in the video record of patient decubitus ulcer procedure events (step 2302). Typically, the system will select certain decubitus ulcer procedure events for the record without intervention from the HCF staff. These may include turn schedule events, patient repositioning events, HCF staff manual interventions, etc., but may also include pre-event and post-event frames and the selection frequency for timed sample events. The HCF staff may also configure the rolling patient position history time for compiling the patient record. The rolling time selection should be long enough for the HCF staff unfamiliar with the patient to accurately assess the state of the patient decubitus ulcer procedure and identify any immediate HCF staff interventions that should be performed. Next, the HCF staff configures the system with the turn schedule (step 2304). The turn schedule data provides the system with the turn interval times and corresponding positions necessary for making complex event decision. The system then monitors the surveillance area including the patient (step 2306) and automatically detects events by (step 2308), for example, analyzing the video frames and monitoring intervention time intervals with regard to the turn schedule. Video frames that represent patient decubitus ulcer procedure events are annotated with event information and timestamped (step 2310). All video frames that have been annotated with event information and/or timestamped are retained in at least a local memory of camera control device 210 (step 2312). Those frames constitute the video record of the patient position history, but may be retained in an ad hoc sequence of video frames representative of many patient, medical and security procedures. It is expected that any patient position history will contain at least a chronological sequence of image frame depicting the patient's current position at each scheduled turn event (pre-event frame). Alternatively, a more complete patient position history may also contain additional image frames after each HCF staff manual intervention depicting the patient's new position after a turn. Still further, the patient position history may also contain timed sample frames of the patient's position at predetermined time intervals and image frames showing the patient's position at any decubitus ulcer procedure event that is automatically detected by patient movement monitoring system 200. Finally, the patient position history may also contain images frames of patient positions that have been manually selected by the HCF staff at nurse monitor device 260 for, example, depicting some decubitus ulcer procedure event information concerning the patient's position.

In response to a command from the HCF staff, such as actuating patient position history report button 2212, the system compiles the patient position record from the various video frames retained in memory and invokes a presentation process. Essentially, the system, typically patient monitoring system 270, requests only the images frames pertaining to a particular procedure or event from local surveillance sub-system 220, such as patient decubitus ulcer procedure events. Local surveillance sub-system 220 usually has possession of the most recent few hours of video data and searches its memory for video frames annotated as being representative of the events over the pre-selected rolling time period (step 2402). The individual image frames are compiled into a chromatically ordered history of patient position screenshots showing all relevant events that occurred during the time period (step 2404). Finally, the presentation process displays the chromatically ordered history in a manner most conducive to the HCF staff understanding the current state of the patient decubitus ulcer procedure (sep 2406). One presentation is for the HCF staff to merely scan through the screenshot individually, one at a time. Alternatively, the system may present multiple screenshots, in chronological order, as thumbnail images or in miniature display windows. Typically, any decubitus ulcer procedure event information annotated with an image frame will be displayed to the HCF staff with the image frame. The HCF staff can then visually scan the screenshots and expand any that need clarification. Once one set of screenshots have been reviewed, the HCF staff calls for the next set until all images in the rolling time period have been reviewed.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Moreover, the computer readable medium may include a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

Computer program code for carrying out operations of the present invention may be written in an object oriented programming language such as Java?, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or 1/0 devices (including but not limited to keyboards, displays, pointing devices, etc.) can be coupled to the system either directly or through intervening 1/0 controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The exemplary embodiments described below were selected and described in order to best explain the principles of the invention and the practical application, and to enable others of ordinary skill in the art to understand the invention for various embodiments with various modifications as are suited to the particular use contemplated. The particular embodiments described below are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for using a video monitoring system to prevent and manage decubitus ulcers in patients, the method comprising:

receiving a decubitus ulcer patient repositioning schedule at the video monitoring system via a user interface including a plurality of patient position selections and corresponding timer selections, the patient repositioning schedule comprising a plurality of patient positions on a support surface, the plurality of patient positions respectively corresponding to a plurality of different at-rest body orientations on the support surface and a plurality of patient position time intervals associated with the plurality of different at-rest body orientations;

receiving a plurality of image frames from a surveillance camera at the video monitoring system, each of the plurality of image frames containing a patient on a support structure;

overlaying one or more pixel lines on the plurality of image frames at a plurality of vertical positions based on a position of the patient, the one or more pixel lines described as pixels at given horizontal positions within the plurality of vertical positions of the plurality of image frames;

scanning the one or more pixel lines at the plurality of vertical positions for luminance values;

determining median horizontal positions of the one or more pixel lines based on pixels having above average luminance within the luminance values;

monitoring the position of the patient on the support surface by determining which of the plurality of different at-rest body orientations the patient exhibits in the plurality of image frames by analyzing the plurality of image frames with the video monitoring system based on the median horizontal positions of the one or more pixel lines;

determining the time in which the patient remains in a first patient position with the video monitoring system based on the monitoring, the first patient position corresponding to one of the plurality of different at-rest body orientations;

issuing a first alert within a surveillance window interface of the video monitoring system that indicates a correct patient position and an indication that the patient is not in the correct patient position based on the patient remaining in the first patient position for a duration exceeding one of the plurality of patient position time intervals that is associated with the first patient position, the surveillance window interface including time remaining in the correct patient position, a next patient position according to the patient repositioning schedule, and a field to submit a verification of a current position of the patient;

detecting a patient repositioning event with the video monitoring system based on the monitoring;

determining whether the patient repositioning event is not in compliance with the patient repositioning schedule with the video monitoring system based on whether the repositioning event is an unscheduled event and the position of the patient following the patient repositioning event is in conflict with the patient repositioning schedule; and issuing a second alert within the surveillance window interface of the video monitoring system that indicates the correct patient position and the indication that the patient is not in the correct patient position based on the patient repositioning event not being in compliance with the patient repositioning schedule.

2. The method of claim 1, wherein detecting the patient repositioning event comprises detecting a transition from a second patient position of the plurality of patient positions to a third patient position of the plurality of patient positions.

3. The method of claim 1, wherein the patient repositioning schedule comprises an order for which the patient is to turn between the plurality of patient positions.

4. The method of claim 3, wherein determining whether the patient repositioning event is not in compliance with the patient repositioning schedule comprises determining whether the patient has turned out of the order.

5. The method of claim 1, wherein determining whether the patient repositioning event is not in compliance with the patient repositioning schedule comprises determining whether the patient has turned prematurely based on one of the plurality of patient position time intervals.

6. The method of claim 1, further comprising time stamping and storing at least some of the plurality of image frames in memory, wherein the patient is shown in each of the plurality of patient positions in the at least some of the plurality of image frames.

7. The method of claim 1, wherein monitoring the time in which the patient remains in the first patient position and detecting the patient repositioning event are each performed by comparing at least one attribute of different image frames of the plurality of image frames between the different image frames.

8. The method of claim 1, wherein the plurality of patient position time intervals are of different durations.

9. The method of claim 1, wherein each of the plurality of patient positions on the support surface is either of a recumbent position or a seated position.

10. The method of claim 1, wherein the plurality of patient positions comprise a left side position, a right side position, and a back side position.

11. The method of claim 1, wherein issuing one or both of the first alert and the second alert comprises generating one or more of an audible alarm and a visual alarm.

12. The method of claim 1, wherein the decubitus ulcer patient repositioning schedule is one or more of entered, updated, or verified at the video monitoring system by a user.

13. A system for video monitoring to prevent and manage decubitus ulcers in patients, the system comprising:

a video camera configured to generate a plurality of image frames of a patient on a support structure;

an interface including a plurality of patient position selections and corresponding timer selections; and a data processing system having a processor connected with memory and configured to:

receive a decubitus ulcer patient repositioning schedule, the patient repositioning schedule comprising a plurality of patient positions on the support surface, the plurality of patient positions corresponding respectively to a plurality of different at-rest body orientations on the support surface and respectively to a plurality of patient position time intervals associated with the plurality of different at-rest body orientations;

receive the plurality of image frames from the video camera;

overlay one or more pixel lines on the plurality of image frames at a plurality of vertical positions based on a position of the patient, the one or more pixel lines described as pixels at given horizontal positions within the plurality of vertical positions of the plurality of image frames;

scan the one or more pixel lines at the plurality of vertical positions for luminance values;

determine median horizontal positions of the one or more pixel lines based on pixels having above average luminance within the luminance values;

monitor the position of the patient on the support surface by determining which of the plurality of different at-rest body orientations the patient exhibits in the plurality of image frames by analyzing the plurality of image frames based on the median horizontal positions of the one or more pixel lines;

determine the time in which the patient remains in a first patient position based on the monitoring, the first patient position corresponding to one of the plurality of different at-rest body orientations;

issue a first alert within a surveillance window interface that indicates a correct patient position and an indication that the patient is not in the correct patient position based on the patient remaining in the first patient position for a duration exceeding one of the plurality of patient position time intervals that is associated with the first patient position, the surveillance window interface including time remaining in the correct patient position, a next patient position according to the patient repositioning schedule, and a field to submit a verification of a current position of the patient;

detect a patient repositioning event based on the monitoring;

determine whether the patient repositioning event is not in compliance with the patient repositioning schedule based on whether the repositioning event is an unscheduled event and the position of the patient following the patient repositioning event is in conflict with the patient repositioning schedule; and issue a second alert within the surveillance window interface that indicates the correct patient position and the indication that the patient is not in the correct patient position based on the patient repositioning event not being in compliance with the patient repositioning schedule.

14. The system of claim 13, wherein the data processing system data is configured to detect the patient repositioning event by detecting a transition from a second patient position of the plurality of patient positions to a third patient position of the plurality of patient positions.

15. The system of claim 13, wherein the patient repositioning schedule comprises an order for which the patient is to turn between the plurality of patient positions.

16. The system of claim 15, wherein the data processing system data is configured to determine whether the patient repositioning event is not in compliance with the patient repositioning schedule by determining whether the patient has turned out of the order.

17. The system of claim 13, wherein the data processing system data is configured to determine whether the patient repositioning event is not in compliance with the patient repositioning schedule by determining whether the patient has turned prematurely based on one of the plurality of patient position time intervals.

18. The system of claim 13, wherein the data processing system data is configured to time stamp and store at least some of the plurality of image frames in the memory, wherein the patient is shown in each of the plurality of patient positions in the at least some of the plurality of image frames.

19. The system of claim 13, wherein the data processing system data is configured to monitor the time in which the patient remains in the first patient position and detect the patient repositioning event by comparing at least one attribute of different image frames of the plurality of image frames between the different image frames.

20. The system of claim 13, wherein the plurality of patient positions comprise a left side position, a right side position, and a back side position.

* * * * *